US012579235B2

(12) United States Patent
Tussy et al.

(10) Patent No.: US 12,579,235 B2
(45) Date of Patent: Mar. 17, 2026

(54) FACIAL RECOGNITION AND/OR AUTHENTICATION SYSTEM WITH MONITORED AND/OR CONTROLLED CAMERA CYCLING

(71) Applicant: FaceTec, Inc., Las Vegas, NV (US)

(72) Inventors: Kevin Alan Tussy, Las Vegas, NV (US); Josh Rose, San Diego, CA (US); Hunter Hedinger, San Diego, CA (US)

(73) Assignee: FaceTec, Inc., Las Vegas, NV (US)

( * ) Notice: Subject to any disclaimer, the term of this patent is extended or adjusted under 35 U.S.C. 154(b) by 564 days.

(21) Appl. No.: 17/939,867

(22) Filed: Sep. 7, 2022

(65) Prior Publication Data

US 2023/0073410 A1 Mar. 9, 2023

Related U.S. Application Data

(60) Provisional application No. 63/241,511, filed on Sep. 7, 2021.

(51) Int. Cl.
G06F 21/32 (2013.01)
G06V 20/40 (2022.01)
G06V 40/16 (2022.01)

(52) U.S. Cl.
CPC .............. *G06F 21/32* (2013.01); *G06V 20/46* (2022.01); *G06V 40/172* (2022.01)

(58) Field of Classification Search
CPC ......... G06Q 20/40; H04N 21/44; H04L 29/06
See application file for complete search history.

(56) References Cited

U.S. PATENT DOCUMENTS 7,412,081 B2 8/2008 Doi et al.
7,680,276 B2 3/2010 Steinberg
(Continued)

FOREIGN PATENT DOCUMENTS

GB 2501362 10/2013
KR 10-2019-0101841 9/2019
(Continued)

OTHER PUBLICATIONS

"FacialNetwork to release facial recognition smartphone app", Biometric Update, https://www.biometricupdate.com/201507/facialnetwork-to-release-facial-recognition-smartphone-app Copyright ß 2024 Biometrics Research Group, Inc, Justin Lee, Jul. 9, 2015.
(Continued)

*Primary Examiner* — Clayton R Williams
(74) *Attorney, Agent, or Firm* — Chad W. Miller IP Law, Ltd.

(57) ABSTRACT

A method for detecting video feed injection during an authentication session comprising initiating an authentication session which utilizes a video feed from a camera, the camera part of a computing device that is used to capture video of a user during the authentication session. Next, activating the camera to obtain a video feed, monitoring for the requested video feed, and receiving a video feed. Detecting a time delay between activating the camera and to receiving the video feed. Comparing the time delay to an expected delay or range of expected delay, and, if the time delay does not match an expected delay or range of expected delay, terminating the authentication session. Optionally providing a notification that the time delay did not match the expected delay, range of expected delay, or both. The number of times this method occurs may be repeated a random number of times.

20 Claims, 20 Drawing Sheets

(56) References Cited

U.S. PATENT DOCUMENTS

| | | | |
|---|---|---|---|
| 8,260,008 | B2 | 9/2012 | Hanna et al. |
| 8,437,513 | B1 | 5/2013 | Derakhshani et al. |
| 8,965,064 | B2 | 2/2015 | Hanna |
| 9,075,975 | B2 | 7/2015 | Bud |
| 9,077,891 | B1 | 7/2015 | Baldwin |
| 11,055,724 | B1 | 7/2021 | Bell et al. |
| 2002/0113884 | A1 | 8/2002 | Tanii et al. |
| 2004/0036574 | A1 | 2/2004 | Bostrom |
| 2004/0239799 | A1 | 12/2004 | Suzuki et al. |
| 2007/0127787 | A1 | 6/2007 | Castleman et al. |
| 2008/0152232 | A1 | 6/2008 | Skans |
| 2010/0014720 | A1 | 1/2010 | Hoyos et al. |
| 2010/0158319 | A1 | 6/2010 | Jung et al. |
| 2011/0299741 | A1 | 12/2011 | Zhang et al. |
| 2014/0028823 | A1 | 1/2014 | Tahk et al. |
| 2014/0230046 | A1 | 8/2014 | Dewan et al. |
| 2016/0063314 | A1 | 3/2016 | Samet |
| 2016/0071275 | A1 | 3/2016 | Hirvonen |
| 2016/0373437 | A1* | 12/2016 | He .................... G06V 40/20 |
| 2018/0218371 | A1* | 8/2018 | Wang .................... G06V 40/16 |
| 2019/0295084 | A1* | 9/2019 | Edwards ............ G06Q 20/4016 |
| 2024/0333512 | A1 | 10/2024 | Janardhanan et al. |

FOREIGN PATENT DOCUMENTS

| | | |
|---|---|---|
| WO | 2005/109186 | 11/2005 |
| WO | WO 2016/079464 | 5/2016 |
| WO | 2017/098457 | 6/2017 |

OTHER PUBLICATIONS

Zhengyou Zhang et al., A Robust Technique for Matching Two Uncalibrated Images Through the Recovery of the Unknown Epipolar Geometry, Institut National De Recherche En Informatique Et En Automatique (May 1994).

Eugene Hect & Alfred Zajac, Optics, Addison-Wesley Publishing Co. (1974).

Anil K. Jain et al., Introduction to Biometrics, Springer (2011).

B. Honlinger & H.H. Nasse, Distortion, Zeiss (Oct. 2009).

Hue and Hatchet, What is the Focal Plane?, https://hueandhatchet.com/what-is-the-focal-plane/.

Introduction to Astronomy, https://physics.weber.edu/palen/phsx1040/lectures/ldistcomp.html.

Daniel Baker, Face distortion is not due to lens distortion, (May 5, 2012), https://bakerdh.wordpress.com/2012/05/05/face-distortion-is-not-due-to-lens-distortion/.

Richard Hartley & Andrew Zisserman, Multiple View Geometry in Computer Vision, Cambridge Univ. Press (2nd ed. 2011).

Daniel Moreno & Gabriel Taubin, Simple, Accurate, and Robust Projector-Camera Calibration, Brown Univ., mesh.brown.edu/calibration/.

Serge Belongie, CSE 252B: Computer Vision II, Lecture 4: Planar Scenes and Homography (Apr. 7, 2004).

Merriam-Webster's Collegiate Dictionary (11th ed. 2014).

Laurenz Wiskott, Face Recognition by Elastic Bunch Graph Matching (1999).

Axis Communications, CCD and CMOS sensor technology: Technical White Paper (2010).

Jeff Meyer, What is Depth of Field? How aperture, focal length and focus control sharpness, Digital Camera World (Jul. 17, 2013), https://prism.org.gg/wp-content/uploads/2016/07/Depth-of-Field.pdf.

Brian Klug, Understanding Camera Optics & Smartphone Camera Trends, A Presentation by Brian Klug, Anandtech (Feb. 22, 2013), https://www.anandtech.com/Show/Index/6777?cPage=2&all=False&sort=0&page=2&slug=understanding-camera-optics-smartphone-camera-trends.

Portrait mode now available on iphone 7 Plus with iOS 10.1, Apple (Oct. 24, 2016).

The Timeline of Evolution of the Camera from the 1600s to 21st Century, Capture.com (May 5, 2023), https://www.capture.com/blogs/insights/evolution-of-the-camera.

John Biggs, A Nokia Camera Phone That's More Like a Camera With a Phone Attached, The New York Times (Nov. 29, 2007), ttps://www.nytimes.com/2007/11/29/technology/personaltech/29phone.html.

Zac Hall, Over a decade of selfies, starting with iPhone 4, 9to5Mac (Jul. 1, 2021), https://9to5mac.com/2021/07/01/iphone-4-selfie-celebration/.

Duane C. Brown, Decentering Distortion of Lenses, Photogrammetric Engineering (1966).

* cited by examiner

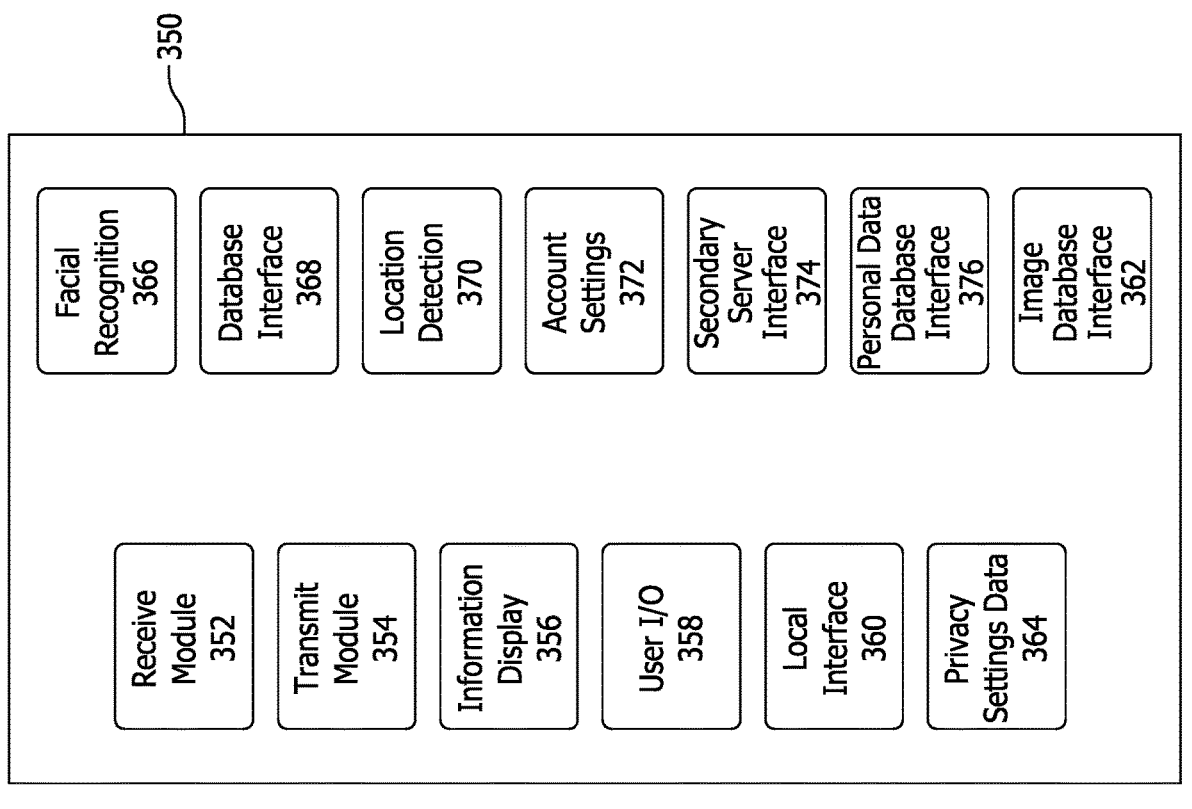

350

| Facial Recognition 366 | Receive Module 352 |
| Database Interface 368 | Transmit Module 354 |
| Location Detection 370 | Information Display 356 |
| Account Settings 372 | User I/O 358 |
| Secondary Server Interface 374 | Local Interface 360 |
| Personal Data Database Interface 376 | Privacy Settings Data 364 |
| Image Database Interface 362 | |

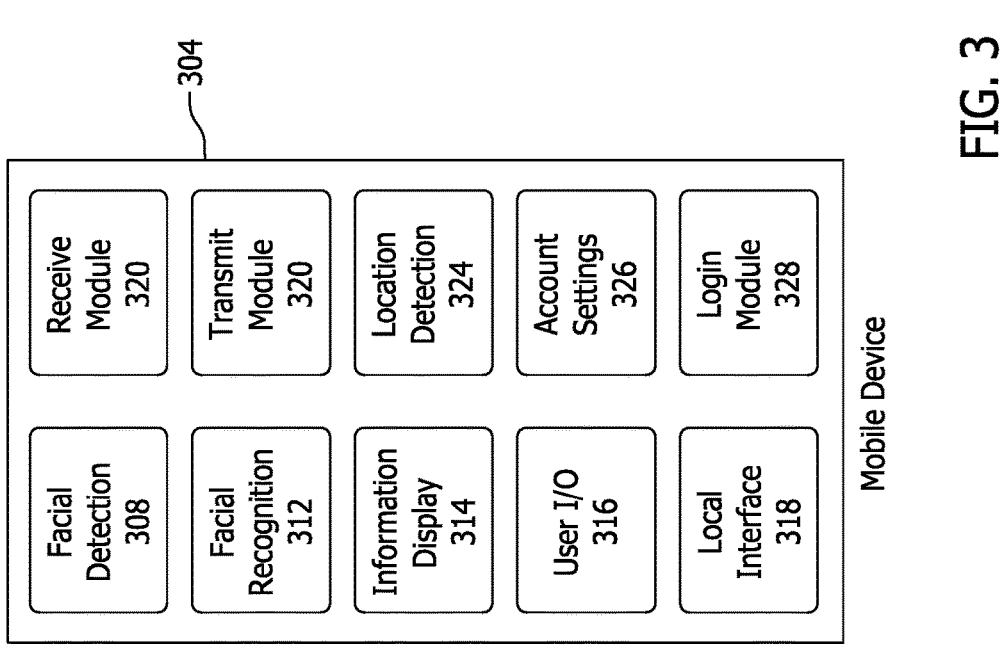

304

Mobile Device

| Receive Module 320 | Facial Detection 308 |
| Transmit Module 320 | Facial Recognition 312 |
| Location Detection 324 | Information Display 314 |
| Account Settings 326 | User I/O 316 |
| Login Module 328 | Local Interface 318 |

FIG. 3

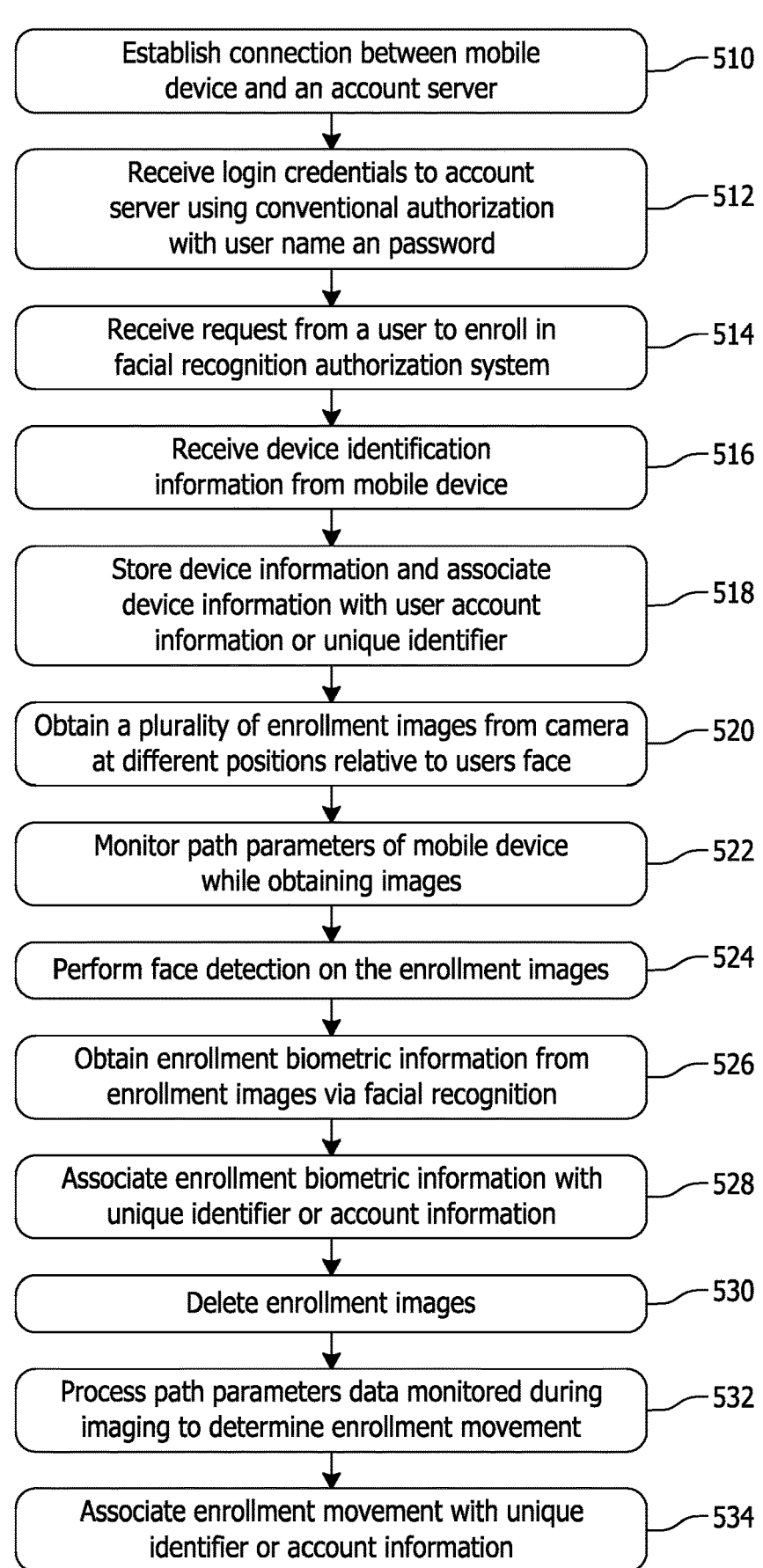

Establish connection between mobile device and an account server —510

Receive login credentials to account server using conventional authorization with user name an password —512

Receive request from a user to enroll in facial recognition authorization system —514

Receive device identification information from mobile device —516

Store device information and associate device information with user account information or unique identifier —518

Obtain a plurality of enrollment images from camera at different positions relative to users face —520

Monitor path parameters of mobile device while obtaining images —522

Perform face detection on the enrollment images —524

Obtain enrollment biometric information from enrollment images via facial recognition —526

Associate enrollment biometric information with unique identifier or account information —528

Delete enrollment images —530

Process path parameters data monitored during imaging to determine enrollment movement —532

Associate enrollment movement with unique identifier or account information —534

FIG. 5

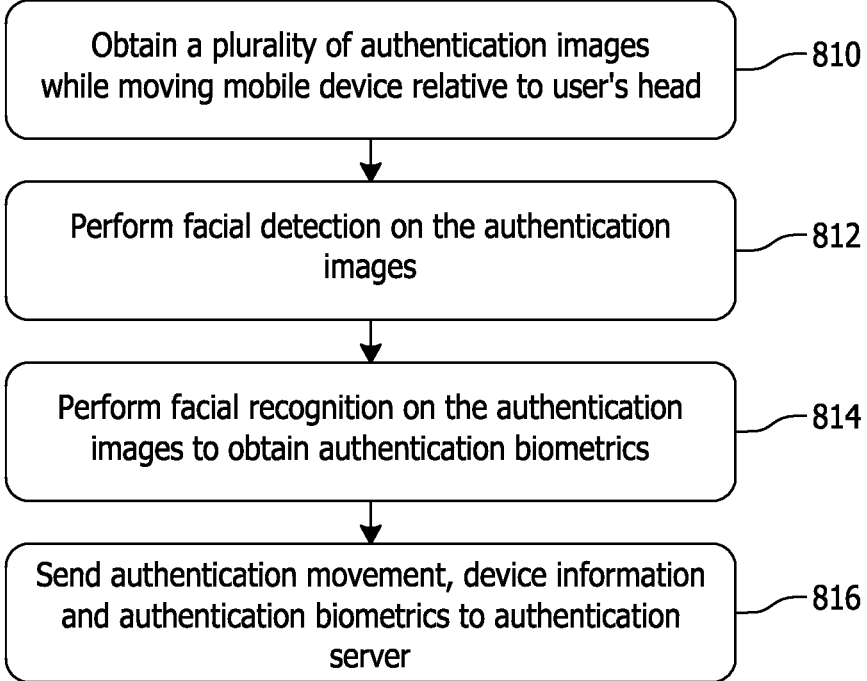

Obtain a plurality of authentication images while moving mobile device relative to user's head — 810

Perform facial detection on the authentication images — 812

Perform facial recognition on the authentication images to obtain authentication biometrics — 814

Send authentication movement, device information and authentication biometrics to authentication server — 816

Place Your Face Within
The Oval

1310

1315

1330

1335

Now Zoom In

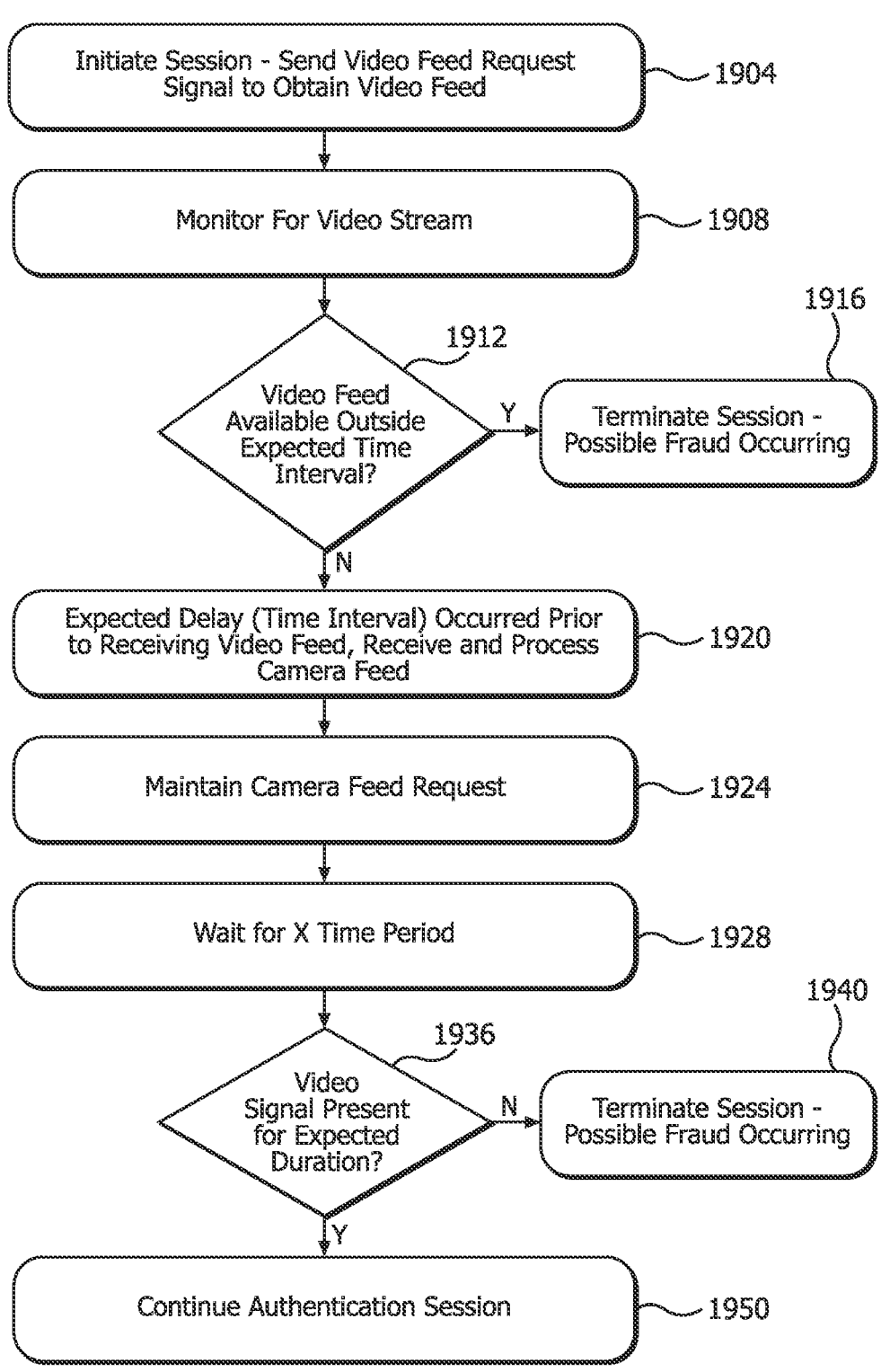

Initiate Session - Send Video Feed Request Signal to Obtain Video Feed ~ 1904

Monitor For Video Stream ~ 1908

Video Feed Available Outside Expected Time Interval? 1912

Y → Terminate Session - Possible Fraud Occurring 1916

N

Expected Delay (Time Interval) Occurred Prior to Receiving Video Feed, Receive and Process Camera Feed ~ 1920

Maintain Camera Feed Request ~ 1924

Wait for X Time Period ~ 1928

Video Signal Present for Expected Duration? 1936

N → Terminate Session - Possible Fraud Occurring 1940

Y

Continue Authentication Session ~ 1950

FIG. 19

FACIAL RECOGNITION AND/OR AUTHENTICATION SYSTEM WITH MONITORED AND/OR CONTROLLED CAMERA CYCLING

BACKGROUND

1. Field of the Invention

The disclosed embodiments relate to biometric security. More specifically, the disclosed embodiments relate to authentication systems.

2. Related Art

With the growth of personal electronic devices that may be used to access several user accounts, and the increasing threat of identity theft and other security issues, there is a growing need for ways to securely access user accounts via electronic devices. Account holders are thus often required to have longer passwords that meet various criteria such as using a mixture of capital and lowercase letters, numbers, and other symbols. With smaller electronic devices, such as smart phones, smart watches, "Internet of Things" ("IoT") devices and the like, it may become cumbersome to attempt to type such long passwords into the device each time access to the account is desired. In some instances, users may even decide to deactivate such cumbersome security measures due to their inconvenience on their devices. Thus, users of such devices may prefer other methods of secure access to their user accounts.

One other such method may be using biometrics. For example, an electronic device may have an optical reader that may scan a user's fingerprint to determine that the person requesting access to a device, or an account is authorized. However, such fingerprint systems are often prohibitively large and expensive for use on an inexpensive electronic device and are often considered unreliable and unsecure.

In addition, facial recognition is generally known and may be used in a variety of contexts. Two-dimensional facial recognition is commonly used to tag people in images on social networks or in photo editing software. Facial recognition software, however, has not been widely implemented on its own to securely authenticate users attempting to gain access to an account because it not considered secure enough. For example, two-dimensional facial recognition is considered unsecure because face images may be photographed or recorded, and then the resulting prints or video displays showing images of the user may be used to spoof the system. Accordingly, there is a need for reliable, cost-effective, and convenient method to authenticate users attempting to log in to, for example, a user account.

SUMMARY

The disclosed embodiments have been developed in light of the above, and aspects of the invention may include a method for enrolling and authenticating a user in an authentication system via a user's computing device. The user's device includes a camera and, in some instances, includes at least one movement detecting sensor, such as an accelerometer, magnetometer, and gyroscope, or the camera is used for this function.

Disclosed is a method for detecting video feed injection during an authentication session comprising initiating an authentication session which utilizes a video feed from a camera of a computing device used to capture video of a user during the authentication session. Activating the camera to obtain a video feed, monitoring for a video feed, and receiving a received video feed. Detecting a time delay between the activating the camera and the receiving the received video feed, and comparing the time delay to an expected delay or range of expected delay. If the time delay does not match an expected delay or range of expected delay, terminating the authentication session, providing a notification that the time delay to an expected delay or range of expected delay, or both.

In one embodiment, if the time delay does not match an expected delay or range of expected delay, designating the video feed to be a video injection. The video feed from the camera may be a video feed of the user's face. This method may further comprise turning off the camera, activating the camera, monitoring for a video feed to determine if a video feed was detected while the camera was off, and if a video feed was detected while the camera was off, terminating the authentication session, providing a notification that the time delay to an expected delay or range of expected delay, or both. In one embodiment, this method further comprises randomly changing a time duration between turning off the camera and turning on the camera and verifying that a video feed was not received during the random time that the camera was off. In one configuration, the computing device is a smartphone. It is contemplated that the expected delay is an amount of time that a camera takes, upon activation, to output a video feed. The method described above may cycle one or more time, such that the following steps are performed two or more times: activating the camera to obtain a video feed, monitoring for the requested video feed, receiving a video feed; detecting a time delay from requesting to receiving the video feed; and comparing the time delay to an expected delay or range of expected delay.

Also disclosed is a method for detecting a video injection instead of an actual video output from a physical camera comprising requesting, with a first request, a video feed from a physical camera, receiving the video feed in response to the first request, and turning the camera off for an amount of time. This method then monitors for a video feed while the camera is off for the amount of time before requesting, with a second request, a video feed from a physical camera after the amount of time. Determining if a video feed was received during the amount of time that the camera was off. Responsive to a video feed being received during the amount of time that the camera was off, sending a notification of a video injection detection. The notification can be sent to the user, the authentication application, or a third party entity.

It is contemplated that the amount of time comprises predetermined amount of time or a random amount of time. This method may further comprise determining a time duration between the requesting, with the first request, a video feed from a physical camera and the receiving of the video feed. Then, comparing the time duration between the requesting, with the first request, a video feed from the physical camera and the receiving of the video feed to an expected delay. Thereafter, optionally providing notification of video injection if the time duration does not match the expected delay.

In one configuration, the expected delay is an amount of time that the physical camera takes, upon receiving the request for a video feed, to output a video feed. This method may further include receiving, for a period of time, the video feed in response to the first request and determining a period of time that the video feed is received prior to the turning the camera off. Then, comparing the period time that the video feed is received to period time that the physical camera was on. Responsive to the time period that the video feed was received being different than the time period that the camera was on, sending a notification of a video injection detection.

This method could also further comprise turning the camera off for an amount of time and monitoring for a video feed while the camera is off for the amount of time. Then requesting, with a second request, a video feed from a physical camera after the amount of time and determining if a video feed was received during the amount of time that the camera was off. Responsive to a video feed being received during the amount of time that the camera was off, sending a notification of a video injection detection.

Also disclosed herein is a system for detecting video injection during an authentication session. The system comprises a computing device having a camera, screen, processor, and memory configured with non-transitory machine readable code that is executable by the processor. The machine readable code is configured to request, with a first request, a video feed from a physical camera and receive the video feed in response to the first request. Detect or determine the time difference between requesting the video feed from the camera and receiving the video feed and then compare the time difference to an expected time difference window or range associated with camera activation time. If the time difference is outside the expected time difference range, stop the authentication session. Thereafter, turn the camera off for an amount of time and monitor for a video feed while the camera is off for the amount of time. If a video feed is received while the camera is off, stopping the authentication session. Thereafter, requesting, with a second request, a video feed from a physical camera after the amount of time.

In one embodiment, the amount of time comprises a random amount of time which changes each authentication session. It is contemplated that the expected delay is an amount of time that the physical camera takes, upon receiving the request for a video feed, to output a video feed. The machine readable code may be further configured to receive, for a period of time, the video feed in response to the first request and determine a period of time that the video feed is received prior to the turning the camera off. Then compare the period time that the video feed is received to period time that the physical camera was on. Responsive to the time period that the video feed was received being different then the time period that the camera was on, send a notification of a video injection detection.

The machine readable code may be further configured to turn the camera off for a random amount of time and monitor for a video feed while the camera is off for the random amount of time. Then, request, with a second request, a video feed from a physical camera after the amount of time and determine if a video feed was received during the random amount of time that the camera was off. Responsive to a video feed being received during the random amount of time that the camera was off, send a notification of a video injection detection.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 3 illustrates exemplary software modules that are part of the mobile device and server.

FIG. 5 shows a method for enrolling a user in a facial recognition authentication system, according to one exemplary embodiment.

FIG. 8 shows a method of providing authentication information in a facial recognition authentication system, according to one exemplary embodiment.

FIG. 19 illustrates an example method of operation that includes controlling camera feed off request duration as part of a camera feed request on/off cycling.

DETAILED DESCRIPTION OF EMBODIMENTS

A system and method for providing secure and convenient facial recognition authentication will be described below. The system and method may be achieved without the need for additional expensive biometric readers or systems while offering enhanced security over conventional facial recognition systems.

Facial Recognition Authentication Environment

Figure 1:
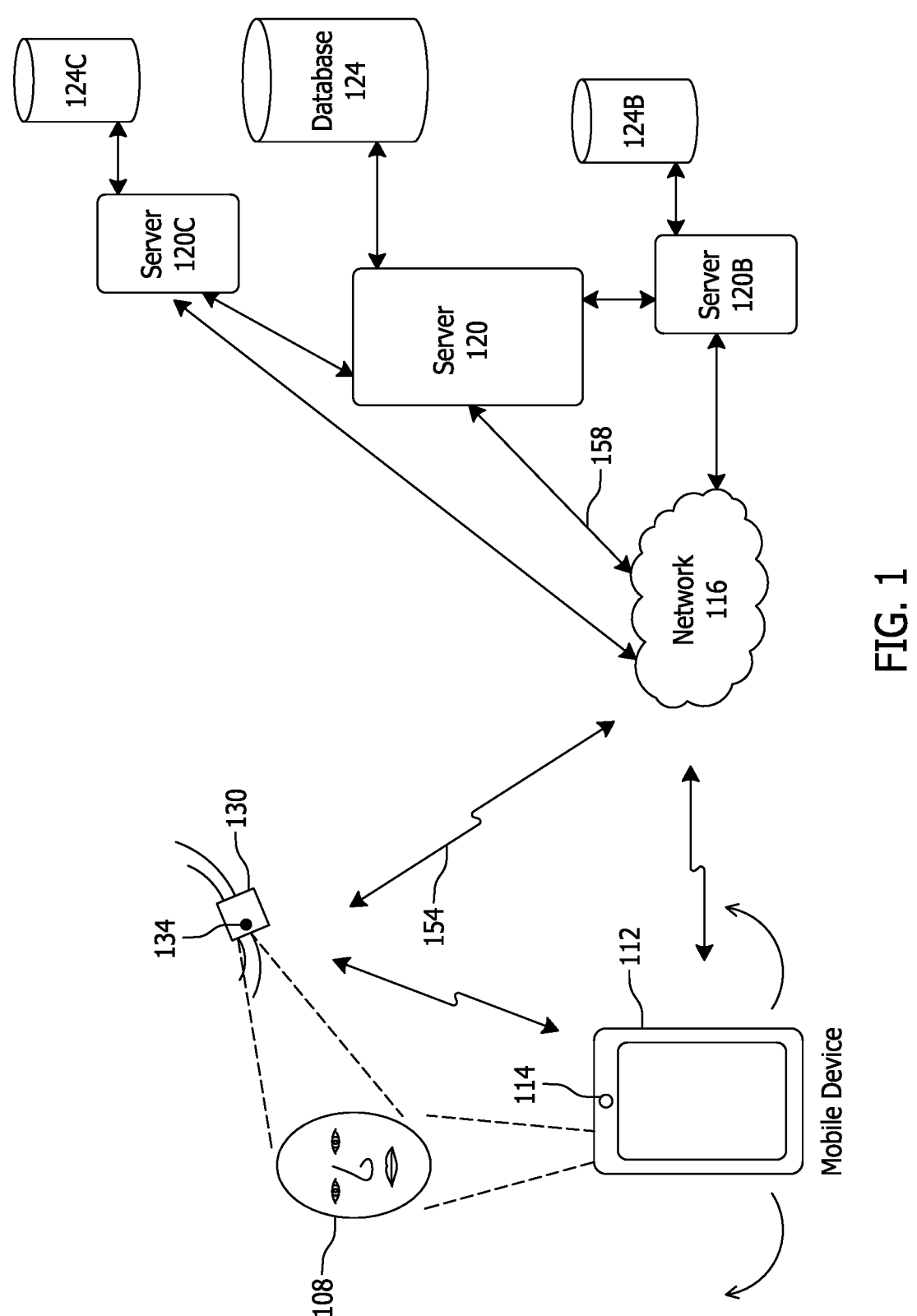
FIG. 1 illustrates an example environment of use of the facial recognition authentication system, according to one exemplary embodiment.

FIG. 1 illustrates an example environment of use of the facial recognition authentication system described herein. This is but one possible environment of use and system. It is contemplated that, after reading the specification provided below in connection with the figures, one of ordinary skill in the art may arrive at different environments of use and configurations.

In this environment, a user 108 may have a mobile device 112 which may be used to access one or more of the user's accounts via authentication systems. A user 108 may have a mobile device 112 that can capture a picture of the user 108, such as an image of the user's face. The user may use a camera 114 on or connected to the mobile device 112 to capture an image or multiple images or video of himself or herself. The mobile device 112 may comprise any type of mobile device capable of capturing an image, either still or video, and performing processing of the image or communication over a network.

In this embodiment, the user 108 may carry and hold the mobile device 112 to capture the image. The user may also wear or hold any number of other devices. For, example, the user may wear a watch 130 containing one or more cameras 134 or biosensors disposed on the watch. The camera 134 may be configured to create an image from visible light as well as infrared light. The camera 134 may additionally or alternatively employ image intensification, active illumination, or thermal vision to obtain images in dark environments.

When pointed towards a user 108, the camera 134 may capture an image of the user's face. The camera 134 may be part of a module that may either include communication capability that communicates with either a mobile device 112, such as via Bluetooth®, NFC, or other format, or communication directly with a network 116 over a wired or wireless link 154. The watch 130 may include a screen on its face to allow the user to view information. If the camera module 134 communicates with the mobile device 112, the mobile device 134 may relay communications to the network 116. The mobile device 134 may be configured with more than one front facing camera 114 to provide for a 3D or stereoscopic view, or to obtain images across different spectral ranges, such as near infrared and visible light.

The mobile device 112 is configured to wirelessly communicate over a network 116 with a remote server 120. The server 120 may communicate with one or more databases 124. The network 116 may be any type of network capable of communicating to and from the mobile device including but not limited to a LAN, WAN, PAN, or the Internet. The mobile device 112 may communicate with the network via a wired or wireless connection, such as via Ethernet, Wi-Fi, NFC, and the like. The server 120 may include any type of computing device capable of communicating with the mobile device 112. The server 120 and mobile device 112 are configured with a processor and memory and are configured to execute machine readable code or machine instructions stored in the memory.

The database 124, stored on mobile device or remote location as shown, may contain facial biometric information and authentication information of users 108 to identify the users 108 to allow access to associated user data based on one or more images or biometric information received from the mobile device 112 or watch 134. The data may be, for example, information relating to a user account or instruction to allow access to a separate account information server 120B. The term biometric data may include among other information biometric information concerning facial features (distorted or undistorted) and path parameters. Examples of path parameters may include an acceleration and speed of the mobile device, angle of the mobile device during image capture, distance of the mobile device to the user, path direction in relation to the user's face position in relation to the user, or any other type parameter associated with movement of the mobile device or the user face in relation to a camera. Other data may also be included such as GPS data, device identification information, and the like.

In this embodiment, the server 120 processes requests for identification from the mobile device 112 or user 108. In one configuration, the image captured by the mobile device 112, using facial detection, comprises one or more images of the user's face 108 during movement of the mobile device relative to the user's face, such as in a side to side or horizontal arc or line, vertical arc or line, forward and backwards from the user's face, or any other direction of motion. In another configuration, the mobile device 112 calculates biometric information from the obtained images and sends the biometric information to the server 120. In yet another embodiment, the mobile device 112 compares biometric information with stored biometric information on the mobile device 112 and sends an authentication result from the comparison to the server 120.

The data including either the image(s), biometric information, or both are sent over the network 116 to the server 120. Using image processing and image recognition algorithms, the server 120 processes the person's biometric information, such as facial data, and compares the biometric information with biometric data stored in the database 124 to determine the likelihood of a match. In other embodiments, the image processing and comparison is done on the mobile device 112, and data sent to the server indicates a result of the comparison. In further embodiments, the image processing and comparison is done on the mobile device 112 without accessing the server, for example, to obtain access to the mobile device 112 itself.

By using facial recognition processing, an accurate identity match may be established. Based on this and optionally one or more other factors, access may be granted, or an unauthorized user may be rejected. Facial recognition processing is known in the art (or is an established process) and as a result, it is not described in detail herein.

Also shown is a second server 120B with associated second database 124B, and third server 120C with associated third database 124C. The second and third database may be provided to contain additional information that is not available on the server 120 and database 124. For example, one of the additional servers may only be accessed based on the authentication of the user 108 performed by the server 120.

Executing on the mobile device 112 is one or more software applications. This software is defined herein as an identification application (ID App). The ID App may be configured with either or both of facial detection and facial recognition and one or more software modules which monitor the path parameters and/or biometric data. Facial detection as used herein refers to a process which detects a face in an image. Facial recognition as used herein refers to a process that can analyze a face using an algorithm, mapping its facial features, and converting them to biometric data, such as numeric data. The biometric data can be compared to that derived from one or more different images for similarities or dis-similarities. If a high percentage of similarity is found in the biometric data, the individual shown in the images may be considered to be a match.

With the ultimate goal of matching a face of a user to an identity or image stored in a database 124, to authenticate the user, the ID App may first process the image captured by the camera 114, 134 to identify and locate the face that is in the image. As shown in FIG. 1, there may be the face 108. The authentication may be used for logging into an online account or for numerous other access control functions.

The portion of the photo that contains the detected face may then be cropped, cut, and stored for processing by one or more facial recognition algorithms. By first detecting the face in the image and cropping only that portion of the face, the facial recognition algorithm need not process the entire image. Further, in embodiments where the facial recognition processing occurs remotely from the mobile device 112, such as at a server 120, much less image data is required to be sent over the network to the remote location. It is contemplated that the entire image, a cropped face, or only biometric data may be sent to the remote server 120 for processing.

Facial detection software can detect a face from a variety of angles. However, facial recognition algorithms are most accurate in straight on images in well-lit situations. In one embodiment, the highest quality face image for facial recognition that is captured is processed first, then images of the face that are lower quality or at different angles other than straight toward the face are then processed. The processing may occur on the mobile device or at a remote server which has access to large databases of image data or facial identification data.

The facial detection is preferred to occur on the mobile device and is performed by the mobile device software, such as the ID App. This reduces the number or size of images (data) that are sent to the server for processing where faces are not found and minimizes the overall amount of data that must be sent over the network. This reduces bandwidth needs and network speed requirements are reduced.

In another preferred embodiment, the facial detection, facial recognition, and biometric comparison all occur on the mobile device. However, it is contemplated that the facial recognition processing may occur on the mobile device, the remote server, or both.

Figure 2:
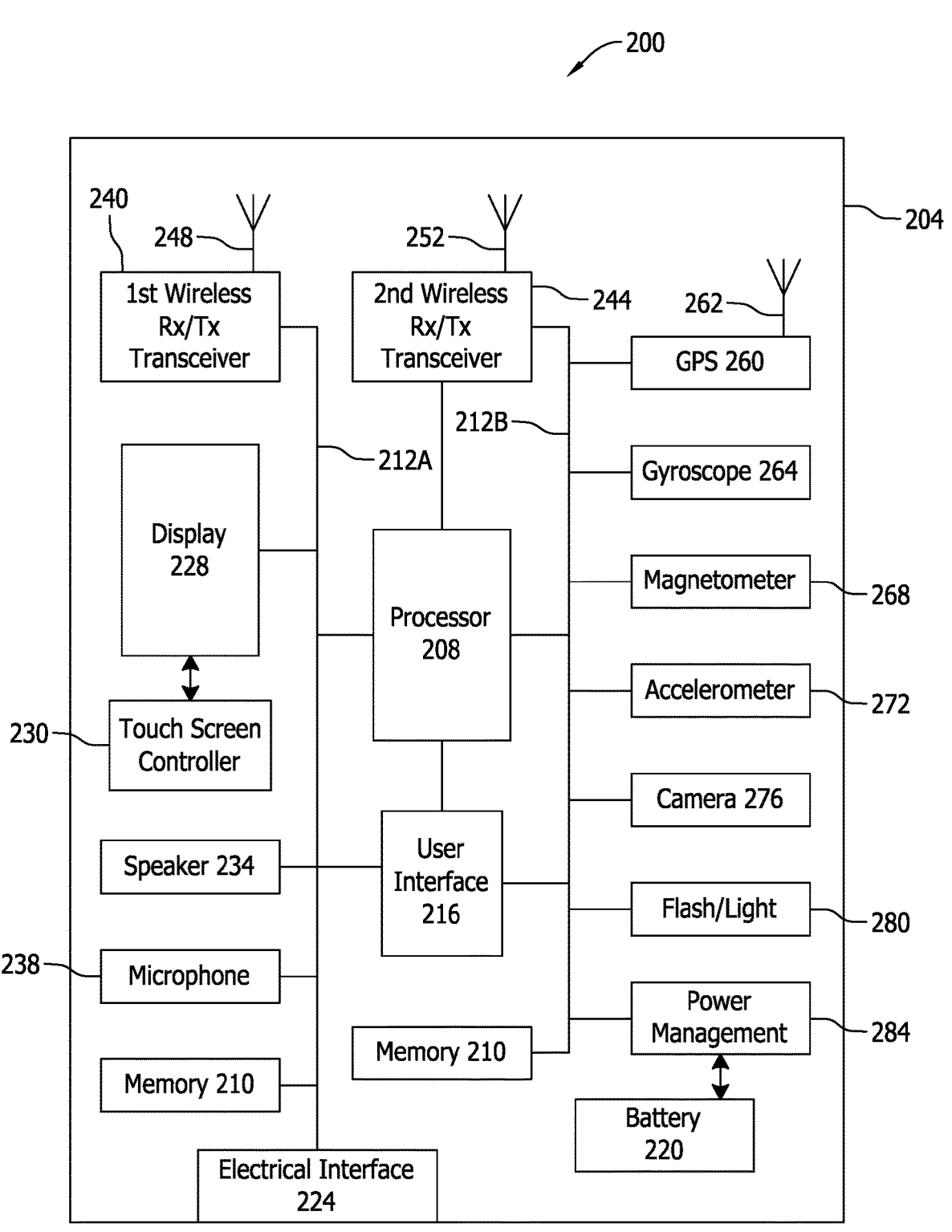
FIG. 2 illustrates an example embodiment of a mobile device.

FIG. 2 illustrates an example embodiment of a mobile device. This is but one possible mobile device configuration and as such it is contemplated that one of ordinary skill in the art may differently configure the mobile device. The mobile device 200 may comprise any type of mobile communication device capable of performing as described below. The mobile device may comprise a PDA, cellular telephone, smart phone, tablet PC, wireless electronic pad, an IoT device, a "wearable" electronic device or any other computing device.

In this example embodiment, the mobile device 200 is configured with an outer housing 204 configured to protect and contain the components described below. Within the housing 204 is a processor 208 and a first and second bus 212A, 212B (collectively 212). The processor 208 communicates over the buses 212 with the other components of the mobile device 200. The processor 208 may comprise any type processor or controller capable of performing as described herein. The processor 208 may comprise a general-purpose processor, ASIC, ARM, DSP, controller, or any other type processing device. The processor 208 and other elements of the mobile device 200 receive power from a battery 220 or other power source. An electrical interface 224 provides one or more electrical ports to electrically interface with the mobile device, such as with a second electronic device, computer, a medical device, or a power supply/charging device. The interface 224 may comprise any type electrical interface or connector format.

One or more memories 210 are part of the mobile device 200 for storage of machine readable code for execution on the processor 208 and for storage of data, such as image data, audio data, user data, medical data, location data, accelerometer data, or any other type of data. The memory 210 may comprise RAM, ROM, flash memory, optical memory, or micro-drive memory. The machine-readable code as described herein is non-transitory.

As part of this embodiment, the processor 208 connects to a user interface 216. The user interface 216 may comprise any system or device configured to accept user input to control the mobile device. The user interface 216 may comprise one or more of the following: keyboard, roller ball, buttons, wheels, pointer key, touch pad, and touch screen. A touch screen controller 230 is also provided which interfaces through the bus 212 and connects to a display 228.

The display comprises any type display screen configured to display visual information to the user. The screen may comprise a LED, LCD, thin film transistor screen, OEL CSTN (color super twisted nematic), TFT (thin film transistor), TFD (thin film diode), OLED (organic light-emitting diode), AMOLED display (active-matrix organic light-emitting diode), capacitive touch screen, resistive touch screen or any combination of these technologies. The display 228 receives signals from the processor 208 and these signals are translated by the display into text and images as is understood in the art. The display 228 may further comprise a display processor (not shown) or controller that interfaces with the processor 208. The touch screen controller 230 may comprise a module configured to receive signals from a touch screen which is overlaid on the display 228.

Also part of this exemplary mobile device is a speaker 234 and microphone 238. The speaker 234 and microphone 238 may be controlled by the processor 208. The microphone 238 is configured to receive and convert audio signals to electrical signals based on processor 208 control. Likewise, the processor 208 may activate the speaker 234 to generate audio signals. These devices operate as is understood in the art and as such are not described in detail herein.

Also connected to one or more of the buses 212 is a first wireless transceiver 240 and a second wireless transceiver 244, each of which connect to respective antennas 248, 252. The first and second transceiver 240, 244 are configured to receive incoming signals from a remote transmitter and perform analog front-end processing on the signals to generate analog baseband signals. The incoming signal maybe further processed by conversion to a digital format, such as by an analog to digital converter, for subsequent processing by the processor 208. Likewise, the first and second transceiver 240, 244 are configured to receive outgoing signals from the processor 208, or another component of the mobile device 208, and up convert these signal from baseband to RF frequency for transmission over the respective antenna 248, 252. Although shown with a first wireless transceiver 240 and a second wireless transceiver 244, it is contemplated that the mobile device 200 may have only one such system or two or more transceivers. For example, some devices are tri-band or quad-band capable, or have Bluetooth®, NFC, or other communication capability.

It is contemplated that the mobile device, and hence the first wireless transceiver 240 and a second wireless transceiver 244 may be configured to operate according to any presently existing or future developed wireless standard including, but not limited to, Bluetooth, WI-FI such as IEEE 802.11 a, b, g, n, wireless LAN, WMAN, broadband fixed access, WiMAX, any cellular technology including CDMA, GSM, EDGE, 3G, 4G, 5G, TDMA, AMPS, FRS, GMRS, citizen band radio, VHF, AM, FM, and wireless USB.

Also part of the mobile device is one or more systems connected to the second bus 212B which also interface with the processor 208. These devices include a global positioning system (GPS) module 260 with associated antenna 262. The GPS module 260 can receive and process signals from satellites or other transponders to generate location data regarding the location, direction of travel, and speed of the GPS module 260. GPS is generally understood in the art and hence not described in detail herein. A gyroscope 264 connects to the bus 212B to generate and provide orientation data regarding the orientation of the mobile device 204. A magnetometer 268 is provided to provide directional information to the mobile device 204. An accelerometer 272 connects to the bus 212B to provide information or data regarding shocks or forces experienced by the mobile device. In one configuration, the accelerometer 272 and gyroscope 264 generate and provide data to the processor 208 to indicate a movement path and orientation of the mobile device.

One or more cameras (still, video, or both) 276 are provided to capture image data for storage in the memory 210 and/or for possible transmission over a wireless or wired link or for viewing later. The one or more cameras 276 may be configured to detect an image using visible light and/or near-infrared light. The cameras 276 may also be configured to utilize image intensification, active illumination, or thermal vision to obtain images in dark environments. The processor 208 may process image data to perform image recognition, such as in the case of, facial detection, item detection, facial recognition, item recognition, or bar/box code reading.

A flasher and/or flashlight 280, such as an LED light, are provided and are processor controllable. The flasher or flashlight 280 may serve as a strobe or traditional flashlight. The flasher or flashlight 280 may also be configured to emit near-infrared light. A power management module 284 interfaces with or monitors the battery 220 to manage power consumption, control battery charging, and provide supply voltages to the various devices which may require different power requirements.

FIG. 3 illustrates exemplary software modules that are part of the mobile device and server. Other software modules may be provided to provide the functionality described below. It is provided that for the functionality described herein there is matching software (non-transitory machine-readable code, machine executable instructions or code) configured to execute the functionality. The software would be stored on a memory and executable by a processor.

In this example confirmation, the mobile device 304 includes a receive module 320 and a transmit module 322. These software modules are configured to receive and transmit data to remote device, such as cameras, glasses, servers, cellular towers, or WIFI system, such as router or access points.

Also part of the mobile device 304 is a location detection module 324 configured to determine the location of the mobile device, such as with triangulation or GPS. An account setting module 326 is provided to establish, store, and allow a user to adjust account settings. A log in module 328 is also provided to allow a user to log in, such as with password protection, to the mobile device 304. A facial detection module 308 is provided to execute facial detection algorithms while a facial recognition module 321 includes software code that recognizes the face or facial features of a user, such as to create numeric values which represent one or more facial features (facial biometric information) that are unique to the user.

An information display module 314 controls the display of information to the user of the mobile device. The display may occur on the screen of the mobile device or watch. A user input/output module 316 is configured to accept data from and display data to the user. A local interface 318 is configured to interface with other local devices, such as using Bluetooth® or other shorter-range communication, or wired links using connectors to connected cameras, batteries, data storage elements. All of the software (with associated hardware) shown in the mobile device 304 operate to provide the functionality described herein.

Also shown in FIG. 3 is the server software module 350. These modules are located remotely from the mobile device and can be located on any server or remote processing element. As is understood in the art, networks and network data use a distributed processing approach with multiple servers and databases operating together to provide a unified server. As a result, it is contemplated that the module shown in the server block 350 may not all be located at the same server or at the same physical location.

As shown in FIG. 3, the server 350 includes a receive module 352 and a transmit module 354. These software modules are configured to receive and transmit data to remote devices, such as cameras, watches, glasses, servers, cellular towers, or WIFI systems, such as router or access points.

An information display module 356 controls a display of information at the server 350. A user input/output module 358 controls a user interface in connection with the local interface module 360. Also located on the server side of the system is a facial recognition module 366 that is configured to process the image data from the mobile device. The facial recognition module 366 may process the image data to generate facial data (biometric information) and perform a compare function in relation to other facial data to determine a facial match as part of an identify determination.

A database interface 368 enables communication with one or more databases that contain information used by the server modules. A location detection module 370 may utilize the location data from the mobile device 304 for processing and to increase accuracy. Likewise, an account settings module 372 controls user accounts and may interface with the account settings module 326 of the mobile device 304. A secondary server interface 374 is provided to interface and communicate with one or more other servers.

One or more databases or database interfaces are provided to facilitate communication with and searching of databases. In this example embodiment the system includes an image database that contains images or image data for one or more people. This database interface 362 may be used to access image data users as part of the identity match process. Also part of this embodiment is a personal data database interface 376 and privacy settings data module 364. These two modules 376, 364 operate to establish privacy setting for individuals and to access a database that may contain privacy settings.

Authentication System

Figure 4:
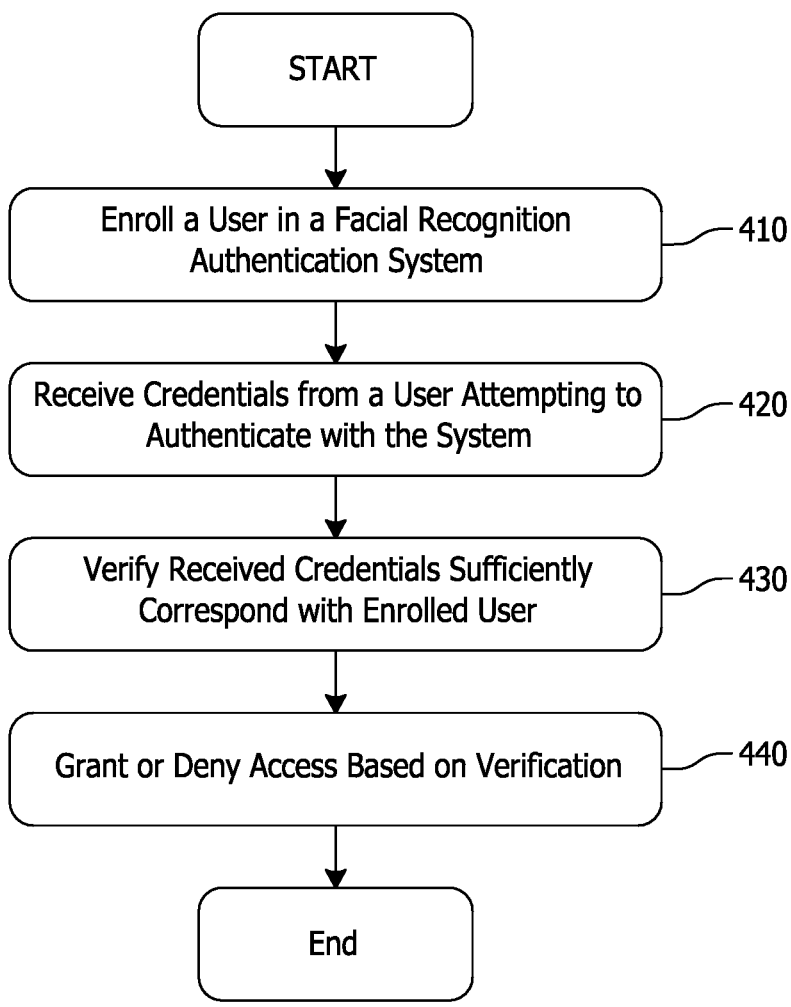
FIG. 4 shows a method for performing facial recognition authentication according to one embodiment.

An authentication system with path parameters that is operable in the above described environment and system will now be described in connection with FIG. 4. FIG. 4 shows a method for performing facial recognition authentication with path parameters according to one embodiment of the invention. As will be described in more detail below, the system utilizes the features of the mobile device 112 and server 120 defined above to generate a secure and convenient login system as one example of an authentication system. This reduces the burden of the user having to type in complex passwords onto a small screen of a mobile device, prevents fraud through means such as key logging or screen shot captures, and increases security by combining several path parameters and/or device parameters which must be met before user is authenticated.

In step 410, the system enrolls a user in the facial recognition authentication system. In one embodiment, an authentication server, such as the server 120 (FIG. 1), may be configured to authenticate a user to allow access to a user's account, such as a bank or other account, via the mobile device 112. The authentication server 120 may be included as a part of a server of the institution or entity providing user accounts (hereinafter "account server"), or the authentication server may be provided separately. For example, in the environment shown in FIG. 1, Servers 120B and 120C may represent account servers. In other embodiments, the account server and the authentication server are one in the same. In one embodiment, the authentication server 120 may provide an authentication application to the user for installation on the mobile device 112.

An enrollment process according to one embodiment will be described with reference to FIG. 5. In this embodiment, a user via a mobile device 112 establishes a connection between the mobile device 112 and the account server 120B in step 510. As just one example, the user may establish a connection with a server of a financial institution such as a bank, or this connection may occur later in the process after authentication. The user then provides typical login information to authenticate the user, such as a username and password for a financial account in step 512. In step 514, the user may next receive a prompt at the mobile device 112 to enroll in the facial recognition authentication system. The user then, via the user interface, indicates that he or she would like to set up the authentication system in response to the prompt.

Next, in step 516, the mobile device 112 may send device information to the authentication server 120. The device information may include among other information a device identifier that uniquely identifies the mobile device of the user. Such information may include device manufacturer, model number, serial number, and mobile network information. In step 518, when the authentication server 120 is incorporated with the account server 120B, the authentication server 120 associates and stores the device information with the user's account information. When the authentication server 120 is separate from the account server 120B, the account server 120B may generate a unique identifier related to the account information and send the unique identifier to the authentication server 120. The authentication server 120 may associate the device information and the unique identifier with each other and may store the information in a database 124.

The user is next prompted to provide a plurality of images of his or her face using a camera 114 on the mobile device 112 (hereinafter, "enrollment images") in step 510. The enrollment images of the user's face are taken as the user holds the mobile device and moves the mobile device to different positions relative to his or her head and face. Thus, the enrollment images of the user's face are taken from many different angles or positions. Furthermore, the path parameters of the mobile device are monitored and recorded for future comparison in step 522. Some non-limiting examples of how a user might hold a mobile device and take a plurality of images of her face is shown in FIGS. 6A-7B.

Figure 6A:
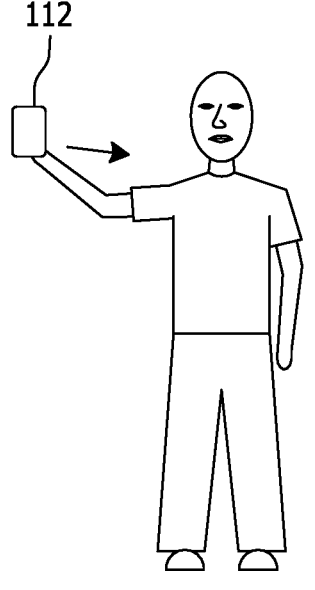
FIGS. 6A and 6B show an example of movement of a mobile device about a user's face according to one exemplary embodiment.
Figure 6B:
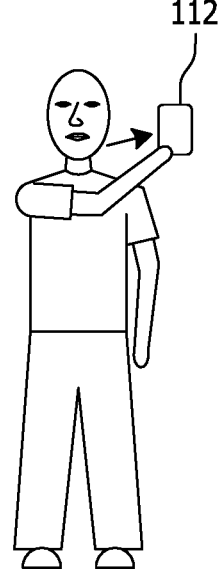
Figure 7A:
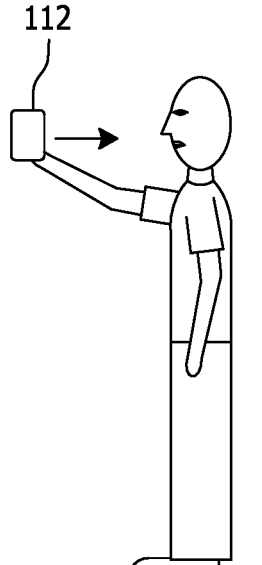
FIGS. 7A and 7B show an example of movement of a mobile device about a user's face according to one exemplary embodiment.
Figure 7B:
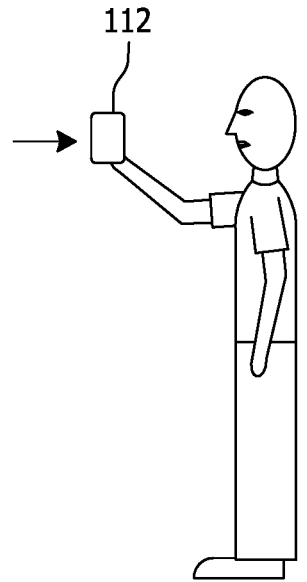

In FIGS. 6A and 6B, the user holds the mobile device 112 on one side of his or her face and moves the mobile device 112 in an arc like path horizontally about his or her face until the mobile device 112 is on the other side of her or her face. In FIGS. 7A and 7B, the user holds the mobile device 112 far away from his or her face, and then brings the mobile device 112 forward closer to his or her face. Of course, any number of other paths may be used in addition to those shown in FIGS. 6A-7B. Additionally, the user may move his or her head while the camera is held fixed. The user could also hold the camera steady and move their head in relation to the camera. This method thus can be implemented with a webcam on a laptop or desktop, or on any other device, such as an IoT device where a camera is mounted on a similarly stationary location or object.

The enrollment images may be obtained as follows. The user holds and orients a mobile device 112 with a camera 114 so that the camera 114 is positioned to image the user's face. For example, the user may use a front facing camera 114 on a mobile device 112 with a display screen and may confirm on the display screen that his or her face is in position to be imaged by the camera 114.

Once the user has oriented the device, the device may begin obtaining the enrollment images of the user. In one embodiment, the user may press a button on the device 112 such as on a touchscreen or other button on the device to initiate the obtaining of the enrollment images. The user then moves the mobile device to different positions relative to his or her head as the device images the user's face from a plurality of angles or positions as described above. When the above-mentioned front-facing camera is used, the user may continually confirm that his or her face is being imaged by viewing the imaging on the display screen. The user may again press the button to indicate that the imaging is completed. Alternatively, the user may hold the button during imaging, and then release the button to indicate that imaging is complete.

As described above, the mobile device 112 may include face detection. In this embodiment in step 524, the mobile device may detect the user's face in each of the enrollment images, crop the images to include only the user's face, and send, via a network, the images to the authentication server 120. In step 526, upon receipt of the enrollment images, the authentication server 120 performs facial recognition on the images to determine biometric information ("enrollment biometrics") for the user. The authentication server 120 may then associate the enrollment biometrics with the device information and the unique identifier (or account information) and stores the biometric information in the database 124 in step 528. For added security, in step 530, the mobile device 112 and the authentication server 120 may be configured to delete the enrollment images after the enrollment biometrics of the user are obtained.

In another embodiment, the mobile device 112 may send the images to the authentication server 120 without performing face detection. The authentication server 120 may then perform the face detection, facial recognition, and biometric information processing. In another embodiment, the mobile device 112 may be configured to perform the facial detection, facial recognition, and biometric processing, and then send the results or data resulting from the processing to the authentication server 120 to be associated with the unique identifier or user account. This prevents sensitive personal data (images) from leaving the user's device. In yet another embodiment, the mobile device 112 may perform each of the above-mentioned steps, and the mobile device 112 may store the enrollment information without sending any of the enrollment biometrics or images to the server.

In one embodiment, the mobile device's gyroscope, magnetometer, and accelerometer are configured to generate and store data while the user moves the mobile device about his or her head to obtain the enrollment images (path parameters). The mobile device may process this data in step 532 to determine a path or arc in which the mobile device moved while the user imaged his or her face ("enrollment movement"). By using data from the accelerometer, magnetometer, and gyroscope, the system may check when a user is ready to begin scanning himself/herself, as well as determining the scan path. The data is thus used to determine when to start and stop the scan interval. The data may additionally include the time elapsed during scanning. This time may be measured from the user pressing the button to start and stop the imaging or may be measured from the duration the button is held down while imaging, or during more movement or to complete sweep.

The enrollment movement of the mobile device 112 (which is data that defined the movement of the mobile device during image capture) may be sent to the authentication server 120. The authentication server 120 associates and stores the enrollment movement, the enrollment biometrics, the device information, and the unique identifier or account information. Alternatively, the data generated by the gyroscope, magnetometer, and accelerometer may be sent to the server 120, and the server 120 may process the data to determine the enrollment movement. In another embodiment, the enrollment movement may be stored on the mobile device 112, such that all enrollment information is maintained on the mobile device 112.

Thus, in the above described embodiment, the enrollment information may thus comprise the device information, the enrollment biometrics, and the enrollment movement (based on movement of the mobile device 112).

Returning to FIG. 4, once enrollment is complete, the authentication server 120 may later receive credentials from a user attempting to authenticate with the system as shown in step 420. For example, a user may attempt to log in to a user account. When a user attempts to log in, instead of or in addition to providing typical account credentials such as user name and password, the user may again take a plurality of images or video of his or her face as the mobile device 112 is held in the hand and moved to different positions relative to the head ("authentication images") in the same manner as was done during enrollment (such as shown in FIGS. 6A-7B). In this manner, the user may provide the necessary images (the term images include video as video is a succession of images) from many different angles and/or positions, and may provide path parameters of the device while obtaining the images ("authentication movement") to both confirm the identity of the user as well as the liveness and realness of that individual to ensure it is not a video, screen shot, or other representation of the person.

In one embodiment outlined in FIG. 8, the user via the mobile device 112 obtains several authentication images in step 810 while moving the mobile device 112 to different positions relative to the user's head. Using facial detection in step 812, the mobile device 112 detects the user's face in each of the authentication images, crops the images, and sends the images to the authentication server 120. In another embodiment, the mobile device 112 sends the images to the server 124, and the server 124 performs facial detection. In step 814, the authentication routing 120 may perform facial recognition on the authentication images to obtain biometric information ("authentication biometrics"). In another embodiment, the mobile device 112 performs facial recognition to obtain the authentication biometrics and sends the authentication biometrics to the server 120.

In step 816, the mobile device 112 sends the device information identifying the device and sends path parameters such as gyroscope, magnetometer, and accelerometer information defining the path of the mobile device taken during imaging, as well as the elapsed time during imaging ("authentication movement") to the server 120. The credentials received by the authentication server 120 for a login in the facial recognition system may thus comprise the device information, the authentication images or the authentication biometrics, and the authentication movement (path parameters).

Figure 9:
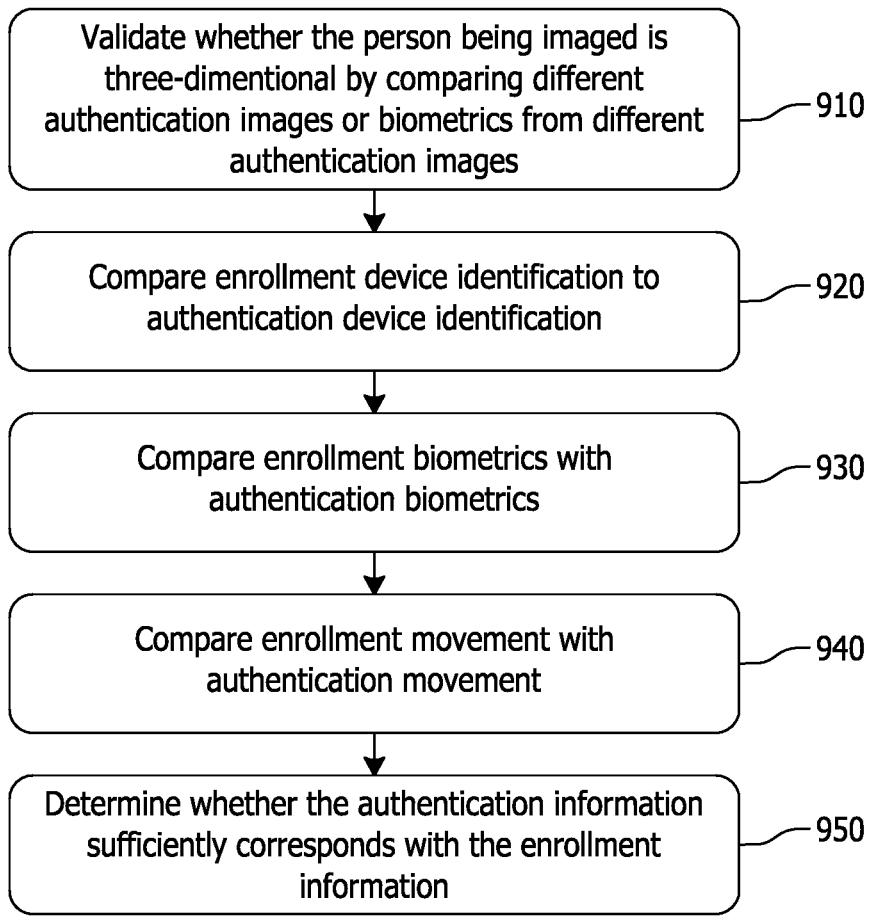
FIG. 9 shows a method of verifying authentication credentials in a facial recognition authentication system, according to one exemplary embodiment.

Returning to FIG. 4, in step 430, the authentication server 120 verifies that the credentials received from the mobile device 112 sufficiently correspond with the information obtained during enrollment. For example, as shown in step 910 in FIG. 9, by using algorithms to process the characteristics of the face and light striking the face between the different images, the authentication server 120 can determine that the face in the authentication images is three-dimensional, i.e., not a representation on a printed picture or video screen. Where the mobile device 120 sends only the authentication biometrics 120 to the server, the server 120 may validate the realness or three-dimensional aspects of the user imaged by comparing the biometric results of the different images.

In step 920, the authentication server 120 may then compare the login credentials with the information stored from the enrollment process. In step 920, the server 120 compares the identification of the device obtained during the login process to that stored during enrollment. In step 930, the authentication biometrics may be compared with the enrollment biometrics to determine whether they sufficiently correspond with the enrollment biometrics. In step 940, the authentication movement may be compared with the enrollment movement to determine whether it sufficiently corresponds with the enrollment movement.

In some embodiments, a copy of the enrollment information may be stored on the mobile device 112, and the mobile device 112 may verify that the credentials received on the mobile device 112 sufficiently correspond with the enrollment information. This would allow a user to secure documents, files, or applications on the mobile device 112 itself in addition to securing a user's account hosted on a remote device, such as the authentication server 120, even when a connection to the authentication server 120 may be temporarily unavailable, such as when a user does not have access to the Internet. Further, this would allow the user to secure access to the mobile device 112 itself. Or enrollment info may be stored on server.

Accordingly, in step 950, if the authentication server 120 or mobile device 112 determines that the enrollment information sufficiently corresponds with the credentials received, then the server or mobile device may verify that the identification of the user attempting login corresponds the account holder. This avoids the cumbersome process of the user having to manually type in a complex password using the small screen of the mobile device. Many passwords now require capital, non-text letter, lower case, and numbers.

The level of correspondence required to determine that the enrollment information sufficiently corresponds with the authentication information in the login attempt may be set in advance. For example, the level of correspondence may be a 99.9% match rate between the enrollment biometrics and the authentication biometrics and a 90% match rate between the enrollment movement and the authentication movement. The required level of correspondence may be static or elastic based on the established thresholds.

For example, the required level of correspondence may be based on GPS information from the mobile device 112. In one embodiment, the authentication server 120 may require a 99.9% match rate as the level of correspondence when the GPS information of the mobile device corresponds with the location of the user's home or other authorized location(s). In contrast, if the GPS information shows the device is in a foreign country far from the user's home, the authentication server may require a 99.99% match rate as the level of correspondence or may be denied entirely. Hence, the required match between pre-stored authentication data (enrollment information) and presently received authentication data (authentication information) is elastic in that the required percentage match between path parameters or images my change depending on various factors, such as time of day, location, frequency of login attempt, date, or any other factor.

The required level of correspondence may additionally depend on time. For instance, if a second authentication attempt is made shortly after a first authentication attempt in a location far from the first authentication location based on GPS information from the mobile device 112, the level of correspondence threshold may be set higher. For example, a user can not travel from Seattle to New York in 1 hour. Likewise, login attempts at midnight to three in the morning may be a sign of fraud for some users based on patterns of the users' usage.

The level of correspondence between the enrollment information and the authentication information may be the result of compounding the various parameters of the enrollment information and the authentication information. For example, when the button hold time in the authentication information is within 5% of the button hold time of the enrollment information, the correspondence of the button hold time may constitute 20% of the overall match. Similarly, when the motion path trajectory of the authentication information is within 10% of the enrollment information, the motion path trajectory may constitute 20% of the overall match. Further parameter match rates such as the face size and facial recognition match in the authentication information as compared to the enrollment information may constitute the remaining 10% and 50% of the overall level of correspondence. In this manner, the total overall level of correspondence may be adjusted (total of all parameters being more than 75%, for example), or the match rate of individual parameters may be adjusted. For example, on a second attempted login, the threshold match rate of one parameter may be increased, or the overall level of correspondence for all parameters may be increased. The threshold match rates may also be adjusted based on the account being authenticated or other different desired levels of security.

Returning to FIG. 4, in step 440, the authentication server 120 may grant or deny access based on the verification in step 430. For example, if the authentication server 120 verifies that the credentials match the enrollment information, then the server 120 may authenticate the user to allow access to the user's account. In the instance where the authentication server 120 is separate from the account server 120B (such as a bank's server), the authentication server 120 may transmit the unique identifier to the account server along with an indication that the identity of the user associated with the unique identifier has been verified. The account server 120B may then authorize the user's mobile device 112 to transmit and receive data from the account server 120B. Of course, all this may occur at only the account server 120B or on the mobile device 112 itself.

Alternatively, if the credentials provided by the user are not verified, the authentication server may transmit a message to display on the screen of the mobile device 112 indicating that the login attempt failed. The authentication server 120 may then allow the user to try again to log in via the facial recognition login system, or the authentication server 120 may require the user to enter typical account credentials, such as a username and password.

In one embodiment, the server 120 may allow three consecutive failed login attempts before requiring a username and password. If in one of the attempts, the required level of correspondence is met, then the user may be verified, and access may be granted. According to one embodiment, the authentication server 120 may retain the information from each successive authentication attempt and combine the data from the multiple authentication attempts to achieve more accurate facial biometric information of the person attempting to authenticate. In addition, the level of correspondence may be increased at each successive attempt to authenticate. In addition, by averaging the path data (authentication movement) and/or image data (authentication images/biometrics) from several login attempts, the login data (enrollment information) is perfected and improved.

Accordingly, the above described authentication system allows for authentication to a remote server 120 or on the mobile device 112 itself. This may be accomplished as described above by the mobile device 112 capturing the authentication credentials, and the authentication server 120 processing and analyzing the credentials compared to the enrollment information (cloud processing and analysis); the mobile device 112 capturing the authentication credentials and processing the credentials, and the authentication server 120 analyzing the credentials compared to the enrollment information (mobile device processing, cloud analysis); or the mobile device 112 capturing the authentication credentials, and processing and analyzing the credentials compared to the enrollment information (mobile device processing and analysis).

Advantages and Features of the Embodiments

The above described system provides several advantages. As one advantage, the facial recognition authentication system provides a secure login. For example, if during a login attempt the camera of the mobile device imaged a digital screen displaying a person rotating their head while the phone was not moving, the accelerometer, magnetometer, and gyroscope data would not detect any motion. Thus, the enrollment movement and the authentication movement would not correspond, and the login attempt would be denied.

In addition, because a plurality of images are used as enrollment images and authentication images, histograms or other photo manipulation techniques may be used to determine if a digital screen is present in place of a human face in the images. For example, the system may check for light frequency, changes in the captured images, or banding in an image which would indicate an electronic display generated the image, backlighting, suspicious changes in lighting, or conduct other analyses on the images by comparing the images to determine that the actual live user is indeed alive, present, and requesting authorization to login.

As yet another advantage, as explained above, not only must the enrollment biometrics sufficiently correspond to the authentication biometrics, but also the enrollment movement must match the authentication movement, and the device information must match the enrollment device information. For example, an application may be downloaded to a mobile device that has a digital camera. The application may be a login application or may be an application from a financial institution or other entity with which the user has an account. The user may then login to the application using typical login credential such as a website username and password. Further, the user may have a device code from logging in on another device or may use the camera to scan QR code or other such code to pair the device to their user account.

The user then holds the mobile device to move the mobile phone to different positions relative to his or her head while keeping his or her face visible to the camera as it is moved. As the mobile device is moved, the camera takes the enrollment images of the face. During imaging, the speed and angle of the current user's mobile device movement is measured using the accelerometer, magnetometer, and gyroscope to generate the enrollment movement. Further continuous imaging and detection of the face throughout the process has been shown to prevent fraud. This is because a fraud attempt cannot be made by rotating images in and out of the front of the camera.

For example, a user may start the movement from right to left or from left to right as shown in FIGS. 6A and 6B. The movement may also be in a front and back direction as shown in FIGS. 7A and 7B. Any other movement may be utilized such as starting in the center, then going right, and then going back to center. Vertical and diagonal movements may also be used to further compound the complexity of the enrollment movement. When the user then later attempts login, the user must repeat the motion pattern in the authentication movement to match the enrollment movement in addition to the biometric data and device information matching. Thus, the security of the system is greatly enhanced.

The system therefore provides enhanced security for authenticating a user who has a mobile device. As explained above, the system may use at least any one or more of the following in any number of combinations to securely authenticate the user: physical device verification, mobile network verification, facial recognition including the size of the face in the image, a face detected in every frame during the movement, accelerometer information, gyroscope information, magnetometer information, pixels per square inch, color bits per pixel, type of image, user entered code or pattern, and GPS information.

As another advantage, the facial recognition login system provides a convenient manner for a user to login to an account with a mobile device. For example, once enrolled, a user does not need to enter a username and password on the small mobile device each time the user wishes to access the account. Instead, the user simply needs to image himself or herself while mimicking the enrollment movement with the mobile device. This is especially advantageous with smaller mobile devices such as mobile phones, smart watches, and the like. It also saves time, eliminates lost or forgotten passwords, prevents others from spying on passwords as they are entered, and reduces error caused by typing.

The system may be further configured to allow a user to securely log on to multiple devices, or to allow users to securely share devices. In one embodiment, the enrollment information may be stored on an authentication server (or on "the cloud") and thus is not associated only with the user's original device. This allows the user to use any number of suitable devices to authenticate with the authentication server. In this manner, a user may use a friend's phone (third party device) or other device to access his or her information, such as account information, address book information, email or other messaging, etc. by performing the authentication operation on any device.

For example, the user may provide an email address, username code, or similar identifier on the friend's phone such that the authentication server compares the login information with enrollment information for the user's account. This would indicate to the authentication server which authentication profile to use, but does not by itself allow access to the user's data, accounts, or tasks. Upon logging out of a friend's phone, access to the user's information on the friend's phone is terminated. The provides the benefit of allowing a user to securely access account or other authentication accessible information or tasks using any device without having to type the user's password into the third-party device, where it could be logged or copied. In a sense, the user is the password such that the user's facial features and stored facial data is the stored password and by providing the user's face to the camera, the user is providing the password.

Such a system may also be implemented without storing the user's enrollment information on the remote server, but instead maintaining enrollment information on the user's device. For example, when the user requests to log in to third-party device, the authentication server may send an authentication request to the user's device. The user may then authenticate the action using the above described system by providing authentication images and authentication movement to the user's device. The user's device then authenticates the user based on the enrollment information stored on the user's device. This data could be stored in the application or other secure location and highly encrypted. The user's device provides verification of whether the authentication was successful to the authentication server, whereupon the authentication server authenticates the user on the third-party device.

Through cloud-based authentication, a single user may also securely transfer data between authenticated devices. In one embodiment, a user may own a first device, such as a mobile phone, and is authenticated on the first device via the authentication system. The user may then acquire a new device, such as a new phone, tablet computer, or other device. Using the cloud-based authentication system, the user may authenticate on the new device and transfer data from the first device to the new device. The transfer of data may be completed via the Internet, a local network connection, a Bluetooth connection, a wired connection, or a near field communication. The authentication process may also be part of a security check to resent or restore a system after the phone is lost or stolen. Thus, the authentication system may be used to activate or authenticate a new device, with the authentication used to verify the user of the new device.

Similarly, the system may facilitate secure access to a single shared device by multiple people to control content or other features on the device. In many cases, passwords can be viewed, copied, guessed, or otherwise detected, particularly when a device is shared by several users. The users may be, for example, family members including parents and children, coworkers, or other relationships, such as students. The authentication system may allow each of the family members to log in based on his or her own unique enrollment information associated with a user account.

The device may restrict access to certain content or features for one or more of the certain user's accounts, such as children's user accounts, while allowing access to content and features for others, such as the parents' accounts. By using the authentication system for the shared device, the users such as children are unable to utilize a password to try and gain access to the restricted content because the authentication system requires the presence of the parent for authentication, as explained above. Thus, device sharing among users with different privileges is further secured and enhanced. Likewise, in a classroom setting, a single device may be securely shared between multiple people for testing, research, and grade reporting.

Adaptations and Modifications

Numerous modifications may be made to the above system and method without departing from the scope of the invention. For example, the images may be processed by a facial recognition algorithm on the device and may also be converted to biometric data on the device which is then compared to previously created biometric data for an authorized user. Alternatively, the images from a device may be sent through a wired or wireless network where the facial recognition algorithms running on a separate server can process the images, create biometric data and compare that data against previously stored data that assigned to that device.

Multiple Profiles for a Single User

Further, the photo enrollment process may be done multiple times for a user to create multiple user profiles. For example, the user may enroll with profiles with and without glasses on, with and without other wearable devices, in different lighting conditions, wearing hats, with different hair styles, with or without facial or ear jewelry, or making different and unique faces, such as eyes closed, winking or tongue out to establish another level of uniqueness to each user profile. Such 'faces' made by the user would not be available on the user's Social Media Pages and hence not available for copying, manipulation, and use during a fraud attempt. Each set of enrollment images, enrollment biometrics, or both may be saved along with separate enrollment movement. In one embodiment at least three images are captured as the mobile device completes the path. It is contemplated that any number of images may be captured.

Linking Enrollment Information

It is also contemplated that the enrollment process may be linked to an email address, phone number, or other identifier. For example, a user may sign up with an email address, complete one or more enrollments as described above, and confirm the enrollments via the same email address. The email address may then further enhance the security of the system. For example, if a user unsuccessfully attempts to login via the authentication system a predetermined number of times, such as three times for example, then the authentication system locks the account and sends an email to the email address informing the user of the unsuccessful login attempts. The email might also include one or more pictures of the person who failed to login and GPS or other data from the login attempt. The user may then confirm whether this was a valid login attempt and reset the system, or the user may report the login attempt as fraudulent. If there is a reported fraudulent login, or if there are too many lockouts, the system may delete the account associated with the email address to protect the user's security. Thus, future fraudulent attempts could not be possible.

Feedback Meters

Figure 10:
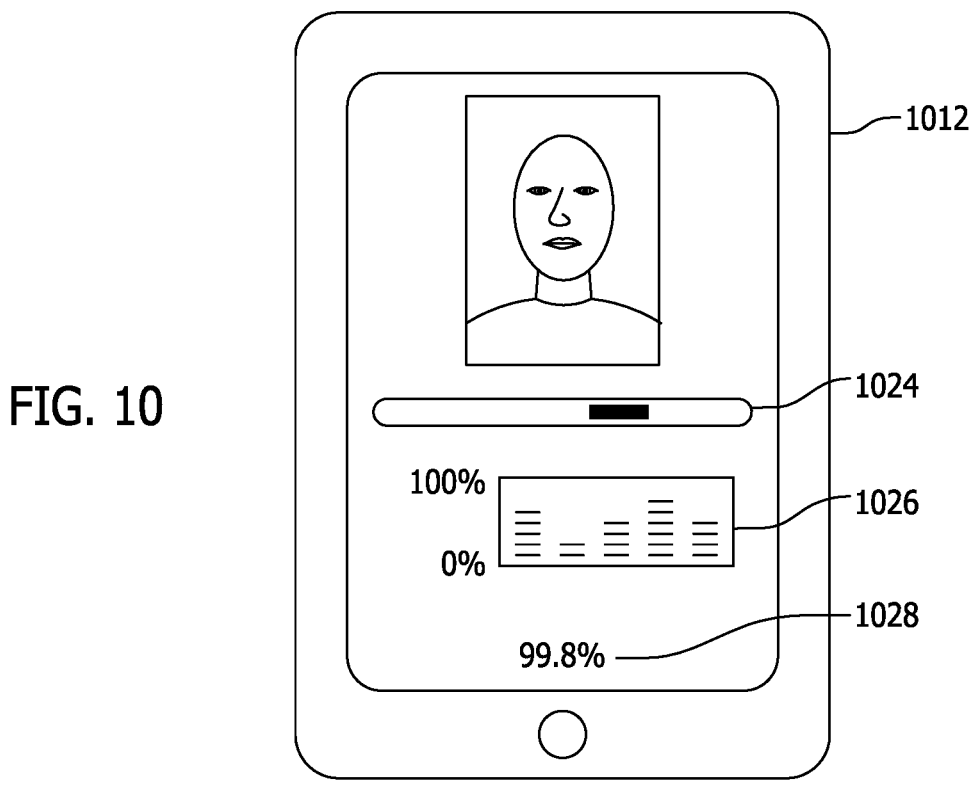
FIG. 10 illustrates an exemplary display showing a graphical and numeric feedback in a facial recognition authentication system.

To further facilitate imaging, the mobile device may include various feedback meters such as a movement meter or accuracy meter as shown in FIG. 10. In one embodiment, the mobile device 1012 may display a movement meter 1024 that indicates the amount of movement the mobile device 1012 makes as the user moves the mobile device 1012 to different positions relative to his/her head. For example, the movement meter 1024 may be represented as a line that slides from one side of the screen. In this manner, the enrollment process may require a certain threshold of device movement to register a user with the multi-dimensional authentication system. For example, the system could require that the mobile device 1012 is moved in an arc or straight line and rotate at least 45 degrees to create the enrollment information. In another example, the system could require an acceleration experienced by the device exceeding a threshold amount. The movement meter may also aid the user in learning how to image himself/herself using the authentication system.

The mobile device 1012 may also display an accuracy meter 1026 or any other visual representation of authenticated frames to aid the user in authenticating himself/herself using the authentication system and learning to improve authentication. The accuracy meter 1026 may show a user a match rate (graphical, alpha, or numerical) of a predetermined number of images obtained during the authentication process. The accuracy meter can be represented on the display in a variety of ways including numeric percentages, color representation, graphical, and the like. A combination of representations may also be utilized.

For example, as shown in FIG. 10, match rates for a predetermined number of images taken during authentication are represented on the accuracy meter. In the embodiment shown in FIG. 10, each of the images may be represented by a column in a graph, and the accuracy can be shown for each image in each column. For example, the column with a longer bar represents higher accuracy, and a column with a lower bar represents lower accuracy. In addition to match rates for images, the match rates for the path parameter may also be displayed. Over time the user can improve.

In another embodiment, each of the images may be represented on a table as a color that corresponds to the match rate. The color dark green may represent a very high match rate, light green may represent a good match rate, yellow may represent a satisfactory match rate, red may represent a mediocre match rate, and grey may represent a poor match rate. Other colors schemes may also be used.

The height of the bars or the colors used may correspond to predetermined match rates. For example, a full bar or dark green may be a match rate greater than 99.9%, a three-quarter bar or light green may be a match rate between 90% and 99.9%, a half bar or yellow may be a match rate of 50-90%, red may be a match rate of 20%-50%, and a single line to a quarter bar or grey may be a match rate of 0-20%. A pie chart, line graph, or any other type of representation could also be used or any other numerical or graphical display. An overall score may be presented or a score per image.

The accuracy meter may also include a message 1028 indicating an overall match score. For example, the accuracy meter may indicate an average overall match score or the number of images which achieved a 99.9% match rate and display the message to a user. With the movement meter 1024 and the accuracy meter 1026 as described above, the user may quickly learn to use the authentication system due to the feedback presented by the meters 1024, 1026.

Gamification and Rewards

The movement and accuracy meters 1024, 1026 may also be configured to incorporates game features, aspects, or techniques into the authentication system to encourage a user to try and get the best match possible (such as a high number score or a high percentage of frames), increasing the user's skill in utilizing the authentication system. This also builds user adoption rates for the technology.

For example, the user may compete with themselves to mimic or improve past authentication scores to encourage or train the user to achieve a high score. Further modifications of the authentication meter may also be incorporated such as the ability to share accuracy match results with others to demonstrate one's skill in using the system or to compete against others. In other instances, the user may receive a reward, such as a gift or coupon, for high accuracy scores. While this may slightly increase costs, the reduction in fraud loss would far outweigh the additional cost.

Further game techniques may be incorporated into the authentication system to encourage users to take actions which will prevent unauthorized or fraudulent authentication. In one embodiment, the authentication system may award users that engage in fraud preventing activities. One such activity is utilizing the facial recognition authentication system described herein. For example, based on the above described accuracy meter, the system may reward a user that successfully authenticates with the system above a certain match rate. The system may award reward points, cash, or other prizes based on the successful authentication or on a predetermined number of successful authentications. Where reward points are utilized, the points may be cashed in for predetermined prizes.

Other game features may involve award levels for users who gain a predetermined amount of experience using the authentication feature. For example, different reward levels may be based on users successfully authenticating 100 times, 500 times, 1000 times, etc. Because each instance of fraud loss can be significant and can damage the goodwill of the business or organization, the benefits to fraud prevention are significant.

In one embodiment, the user may be notified that he or she has achieved various competency levels, such as a "silver level" upon achieving 100 successful authentications, a "gold level" for achieving 500 successful authentications, or a "platinum level" for achieving 1000 successful authentications. A set number of points awarded for each authentication above a given match rate may increase based on the user's experience level. Of course, the names of the levels and the number of authentications for each level as described above are only exemplary and may vary as desired.

In one embodiment, an authentication only counts toward reward levels when business is transacted at the web site while in other embodiments, repeated attempts may be made, all of which count toward rewards. Another feature may incorporate a leaderboard where a user may be notified of a user ranking comparing his or her proficiency or willingness in using the authentication system as compared with other users.

Successful use of the authentication system benefits companies and organizations that utilize the system by reducing costs for fraudulent activities and the costs of preventing fraudulent activities. Those cost savings may be utilized to fund the above described game features of the authentication system.

Further activities that correspond to the authentication system and contribute to the reduction of fraud may also be incorporated to allow a user to earn points or receive prizes. Such activities may include a user creating a sufficiently long and strong password that uses a certain number and combination of characters. This encourages and rewards users to set passwords that are not easily compromised. Other examples may include rewarding users to take time to perform verification steps in addition to an initial authentication such as a mobile phone or email verification of the authentication, answering one or more personal questions, or other secondary verifications as currently known or later developed. This rewards users for taking on added time and inconvenience to lower the risk of fraud to a company or organization.

As another example, if the authentication service is used to login to websites or apps that provide affiliate programs, then the reward or gift can be subsidized from the affiliate commissions on purchases made on those sites. For example, if a commerce (product or service) web site utilizes the method and apparatus disclosed herein to avoid fraud, and thus increase profits, then a percentage of each purchase made by a user using the authentication service will be provided to the authentication service. By reducing fraud, consumer purchases are more likely and additional users will be willing to enter financial and personal information. An affiliate link, code, or referral source or identifier may be used to credit the authentication system with directing the consumer to the commerce (product or service) web site.

Multiple Account Login

It is also contemplated that the authentication system may be configured to allow a user to access many different web sites with a single authentication. Because the authentication process and result are unique to the user, the user may first designate which participating web sites the user elects to log into and then after selecting which one or more web sites to log into, the user performs the authentication described herein. If the secure authentication is successful, then the user is logged into the selected web sites. In this way, the authentication process is a universal access control for multiple different web sites and prevents the user from having to remember multiple different usernames and passwords while also reducing fraud and password overhead for each user.

Automatic Start/Stop of Imaging

It is also contemplated that the system may be configured to have the video camera running on the phone. The mobile device would capture image frames and path parameter data when the phone moves (using the camera, gyroscope, magnetometer, and accelerometer) but only process into biometric data on the device or send the frames up to the server if a face is detected in them. In other embodiment, no image data or frames is sent to the server and instead the analysis is performed on the user's mobile device, such as a phone. In this embodiment, the application executing on the mobile device could trigger the software application to start saving frames once the phone is moving and then if the phone continues to move in the correct path (a semi-circle, for example) and the system detects a face in the frame the mobile device would start to send images, a portion of the image, or biometric data to the server for processing. When the system senses motion it may trigger the capture of images at certain intervals. The application may then process the frames to determine if the images contain a face. If the images do include a face, then the application crops it out and then verifies if the motion path of the mobile device is similar to the one use used during enrollment. If the motion path is sufficiently similar, then the application can send the frames one at a time to the server to be scanned or processed as described above.

Banding and Edge Detection

When a fraudulent attempt is made using a display screen, such as an LED, LCD, or other screen, the system may detect the fraudulent login attempt based on expected attributes of the screen. In one embodiment, the authentication system will run checks for banding produced by digital screens. When banding is detected, the system may recognize a fraudulent attempt at a login. In another embodiment, the system will run checks for edge detection of digital screens. As the mobile device is moved to obtain the authentication movement during a login attempt, the system checks the captured images to for edges of a screen to recognize a fraudulent login attempt. The system may also check for other image artifacts resulting from a screen such as glare detection. Any now know or later developed algorithms for banding and screen edge detection may be utilized. Upon detection of fraud will prevent authentication and access to the website or prevent the transaction or account access.

Other Attributes Estimation

The authentication system may further conduct an analysis on the enrollment images to estimate at least one of a gender, an approximate age, and an ethnicity. In an alternative embodiment, the user may manually enter one or more of their gender, an approximate age, and an ethnicity, or this information may be taken or obtained from existing records which are known to be accurate. The authentication system may then further store a user's estimated gender, age, and ethnicity as enrollment credentials or user data. Thus, when the user later attempts to authenticate with the system, the system will compare derived gender, age, and ethnicity obtained from authentication images (using biometric analysis to determine such data or estimates thereof based on processing) with the stored gender, age, and ethnicity to determine whether to authenticate the user. For example, if the derived data for gender, age and ethnicity matches the stored enrollment credentials, then the authentication is successful, or this aspect of the authentication is successful.

The authentication system may make the gender, age, and ethnicity estimations based on a single image during the authentication process or based on multiple images. For example, the authentication system may use an image from the plurality of images that has an optimal viewing angle of the user's face for the analysis. In other embodiments, a different image may be used for each analysis of age, gender, and ethnicity when different images reveal the best data for the analysis. The authentication may also estimate the gender, age, and ethnicity in a plurality of the images and average the results to obtain overall scores for a gender, age, and ethnicity.

As an alternative to obtaining the gender, age, and ethnicity as enrollment information, the estimated gender, age, and ethnicity estimations as authentication credentials may be set over a course of repeated use of the authentication system. For example, if in previous successful authentications using biometrics and movement information, the authentication system always estimates a user's age being between 40 and 50, then the authentication may set credentials for that user requiring later login information to include images of a face estimated to be between 40 and 50. Alternatively, gender, age, and ethnicity estimations may be implemented as one of many factors contributing to an overall authentication score to determine whether or not to authenticate a user.

For example, if the authentication process has a gender estimation of + or −0.2 of 1.9 male rating, then if the actual results do not fall within that range the system may deny access for the user. Likewise, if the user's age range always falls between 40-50 years of age during prior authentication attempts or enrollment, and an authentication attempt falls outside that range, the system may deny access or use the result as a compounding factor to deny access.

In a further embodiment, when a bracelet or watch capable of obtaining an EKG signature is used, a certain EKG signature may be required at login. The EKG signature could also be paired with the facial recognition rotation to provide multiple stage sign-on for critical security and identification applications. Further, the credentials could also include GPS information where login is only allowed within certain geographic locations as defined during enrollment. In one configuration the GPS coordinates of the mobile device are recorded and logged for a login attempt or actual login. This is additional information regarding the location of the user. For example, if the GPS coordinates are in a foreign country known for fraud, then the attempt was likely fraudulent, but if the GPS coordinate indicate the attempt or login was made in the user's house, then fraud is less likely. In addition, some applications may only allow a user to login when at specified location such as a secure government facility or at a hospital.

The enrollment information may further include distance information. Because the motion arc (speed, angle, duration . . . ) is unique to each user, face detection software on the device can process the images and determine if the device is too close or too far from the subject. Or in other words, the enrollment information may consider the size of the face in the images. Thus, the potential enrollment information may also vary based on the length of a user's arm, head, and face size, and on the optics of the camera in the user's particular mobile device. The user may also be positioned at a fixed computer or camera, such as laptop, desktop, or atm. The user may then move the face either forwards and back, side to side, or up and down (or a combination) to create the images. Hence, this method of operation is not limited to a mobile device. In one embodiment, the camera is located in an automobile, such as in a mirror, and the person moves their head or face to authenticate.

Gradual Authentication Access

In one embodiment, the system is set to limit what the user can do when first enrolled and authenticated. Then, after further authentications or after a predetermined time period and number of authentications, additional capabilities may be granted. For example, during the first 20 authentications during the first 3 months, a maximum transaction of $100 may be allowed. This builds a database of known authentication data in connection with non-objected to transactions by the user. Then, during the next 20 authentications a transaction limit of $3000 may be established. This limits the total loss in the event of fraud when the authentication data is limited, and the user is new to the system. For example, if an unauthorized user is able to fraudulently enroll in the authentication system.

Video Display for Imaging

When the user images himself/herself using a front-facing camera, the user may confirm that his/her face is being imaged by viewing the image on the display, as described above. The image shown on the display may be configured to be smaller in area than the entire display and may be positioned in an upper portion of the display towards the top of the device. When the user's image is shown only in the top portion of the user's display screen, the user's eyes tend to look more closely at the front camera. When the user's eyes are tracking up, the accuracy of the facial recognition may be improved. Further, tracking the movement of the eyes from frame to frame may allow the system to validate that the images are of a live person, and are not from a photograph or video recording of the person.

Figure 11A:
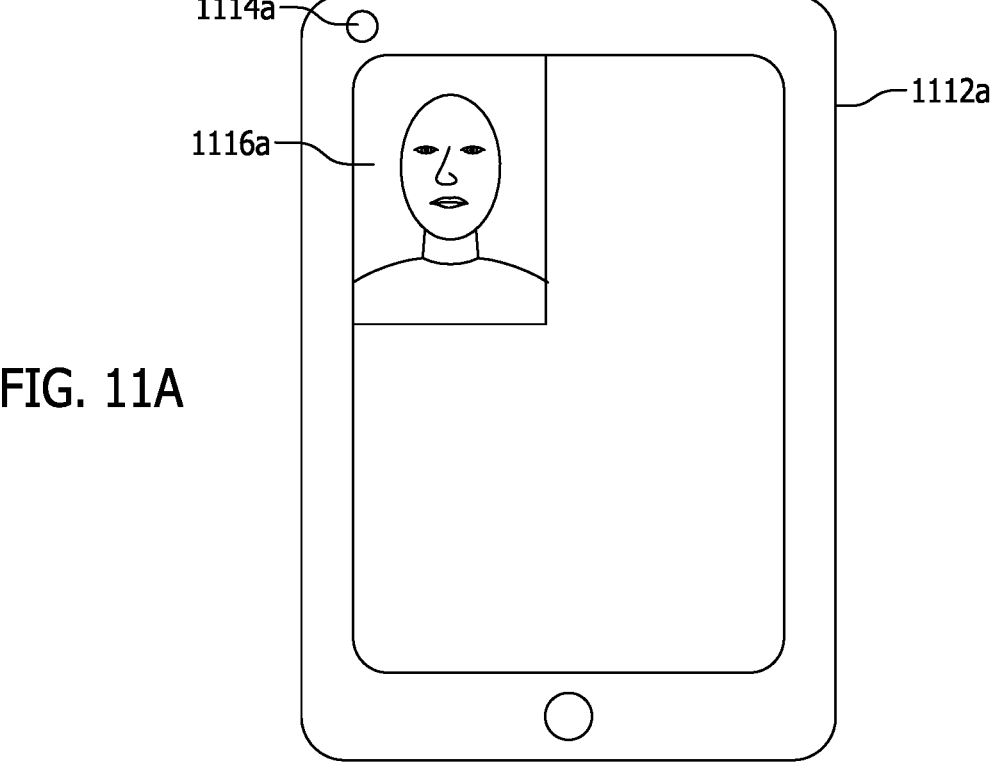
FIGS. 11A, 11B, and 11C illustrate exemplary video feedback displays corresponding to front-facing camera positions in a facial recognition authentication system.
Figures 11B, 11C:
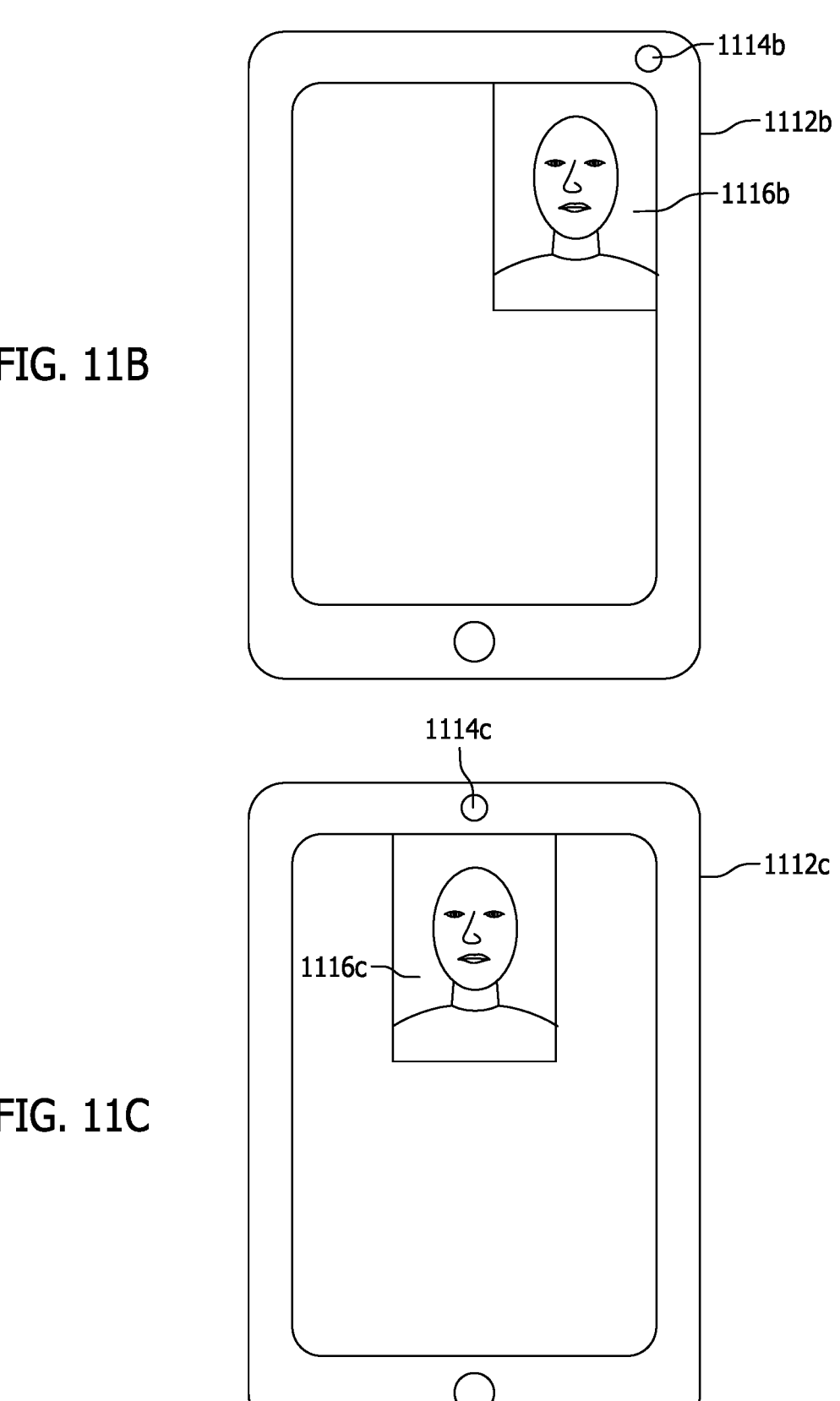

The image shown on the display may also be positioned to correspond with a camera location on the user's device, as shown in FIGS. 11A-11C. Mobile devices that are available today may include front-facing cameras disposed at many different positions. For example, one mobile device 1112a, 1112b may have a front-facing camera 1114a, 1114b that is disposed above the display and off center towards one side or the other, as shown in FIGS. 11A and 11B. Accordingly, the feedback image 1116a, 1116b of the user shown on the display may be positioned to correspond with the location of the camera 1114a, 1114b as shown. In FIG. 11A, where a camera 1114a is above the display and is off-center at a position left of the center, then the image 1116a may be shown in an upper left corner of the display. In FIG. 11B, where a camera 1114b is above the display and is off-center at a position right of the center, then the image 1116b may be shown in an upper right corner of the display. As shown in FIG. 11C, a mobile device 1112c may have a camera 1114c that is disposed centered directly above the display. There, the image 1116c may be displayed centered in an upper portion of the display. In this manner, a user's eyes are directed close to and/or track as close to the camera as possible, aiding eye tracking and movement verification. The user is also able to better see the feedback image, and other feedback or information on the screen, as they move the mobile device.

Figure 12:
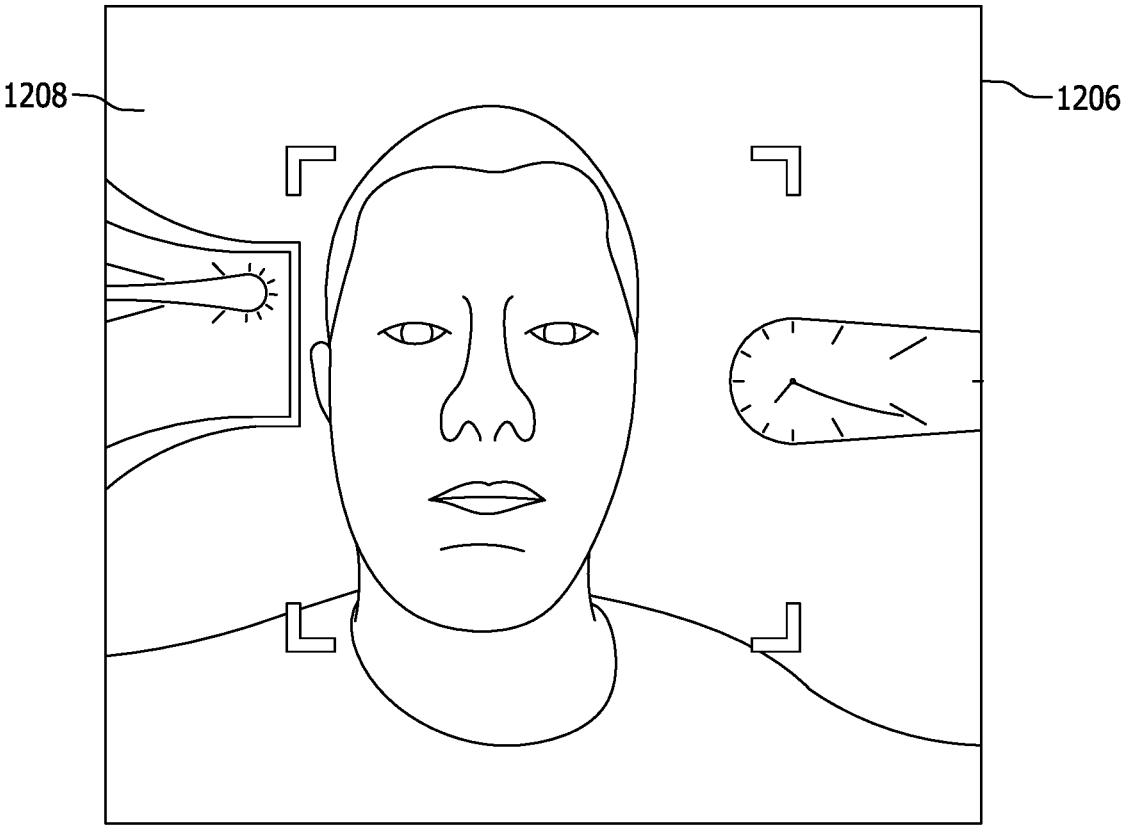
FIG. 12 shows an exemplary video display feedback of a facial recognition authentication system where edge pixels on the sides of the display are stretched horizontally.

The image viewed on the display by the user may further be modified such that the edge pixels on the sides display are stretched horizontally as shown in FIG. 12. That is, a predetermined area 1206, 1208 on both the right and the left sides are warped to stretch towards right and left edges, respectively, of the screen. This allows a larger vertical portion of the displayed image to be shown on the display. Simultaneously, this trains a user to use the system correctly by keeping his or her face in the center of the screen, as his or her face would become warped on the screen if it becomes off center and part of the face enters the one of the warped areas.

Authentication in Low-Light Environments

To facilitate imaging, the screen on the mobile device may additionally be displayed with a white background, and the brightness of the screen may be increased to light up the user's face in dark environment. For example, a portion of the display could provide video feedback for the user to ensure he or she is imaging himself or herself, while the remaining portion of the display is configured to display a bright white color. Referring to the example shown in FIG. 11C, this may be done by showing the video feedback 1116c on a center of the display, with the surrounding areas being displayed as bright white bars around the video feedback 1116c. In very dark situation, an LED flash on the back side of the mobile device and the back facing camera may be used. Alternatively, the camera may be configured to create an image using infrared light or other night vision techniques.

When infrared imaging is used as thermal imaging, further security enhancements are possible. Particularly, the thermal imaging may be analyzed to indicate whether the obtained images are from an actual user or are fraudulent images from a screen or other device. When a person is in front of an infrared thermal imaging camera, the heat radiation detected should be fairly oval shaped designating the person's head. In contrast, the heat radiating from a screen is typically rectangular. Further, the heat patterns detected in the actual person's face as well as the movement of the heat patterns in the images can be compared with expected heat patterns of a human face to distinguish the images from fraudulent authorization attempts using a screen.

Detecting Output from the Mobile Device

The display or other light source on the mobile device may further be utilized to provide additional security measures. During the authentication process described above, light from the display or other light source is projected onto the user's face and eyes. This projected light may then be detected by the camera of the mobile device during imaging. For example, the color tone detected on the skin, or a reflection of the light off the cornea of a user's eye may be imaged by the camera on the mobile phone. Because of this, random light patterns, colors, and designs may be utilized to offer further security and ensure there is a live person attempting authentication and not merely an image or video of a person being imaged by a fraudster.

As one example, when a user begins authentication, the authentication server may generate and send instructions to the user's device to display a random sequence of colors at random intervals. The authentication server stores the randomly generated sequence for later comparison with the authentication information received from the mobile device. During authentication imaging, the colors displayed by the device are projected onto the user's face and are reflected off the user's eyes (the cornea of the eyes) or any other surface that receives and reflects the light from the screen. The camera on the user's mobile device detects the colors that are reflected off the user's skin or eyes (or other surface) and generates color data indicating the colors detected based on the screen projection. This data may be returned to the authentication server to determine if the color sequence or pattern sent to the mobile device matches that known sequence or pattern projected by the screen of the user device. Based on this comparison at the authentication server the authentication is a success or denied. The comparison with the random sequence of colors in the instructions may alternatively occur exclusively at the user device to determine that a live user is being authenticated.

As another example, when a user begins authentication, the authentication server may send instructions the user's device to display a randomly generated pattern which is then stored on the authentication server. This pattern may include graphics, text, lines or bars, flashing light patters, colors, a QR code, or the like. The randomly generated pattern is displayed during authentication imaging, and the pattern is reflected off the user's eyes (cornea). The camera of the user's device detects the reflected pattern off the eye of the user and processes the reflected, mirrored image of the displayed pattern. The processed pattern (such as being converted to a numeric value) is transmitted to the authentication server and compared to the pattern that was randomly generated and stored on the authentication server to verify if the pattern displayed by the screen and imaged after reflection off the user's face establishes a pattern match.

If a match occurs, this establishes or increases the likelihood that a live person is being imaged by the device. If the pattern is not a match, or does not meet a match threshold level, then the authentication process may fail (access denied) or the account access or transaction amount may be limited. It is noted that this example could also be incorporated on desktop computer with a webcam that does not incorporate the enrollment movement and authentication movement described above. Further, this example may not only be incorporated with facial recognition, but could also serve as an added layer of security for iris recognition or any other type of eye blood vessel recognition, or any facial feature that is unique to a user.

When the above example is implemented on a desktop computer, eye tracking may also be utilized to further demonstrate the presence of a live user. For example, the screen could show a ball or other random object or symbol moving in a random pattern that the user watches with his or her eyes. The camera can detect this real time movement to verify the user is live, and not a picture or display, and verify that the eye or head movements correspond to and match the expected movement of the object or words on the screen, which are known by the authentication system. Eye tracking can also be done by establishing an anchor point, such as via a mouse click at a location on the screen (assuming that the user is looking at the location where the mouse click takes place), and then estimating where the user is looking at the screen relative to the anchor position.

The use of a moving object on the screen may also be beneficial during enrollment on either a mobile or stationary device. For example, while capturing the enrollment images, the device may display a moving digital object (such as a circle or words(s)) that moves around the screen so that the user is encouraged to follow it with his or her head and eyes. This movement may be involuntary from the user, or the device may be configured to instruct the user to follow the object. This results in movement of the head and/or eyes creating small changes in the orientation of the user's head and face with the device camera, providing more complete enrollment information. With more complete enrollment information, the system may better ensure that the user will later be authenticated at a high rate even at slightly different angles during future authentication attempts.

Intuitive User Training and Enhanced Security by "Zooming"

Figure 13A:
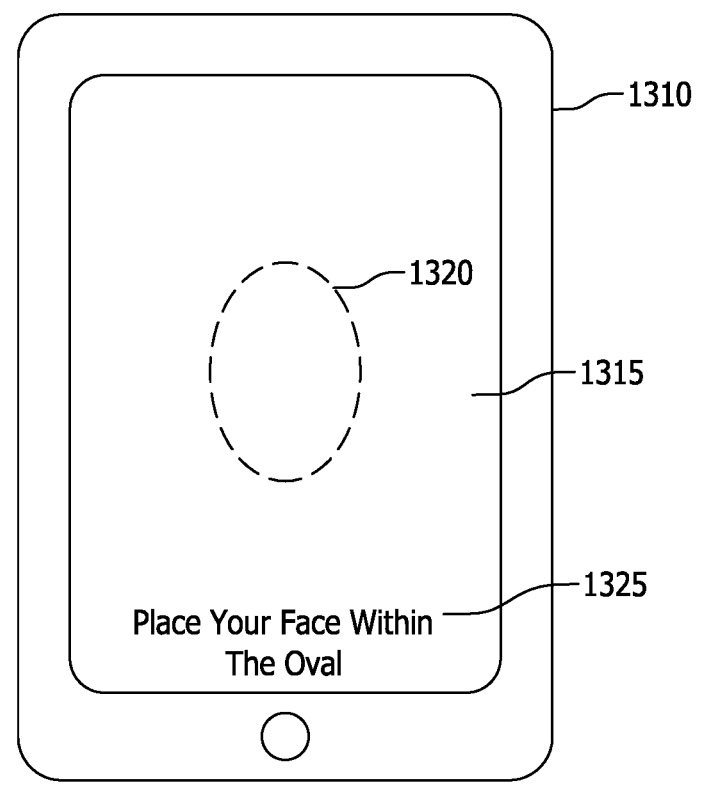
FIGS. 13A and 13B illustrates exemplary screen displays with face alignment indicators shown as an oval to serve as a guide as the user moves the mobile device closer to or away from their face.

In one embodiment, the system is configured to aid the user to easily learn to authenticate with the system. As shown in FIG. 13A, once enrollment or authentication is begun as described previously, the system causes the user's mobile device 1310 to display a small oval 1320 on the screen 1315 while the mobile device 1310 is imaging the user. Instructions 1325 displayed on the screen 1315 instruct the user to hold the mobile device 1310 so that his or her face or head appears within in the oval 1320. Because the oval 1320 is small, the user is required to hold the mobile device 1310 away from his or her body, such as by straightening his or her arm while holding the mobile device 1310. The maximum arm length and face size is unique to the user. In other embodiment, the arm may not be fully straightened such as to accommodate operation when space is not available, such as in a car or in a crowded location. It is noted that while the small oval 1320 is shown centered in the display, it may be positioned anywhere on the screen 1315.

Figure 13B:
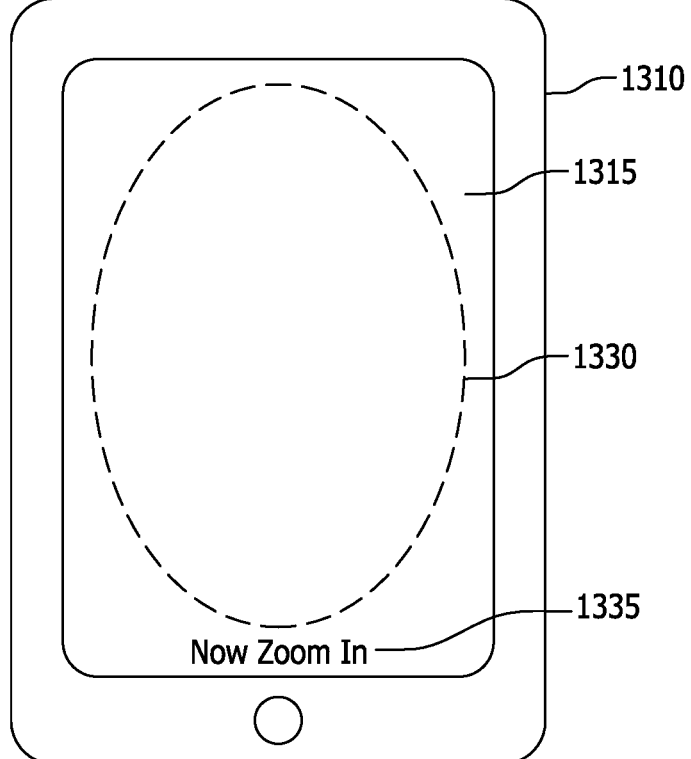

Next, as shown in FIG. 13B, the system causes the user's mobile device 1310 to display a larger oval 1330 on the display 1315. The display 1315 may also show corresponding instructions 1335 directing the user to "zoom in" on his or her face to fill the oval 1330 with his or her face. The user does this by bringing the mobile device 1310 closer to his or her face in a generally straight line to the user's face (such as shown in FIGS. 7A and 7B) until the user's face fills the oval 1330 or exceeds the oval. In other embodiments, the large oval 1330 may simply be a prompt for the user to bring the mobile device 1310 closer to the user's face.

Thus, the system provides and teaches the user a simple method to provide enrollment and authentication images along with enrollment and authentication movement as explained above. The system may also teach varying enrollment and authentication movement by varying the location of the small oval 1320 on the screen 1315, and by changing the order and the size of the ovals displayed. For example, the user may zoom in halfway, then out, then in all the way, by moving the mobile device. The system may be configured to monitor that the camera's zoom function (when equipped) is not in use, which typically requires the user to touch the screen.

In one embodiment, the enrollment movement may be omitted, and the authentication movement may be compared to expected movement based on the prompts on the screen. For example, the device or authentication server generates a series of differently sized ovals within which the user must place his or her face by moving the mobile device held in the user's hand. In this manner, the authentication movement may be different during each login depending on the order, size, and placement of the ovals shown on the screen.

The system may also incorporate other security features when the "zoom in" movement is used as shown in FIGS. 13A and 13B. The zoom in feature is typically from moving the device closer or further from the user, but a camera zoom function is also contemplated. When images are taken at relatively close distances between the subject and the camera, the images are distorted through what is known as perspective distortion. Some texts may refer to this distortion as fish-eye type distortion, but perspective distortion is a more accurate technical terminology. Further, lenses configured as wide-angle lenses may contribute barrel distortion (a type of lens distortion) in an image. Other types of lens distortions are also present. These distortions may be tracked for different types of lenses for different devices. The degree of distortion experienced by a user performing the "zoom in" movement to fit their face within the screen displayed prompts may vary and is dependent on the type of optics used in the camera's lens, the type of distortion, and other factors.

The distortion becomes more obvious on an image of a person's face when the person images his or her face close to the lens. The effect results in the relative dimensions of the person's face appearing different than when the imaging is done with the person's face farther away from the lens. For example, a person's nose may appear as much wider and taller relative to a person's face when the image is taken at a close proximity as compared to when the image is taken at a distance. The differences in the relative dimensions are caused by the relatively larger differences in distances between the various facial features and the camera when the person is imaged close to the lens as compared to the relatively equal distances between the facial features and the camera when the person is imaged at a distance farther from the lens.

Such differences have been found to be significant in many facial recognition algorithms. That is, a facial recognition algorithm may not result in a high likelihood of a match between images of a live person imaged at a close proximity and the same person imaged at a far proximity. In contrast, if a two-dimensional photograph of a person is imaged by the camera at both a close proximity and a farther proximity, the relative distances (length) between the lens and the facial features of the two-dimensional image do not change so significantly. Thus, a facial recognition algorithm would recognize the two-dimensional photograph as a high likelihood of a match when imaged at both a close proximity and a distance farther from the lens.

This effect also changes what parts of the user may be viewed by the camera of the user's mobile device based on the angle between the camera and facial features of the user. For example, when imaged farther away, the camera may image the user's face with the user's ears visible in the image. However, when the user device is moved close to the user's face, the image captured by the camera no longer includes the user's ears. This is because other facial features of the user's face, such as the user's cheeks/cheekbones now block the line of sight from the camera to the user's ears. In contrast, when a two-dimensional picture is imaged by the camera, the same facial features of the two-dimensional picture will always be visible to the camera whether the camera is close to the two-dimensional picture or far away. Thus, the three-dimensions or liveness of the user's face may further be verified by detecting changes in what part of the user face or other features are present in the image.

This effect as described above may be used to increase the security of the authentication system. For example, during enrollment, enrollment images may be provided by the user at both close and far proximities from the lens, in addition to other positions through the movement. Later, during authentication, authentication images may be obtained at both the close and far distances from the lens to determine if they match with the enrollment information obtained from the enrollment images. Further, because perspective distortion is expected when an actual, three-dimensional person is present, an absence of the relative change in the dimensions of the facial features alerts the system to a fraudulent attempt at authentication. This effect could not easily be re-created with a two-dimensional picture (printed photograph or screen) and thus, this step can serve as a secure test to prevent a two-dimensional picture (in place of a 3D face) from being used for authentication.

In other words, using this movement of "zooming" in and out on the user's face, two or more biometric profiles could be created for the same person. One of the multiple profiles for the person may be imaged farther from the camera, and one of the multiple profiles may be for the person imaged closer to the camera. For the system to authenticate the person, the authentication images and biometrics must match the two or more profiles in the enrollment images and biometrics.

In addition, the system may detect the presence of a real person as compared with a fraudulent photograph of a person by comparing the background of the images obtained at a close and a far proximity. When the mobile device 1310 is held such that the person's face fits within the oval 1320, objects in the background that are almost directly behind the person may be visible. However, when the mobile device 1310 is held such that the person's face fits within the larger oval 1330, the person's face blocks the camera's ability to see the same objects that are almost directly behind the person. Thus, the system may compare the backgrounds of the images obtained at the close and the far proximity to determine whether the real person is attempting authentication with the system.

Of course, in FIGS. 13A and 13B, shapes or guides other than ovals 1320 and 1330 may be used to guide the user to hold the mobile device 1310 at the appropriate distance from his or her face. For example, the mobile device 1310 may show a full or partial square or rectangle frame. Further, the system may vary the size and location of the frame, such as the ovals 1320, 1330 to add further security. For example, the system may require a medium sized frame, a small frame, and then a large frame. As another example, the system may require a small frame at a first location and a second location, and then a large frame. This may be done randomly to teach different users different enrollment and authentication movements, or to increase the security of the authentication system.

The number of frame sizes presented to the user may also vary for a single user based on the results of other security features described herein. For example, if the GPS coordinates of the mobile device show that the device is in an unexpected location, more frames at different distances may be required for authentication. One or more indicators, such as lights, words, or symbols may be presented on the screen to be visible to the user to direct the user to the desired distance that the mobile device should be from the user.

In FIGS. 13A and 13B, the system may predict the expected perspective distortion of the images based on the mobile device used for enrollment and authentication, and based on known and trusted enrollment data. In addition, or as an alternative, the known specifications of a mobile phone camera for a given model may be utilized to predict the expected distortion of the person's facial features at different distances from the lens. Thus, the authentication may be device dependent. Further, enrollment information from the user is not required at every possible distance from the camera.

For example, as described above, enrollment images and biometrics may be obtained at at least two distances from the user. During authentication, multiple intermediary images are captured in addition to images corresponding the close and far distances of the enrollment images and biometrics. Based on the expected pattern of distortion of these intermediary images according to the distanced traveled by the device, the system may validate that the change in distortion of the images is happening at the correct rate, even though only two enrollment profiles are obtained.

The capturing of these images may be still images or video, such that frames or images are extracted from the video that is taken during the movement from the first position distant from the user and the second position proximate the user. Thus, it is contemplated the operation may capture numerous frames during the zoom motion and ensure that the distortion is happening at the correct rate for the head size and the movement of the mobile device distance based on data from the accelerometers, magnetometers, and so forth.

Over time based on accumulated data, or calculated data during design phase, the system will have data indicating that if a phone is moved a certain distance toward a user's face, then the distortion effect should fall within a known percentage of the final distortion level or initial distortion level. Thus, to fool or deceive the authentication system disclosed herein, the fraud attempt would not only need to distort the fraudulent two-dimensional picture image, but would also need to cut the background, and then make a video of the face, distortion, and background that does all of this incrementally and at the correct speed, all while not having any banding from the video screen or having any screen edges visible, which is very unlikely.

Many currently known facial detection and facial recognition algorithms are configured to only look for a face within an image where the depicted head is smaller than the image's dimensions. If a user's the forehead, ears or chin were not visible in the frame the remainder of the face would not be detected. Thus, to ensure that the facial detection and recognition algorithms detect and recognize the user's face in the zoomed in image (FIG. 13B), the system may add a large buffer zone around the image taken at a close proximity. This creates a larger overall image and allows current facial detection and recognition algorithms to detect and recognize the face, even where the face of the user is large in the original image. In one embodiment, the face detection may be configured to detect portions of the face such as eyes, nose and mouth and extrapolate that the entire face is present based on one of more of those features being present.

When the enrollment and authentication movements resulting from the process described with FIGS. 13A and 13B is used, the eye tracking security features described above may also be enhanced. For example, when the user is instructed to bring the mobile device 1310 closer to his or her face to fill the oval 1330, the QR code, a random shape, a bar code, color, text, numbers or any other visual indictor may be displayed on the screen. At this close distance, the reflection of the displayed indicator off the user's eye or face may be more easily imaged by the camera. Furthermore, eye movement, blinking, and the like to determine the "liveness" of the person being imaged may also be more easily obtained at the close proximity.

In one embodiment, at least one blink is required to prove liveness for authentication. In another embodiment, blinks may be counted, and the number of blinks may be averaged over time during authentications. This allows for an additional factor in authentication to be the number of blinks observed during the motion. If a pattern of when the user blinks during the motion is observed, the system may verify that the user blinks at the expected time and device location during the motion during future authentication attempts. In some instances, the system may prompt the user to blink, wink, smile, etc. and monitor the captured images to verify that the user has performed the prompted action within a predetermined time. A series of prompted actions may be given to the user to perform (for example, blink, wink right eye, then smile). In one example, the system may prevent authentication (lock out a user) if the prompted actions are performed out of order or are not performed within the time period because this may be indicative of a fraudulent recording being used in place of a live user.

In other embodiments, the size or location of the oval or frame may change to sizes or locations other than that shown in FIGS. 13A, 13B such that the user must position and/or angle the phone to place his or her face within the oval. This establishes yet another method of insuring liveness of the user. The oval may start small and become larger or start large and become smaller. The shape may be shapes other than oval, such as square, triangular, rectangular, or any other shape. Instead of or in additional to a shape, text may be shown instructing the user to move the phone closer or farther from the user's face.

In one exemplary method, the mobile device is positioned at a first distance from the user and a first image captured for processing. This distance may be linearly away from the user and in this embodiment not in an arc or orbit. This may occur by the user moving the mobile device, either by hand, or by the mobile device being on a movable device or rail system. Or, the lens system may be adjusted if in a fixed system to change the size of the user's face in relation to the frame size. Alternatively, the user may stay stationary, the multiple cameras may be used, or camera may move without the user moving. Once some form of movement (from a device, camera, lens, or user) has occurred to establish the camera at a second distance, a second image is captured for processing. Movement from the first position to the second position may be straight toward the user. Processing occurs on both images.

The processing may include calculations to verify a difference between the two images, or a difference in biometrics obtained from the two images, that indicates that a real person is being imaged. Processing may occur to compare the first authentication image to a first enrollment image (corresponding to the first distance) to determine if a match is present and then compare the second authentication image to a second enrollment image (corresponding to the second distance) to determine if a match is present. If a match occurs, then authentication may proceed.

Variations on these methods are also possible with the system requiring a match at the first distance, but a failure to match at the second distance, thereby indicating that the second image is not of a two-dimensional picture. The processing resulting in a match or failure to match may be any type image or facial recognition processing algorithm. As with other processing described herein, the processing may occur on the mobile device, one or more remote servers, or any combination of such devices.

All the processing described herein may occur on only the mobile device, only a remote server, or a combination there. The biometric data may be stored on the mobile device or the server or may be split between the two for security purposes. For example, the images could be processed on the mobile device, but compared to enrollment data in the cloud or at a remote server. Alternatively, the images could be sent to the cloud (remote server) for processing and comparison.

Pixel Relative Velocities for Depth Detection

The system may further incorporate the use of an operation referred to generally herein as pixel velocity analysis to determine whether the authentication information obtained by the device includes images and/or biometric information of a live, three-dimensional person. Pixel velocity analysis tracks the pattern of apparent motion of objects, surfaces, and edges in a visual scene. For instance, pixel velocity analysis tracks the apparent motion of features in successive images caused by the relative motion between a camera and the scene in at least two frames.

In one example, when there is relative movement between the camera and scene, an object closer to the camera within the scene will appear to move at a different rate than an object farther from the camera. This movement or pixel velocity is reflected in changes in pixel values that represent the objects in the picture as the objects change their location in the picture as the camera is moved.

For example, a background element may be represented in the array of pixels in the images, such as a clock on a wall or a distant tree in the landscape. A foreground element may also be represented in the array of pixels as a face or facial feature of a person being imaged. As the relative distance between the camera and the foreground element and the background element change, the pixels representing the foreground and the background elements will change their position within the array of pixels. Different pixels will represent or capture the particular elements as the camera is moved. Importantly, the differences in distances between the camera and the foreground element and the camera and the background element cause the rate of change of the pixels (pixel velocity) of the foreground element and the background element to be different.

In some instances, different features of a foreground object may be compared for relative changes in pixel velocities. In this instance, the pixel velocities of different facial features may be compared, such as the nose or cheek. The pixel velocities for the different facial features of a real, three-dimensional person will be different based on their location on the frame of images and on the relative distances from the camera. For example, the pixels that represent the user's nose may move very little as the camera is moved closer to or further from the user face while pixels that represent a feature on the outside of the face will move to a greater degree.

In some instances, as the camera is moved closer to the use, some background elements will be obscured by the user's face and thus certain elements will be obscured. This would not occur if a two-dimensional image of the user was being imaged, such as in a fraud or spoofing attempt, instead of a live three-dimensional user.

The different rates of movement can be captured and compared in frames taken at incremental times. By detecting the different rates of movement or velocities of objects (rate of change over time or based on camera position) in the foreground and the background of the image, it can be determined that the image is a live, three-dimensional image as compared to a two-dimensional picture being used in a fraudulent authorization attempt.

For example, an item in the background (distant from the camera) may move at a different rate (number of pixel locations in the array per unit of time or per frame) as compared to an item in foreground (close to the camera). By detecting the differing rates of change in the pixel array that are represented in the successive images, it can be determined that the objects within the images are three-dimensional. In contrast, if a two-dimensional printed picture is used in an attempt to spoof the system, all the pixels in the images of the printed picture move at the same rate. This is because all the features shown on a two-dimensional printed picture are located at essentially the same distance from the camera.

In particular, items in the foreground move at a higher rate of speed (movement in the pixel array) as compared items in the background. If the device's camera is imaging the user's face, then the foreground will be the user's face and the background will be the scene behind the user, such as a wall, building, trees, or other items behind the user's face. By detecting the rate of change of pixel locations of items in the foreground as compared to the pixel locations in the pixel array that forms the image of items in the background, a determination is made that the scene is a three-dimensional scene.

Further, pixel velocity analysis also includes edge detection. That, certain identified features in a three-dimensional image may be visible in some frames, but may not be visible in other frames. This typically happens around the edges of an object in the foreground of an image. For example, when a user images his or her face while moving the camera from a distance far away from his or her face to a distance closer to his or her face, objects in the background of an image will disappear as the face of the user takes up more and more space in the frame. Pixel velocity analysis is configured to identify objects in the background around the edges of the face and checks that the objects move to disappear behind the face as the face become enlarged, or that the detected face displaces or covers the features as the face enlarges in the image as the camera moves closer. This will not occur with a two-dimensional picture.

Further comparisons can be made by observing the rate of pixel locations within the face itself. For example, if pixels on the foreground change at a different rate as compared to pixels on the background, or displace background pixels, then the person can be identified or characterized as three-dimensional. For example, if pixels showing the nose displace pixels on the upper lip and inner cheeks, and the pixels showing cheeks displace pixels representing the ears, and the pixels showing the chin displace pixels representing the neck in the images as the camera is moved closer to the face, then the person being imaged can be identified as a real three-dimensional person. Further, movement or velocity of the identified features themselves change based on their location in the frame and their distance from the camera. Thus, features on the outside of the face exhibit different pixel velocities than features toward the center of the face. Similar, features such as the eyes and cheeks exhibit different pixel velocities as compared to the nose due to the different relative distances from the camera.

To perform this comparison, two or more images must be captured. For example, a first image is taken at a first distance from the user and then a second image is taken at a second distance from the user, and so on. The comparison is made between the pixel locations of one or more elements (items) in the first image and the second image and can be correlated with the motion of the device as determined by the accelerometer and gyro.

The pixel velocities detected for various identified features in the images may be mapped to form a "heat" map or other type mapping of the pixel velocities. In this example where a face is being imaged, detected pixel velocities are mapped to each of the detected facial features. For features with high pixel velocities, the map may show "hot" areas, such as for features on the edge of the face such as a chin or cheekbone. For areas with low pixel velocities, such as features at the center of the image like the nose, the map may show "cool" areas. By analyzing this heat or rate of change map, a determination may be made whether the image is that of a two-dimensional picture or a live human in a three-dimensional environment.

Pixel velocity analysis may advantageously be used in the above described authentication system when the device and camera are moved from one position to another. For example, the system may conduct pixel velocity analysis in two or more images as the person authenticating moves the device to fit his or her face within the small and large ovals as shown in FIGS. 13A and 13B.

Figure 14:
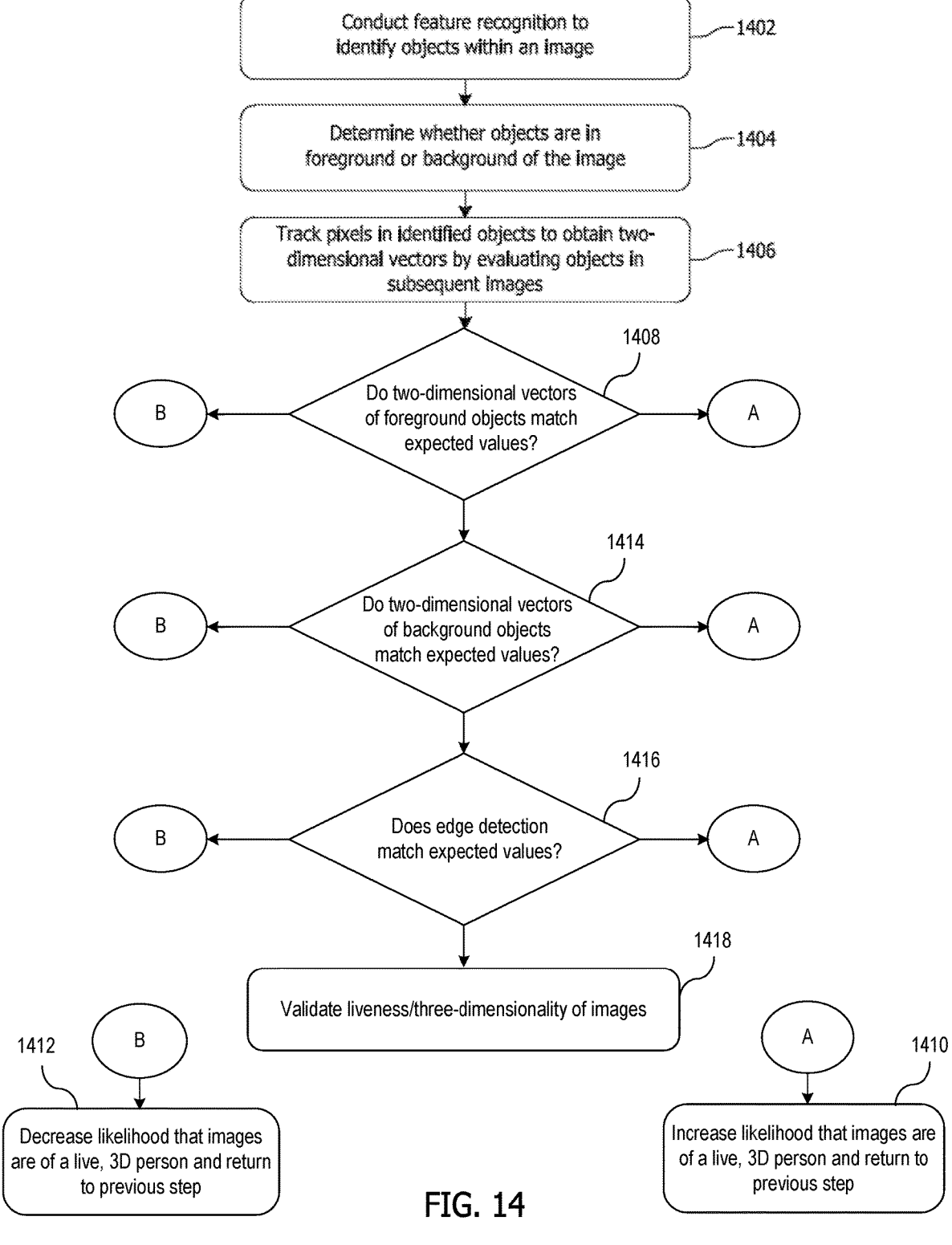
FIG. 14 shows a method of verifying liveness or three-dimensionality of a user utilizing pixel velocity analysis detection.

An example of this process is described with reference to FIG. 14. When a first image is received by the device or server, feature recognition is performed on the image to detect predetermined objects within the image in step 1402. In this instance, facial or feature detection is used to confirm the presence of a user's face and/or facial features on the user's face, such as the user's nose, eyes, cheekbones, chin, etc.

Next, the system analyses the pixel placement in one or more subsequent frames to determine whether the pixels representing the detected features correspond with features located in the foreground or the background of the scene in step 1404.

In one embodiment, when the user moves the device to fit his or her face within the ovals, such as those shown in FIGS. 13A and 13B, the face of the user is identified as the foreground of the image, or the features within the ovals 1320, 1330. The area around the face showing the room or environment of the person is identified as the background of the image, or the features within area 1315. Additionally, the facial features can be verified to behave with characteristics of relatively different distances and locations in the frame. For example, the nose, mouth, and chin may be considered foreground features while the cheeks, ears and jawline may be considered background features.

In step 1406, the various features are tracked through successive images to obtain two-dimensional vectors characterizing the flow or movement of the features. The movement of the features in this example is caused as the user moves the device to fit his/her face within the oval shown in the exemplary screen displays of FIGS. 13A and 13B. Such movement may include the nose displacing pixels on the upper lip and inner cheeks and then the cheeks displacing pixels representing the ears and the chin displacing pixels representing the neck.

The device (processor executing machine readable code stored in memory) then compares image frames (formed by an array of pixels) as the device moves closer to the face of the user. The pixels representing objects in the image are tracked to determine the velocity characteristics of the objects represented by the pixels in the foreground and the background. The system detects these changes in position of items based on pixel data, or two-dimensional pixel velocity vectors, by comparing the successive images taken by the device. When the live, three-dimensional user is authenticating, velocity characteristics of the foreground features (face) and the background features differ significantly as compared to velocity characteristics of a two-dimensional spoof being imaged. That is, the velocity characteristics of facial features are different for a live, three-dimensional person are different as compared to a two-dimensional spoof as the user moves the device to fill his/her face in the oval shown in FIGS. 13A and 13B.

Thus, in step 1408, the system checks if the two-dimensional vectors of foreground features match expected values of a live, three-dimensional person. The expected values or expected rate of change of an item in an image, defined by pixel location or values, may be based on testing over time such as expected location, expected displacement, expected rate of change of the item, or even expected differences in the rate to change which would indicate three-dimensionality (as opposed to a 2D photograph or video screen of a person). In this example, testing may set an expected value of movement or velocities of the ears, cheekbone, nose, etc. When two-dimensional vectors match expected values, the method proceeds to step 1410 to increase a likelihood that the images are of a live, three-dimensional person. If the two-dimensional vectors do not match expected values, (or match values that are expected when a two-dimensional spoof is used) then the method decreases the likelihood that the images are of a live, three-dimensional person as shown in step 1412.

When a live, three-dimensional person is being imaged, the two-dimensional vectors, or displacement of pixels between successive images are different in the foreground and background of the image. Thus, in step 1414, the system also analyzes the two dimensional vectors of background objects to determine whether these match expected values. The likelihood of the images being of a live, three-dimensional person is again updated in either steps 1410 or 1412.

As explained above, some pixels representing certain background objects may appear or disappear completely. For example, as the user moves the device from arm's length to closer in towards his or her face, pixels, edges, and/or features of the user's face will have a higher rate of movement than features in the background, such as a picture frame on a wall, a clock, etc. Additionally, some pixels that are visible on or around the user's face when the device is furthest out from the user will no longer be visible when the user moves the device closer to his or her face. The pixels around a person's face may be defined as the facial halo and the items in these pixels (facial halo) will no longer be captured by the camera in the image due to the person's face taking up more of the image and 'expanding' due to the movement of the camera closer to the person's face. As mentioned above, this check may be referred to as edge detection. In step 1416, the system verifies whether background images around the edges of foreground images match expected values. The system also ensures that pixels representing the edge of the foreground object (such as the face) replace pixels of background objects near the edges of the foreground object. The likelihood of the images being of a live, three-dimensional user is adjusted in step 1410 and 1412 based on the outcome of the edge detection in step 1416. Thus, by tracking these pixels and the displacement, the system can verify whether the pixel velocity analysis is consistent with three dimensional objects having a foreground and background.

In step 1418, the liveness or three-dimensionality of the user being imaged and authenticated is validated based on the various checks described above. A determination that the user attempting authenticate is a live person is one element that must be met as part of the authentication. Thus, attempts at fraudulent access to an account or device using screens or photos of the person can be more reliably prevented. This prevents attempts at fooling the authentication system with a two-dimensional image such as a printed picture, a digital a projection or a digital screen image of a person.

Further enhancements may also be achieved using pixel velocity analysis for liveness or three-dimensionality. When the user brings the device (camera) closer to the user's face, the facial features will distort differently due to the large relative distances between the various features and the camera and the placement of the features in the field of view of the camera as the camera comes closer to the face. This effect may be referred to as perspective distortion. When this distortion begins to occur, pixels in the center of the frame that represent the features in the center of the face such as the nose will have the least amount of distortion in the frame, whereas the pixels that represent the outer portions of the face such as the cheeks, the chin, and the forehead will show the most relative pixel movement (more than pixels at the center of the frame) and the highest acceleration. Thus, the three-dimensionality can also be shown by comparing the features on the face itself. This is because at close proximity to the device, facial features closer to the device can be considered foreground features, and facial features farther from the device are background features. For example, pixels representing the nose will show less movement between frames than pixels representing the cheekbone because of the nose's shorter relative distance from the camera when the device is held at eye level.

Pixel velocity analysis may also be used to track liveness characteristics that are very difficult to recreate during a fraudulent authentication event. For example, the human eyes are never completely still even when focusing on an object. There is always, quick involuntary movement of the eyes as the eyes scan an object, moving around to locate interesting parts of the object, and developing a mental, three-dimensional "map" corresponding to the scene. These movements are called saccades and are involuntary. Saccades last from 20 ms-200 ms and serve as the mechanism of eye fixation. Two-dimensional velocity vectors, based on movement of the eyes based on pixel values, may thus be generated by the saccadic motion of the eyes across frames. The presence of these vectors, the hertz of the eye jitter and the acceleration of the pixel movement between frames can be compared to measurements of verified sessions and can be used to increase confidence that the user in front of the camera is not an inanimate spoof such as a photo, a wax sculpture, or doll.

In another example, when a bright light is presented to the human eyes, the pupil will constrict to mitigate the light's path to the retina. Cameras on typical mobile devices such as smart phones generally operate at high enough resolutions that two-dimensional velocity vectors will track the pupils constricting when compared over a series of frames where the amount of light entering the eyes increases, such as when the user moves the device and screen closer to his or her face, or when a front-facing flash of a mobile device is activated.

Another feature that may be detected by pixel velocity analysis is reflection off the eye of the user. The surface of the eye reflects a larger amount of the light hitting it when the pupil contracts, providing a brighter reflection of the light emitting object. In the case of the device with an illuminated screen being moved closer to the face of the user, the size and brightness of the reflection of the device's screen will increase while the size of the pupil contracts. It is possible to observe and document these two-dimensional vectors in a consistent motion path and then provide a liveness evaluation on video frame sessions based on the expected two-dimensional vectors being observed or absent.

Facial recognition algorithms use landmarked points on the face to measure the distance and angles between the facial features. This creates the unique look of individuals and the corresponding unique biometric data. In some embodiments, pixel velocity analysis may be used not only to verify the three-dimensionality of the person, but may also be used as an additional or alternative facial recognition algorithm.

In this instance, the device may recognize two-dimensional vectors of the features throughout the user's face as the user provides enrollment images while moving the camera in and out to fit the ovals as shown in FIGS. 13A and 13B. These two-dimensional vectors formed are caused by the distortion and movement of the facial features that occurs when the camera is brought close to the user's face due to the three-dimensional characteristics of the user's face. Tracking the two-dimensional vectors and mapping the two-dimensional vectors to each of the features of the user's face results in the creation of a unique "heat" map of the user's face using a two-dimensional camera. The "heat" map indicates "hot spots" where larger two-dimensional vectors show increased pixel velocities of certain facial features as opposed to "cool" areas where smaller two-dimensional vectors show small pixel velocities of other facial features.

Such maps have been found to be unique to each user as the user moves the device with the camera in and out to fit the ovals as shown in FIGS. 13A and 13B. Thus, the map of the two-dimensional vectors of pixel movement corresponding to facial features resulting from the device movement or the head movement can be used itself as biometric data in addition to verifying three-dimensionality of the person being imaged. That is, the two-dimensional vectors of the various facial features may not only be compared to expected values to determine the three-dimensionality of the user's face, but the two-dimensional vectors of the various facial features created as the user moves the device and camera relative to the user's face are themselves unique to each user based on the unique face of the user. Thus, unique heat maps are captured based on the three-dimensional facial features of the user registering with the authentication system, which can be associated with the user as biometric information for authentication.

Using previously authenticated and stored heat maps of the user's face, the system may thus analyze new authentication images with pixel velocity analysis not only to determine the liveness or three-dimensionality of the person, but also to authenticate the identity of the person. These checks may occur simultaneously. That is, the system compares the heat map obtained from the authentication images to determine whether it matches the heat map obtained during enrollment based on person's unique, three-dimensional facial features. The two-dimensional vectors generated by the pixel velocity analysis are also examined to ensure they correspond with a three-dimensional person as opposed to a two-dimensional spoof. If the images captured by the device camera are determined to not represent a live user or do not match the authentication information, then it is contemplated that authentication will fail and access will be denied.

Pixel velocity analysis may allow for use of the authentication system with a stationary two-dimensional camera, such as on a laptop, an ATM, a car dashboard, or a desktop. That is, with the liveness detection provided by the pixel velocity analysis, it may be possible to omit the movement information provided by the accelerometer, magnetometer, and gyroscope of the device, which are lacking in such stationary devices as an ATM machine. This may be done by the user moving his or her head in relation to a stationary camera. The user's movement may be from normal, observable human movements, or may be a user action that is deliberately requested such as instructing a user to fit his/her face into an oval changing size on a screen so that the user leans in to fill the larger oval. Alternatively, the instruction could be a voice instruction. This provides the ability to verify the three-dimensionality of the user from the stationary two-dimensional camera. The individual's identity may be verified using facial recognition algorithms while additional identity confirmation, liveness and three-dimensionality detection can be provided by the pixel velocity analysis when compared to previously captured data from a similar motion scenario.

Touch Screen Enhancements

Additional added security modifications may include information about a user's finger. Many mobile devices with touch screens can detect the location and approximate size of a user's touch on the screen. Accordingly, an approximate size of a user's finger or thumb may be measured by the system. In addition to the size of a finger, an orientation angle of the finger or whether the fingers or thumbs of the right or left hand are used can be detected.

In one embodiment, a user selects an account to open, begins enrollment imaging, or begins authentication imaging by touching the touchscreen of the user device. The authentication system may thus detect whether the touch by a user during authentication corresponds with previously stored enrollment information including the size of the user's finger or thumb, amount of pressure applied to the screen and whether the user is right or left handed. This adds an additional security layer for the authentication system.

Figure 15:
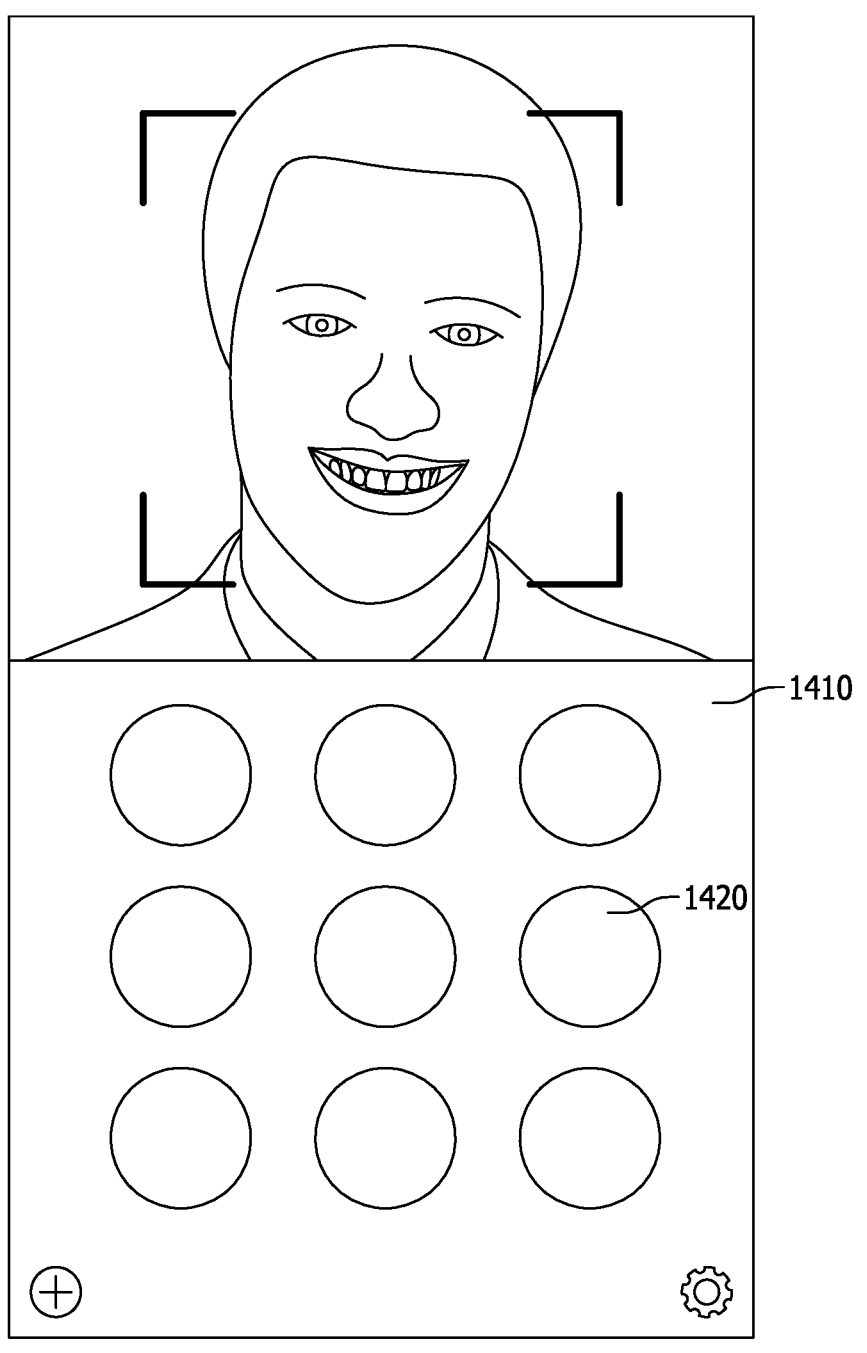
FIG. 15 illustrates an exemplary mobile device display showing a graphical code entry interface with an imaging area.

Furthermore, the authentication system may require that the user initiates an authentication by touching a fingerprint reader or the touchscreen in one or more predetermined manners. In one embodiment, as shown in FIG. 15, a touchscreen 1410 may be divided up into predetermined regions 1420. For example, there may be nine equal, circular, square, or other shaped regions 1420 on the touchscreen 1410 of the mobile device. During enrollment, the user selects one of the regions 1420 of the screen 1410 to touch to initiate authentication. During authentication, if the pre-selected region 1420 is not touched to begin authentication or during the entire authentication process, then authentication is denied. This is but one possible design possibility and other design options are contemplated.

Figure 16:
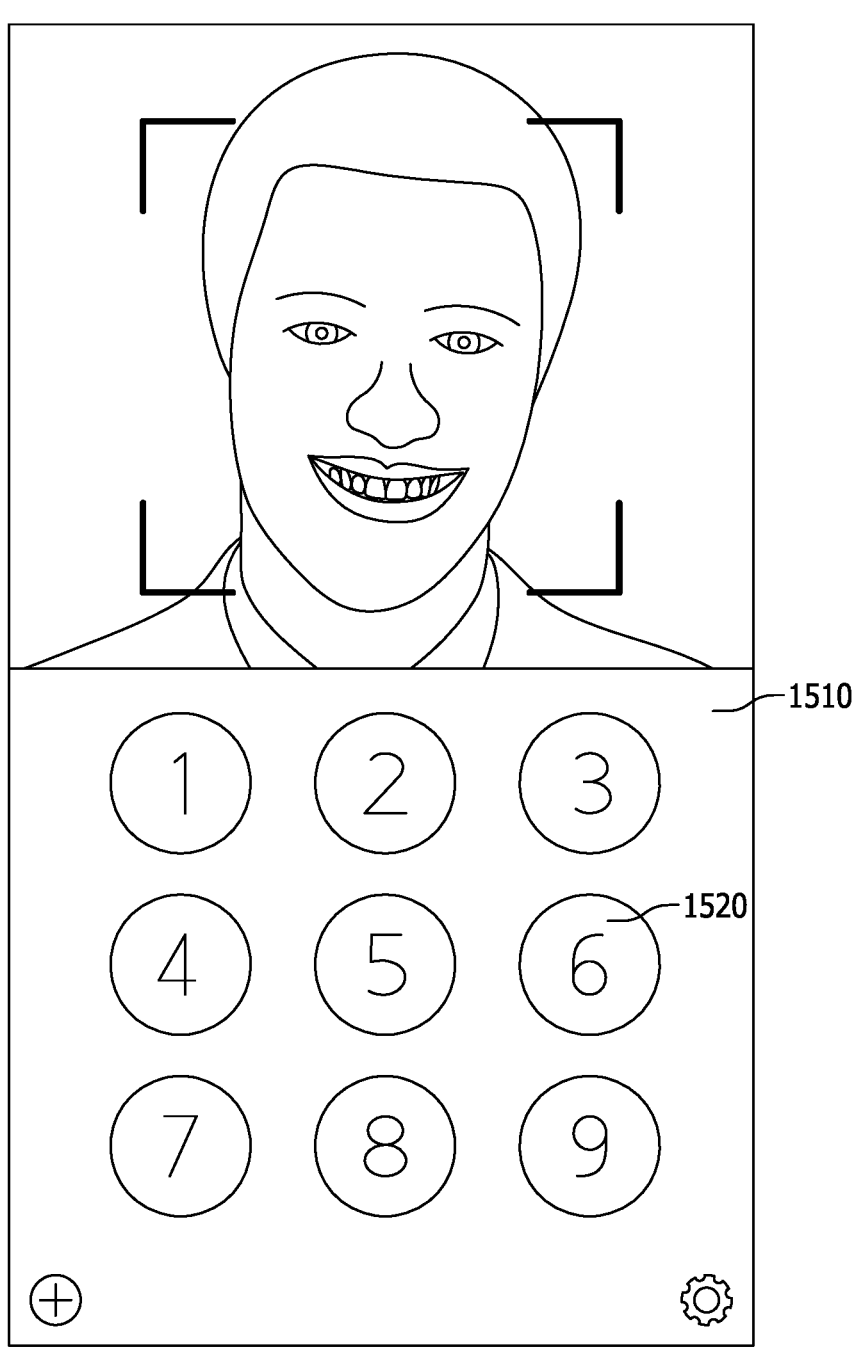
FIG. 16 illustrates an example mobile device display showing a numeric and graphical code entry interface with an imaging area.

The regions 1420 on the touchscreen may be visually represented by a grid, or may not be displayed at all on the touchscreen 1410. As shown in FIG. 16, in addition to or in place of the regions 1420, buttons 1520 may be displayed on a touchscreen 1510. Here, the user may initiate the authentication by pressing one or more of the buttons 1520 in a predetermined pattern. The user may also initiate authentication via a predetermined swiped pattern. The position to be touched by the user may change with each authentication attempt and may be conveyed to the user through any instructions from the authentication server, such as a code, number, letter, color, captcha or other indicator.

Voice Parameters

It is also contemplated that the user could record their voice by speaking a phrase while recording their images during the enrollment process when first using the system. Then, to authenticate, the user would also have to also speak the phrase when also moving the mobile device to capture the image of their face. Thus, one additional path parameter may be the user's spoken voice and use of voice recognition as another layer or element of the authentication process.

Image Quality Assurance

The authentication system may also process the images received from the mobile device to determine if the images are of sufficient quality. For example, the system may check the images for blurriness caused by the images being out of focus or by the camera lens being obscured by fingerprints, oils, etc. The system may alert that user that the quality of the images is insufficient (or too bright or too dark) and direct the user to adjust a focus, exposure, or other parameter, or to clean the lens of the camera.

Autofocus

The authentication system may also utilize an autofocus feature when the mobile device camera is equipped with such. For example, when an actual, three-dimensional person is being imaged, the system checks to ensure that the sharpness of the image changes throughout as the camera perform auto-focusing. In another embodiment, the system may control the autofocus so that the camera focuses on a first location or distance to check for sharpness (in focus) of a portion of the image containing a face. The system then controls the camera to focus at a second location or distance where the presence of a face is not detected and check for sharpness (in focus) of a portion of the image. If a three-dimensional person in a real environment is being imaged, it is expected that the focus settings should be different at the first and second locations, which suggests a real person is presently being imaged. However, if the face appears to become large but the focus points of both locations are the same, this indicates that a two-dimensional video screen is being imaged, indicating a fraudulent login attempt.

The system may also control the auto-focus of the device to check for different focus points of different particular features in the image. For example, when a person's face is imaged from the front, a person's ear is expected to have a different focus point (more distant) than the tip of a person's nose.

Images of Login Attempt

The authentication server may also be configured to store the authentication images for a predetermined length of time. The images may provide additional security benefits as evidence of a person attempting to log in to a user's account. For example, the system may store a predetermined number of prior log in attempts, such as twenty login attempts, or store images from login attempts for a predetermined time period, such as during the past seven days or weeks. Any fraud or attempted fraud will result in pictures of the person attempting the login being stored or sent to the authentication server of the account server.

The mere knowledge that photos will be taken and sent is a significant deterrent to any potentially dishonest person because they know their picture will be taken and stored, and it is an assurance of security to the user. Likewise, any attempted and failed attempt can have the photo stored and indicator of who is attempting to access the account. It is also contemplated that an email or text message along with the picture of the person attempting the failed log in may be sent to the authorized user so they know who is attempting to access their account. This establishes the first line of security for the account as the user with the photo or image also being possessed by the authentication server.

Adaptive Match Thresholds

Further, the level or percentage of correspondence between the enrollment information and the authentication information to authenticate the user may change over time. In other words, the system may comprise an adaptive threshold.

After a user regularly uses the authentication system described above, the user will have logged in with the system by moving the mobile device in the predetermined path relative to his or her head many times. Accordingly, it may be expected that as the user will gain experience using the authentication system, and that the user will gradually settle into a comfortable and standardized motion path. In contrast, the initial enrollment movement of a user will likely be the most awkward and clumsy movement as the user has little experience with the authentication system.

To make the authentication system more convenient for the user without losing security, the adaptive threshold system allows the enrollment movement to adapt so that the user is not locked into the awkward and clumsy initial movement as the enrollment movement. To facilitate this, upon each successfully authorization, the successful authorization movement is stored, and the motion path is added to a list of acceptable motion paths. The list of acceptable motion paths may be limited to a predetermined number of paths. When a new successfully authorization is completed and the list of acceptable motion paths is full, the older enrollment motion path is deleted and the newest is stored in its place. Alternatively, the motion path that is least like the other motion paths stored on the list may be deleted. Thus, by storing the most alike or newest motion paths, the enrollment movement may slowly adapt over time as the user because familiar with the system and settles into a comfortable motion path for authentication.

In addition, other enrollment information may adaptively change in a similar manner as the user information. For example, successful authentication photos or biometric information can be stored as part of the enrollment information and old enrollment information may be discarded over time. In this manner, the authentication system can be convenient for a user even over a long period of time as the user experiences aging, facial hair growth, different styles of makeup, new glasses, or other subtle face alterations.

Determining how much variance is allowed over time in the motion path, the biometric information, or both may be set by the entity requiring authentication to meet that entity's security requirements. Time or number of scans after the initial enrollment can be used to modify the adaptive threshold. For example, during a first few days after enrollment, the threshold may be lower while a security threat is low and the differences in paths are likely to be higher. After several authentications or several days, the threshold may increase. The threshold further may be set based on trending data of either the motion path or biometric information. For example, the threshold may be more lenient in a direction the data is trending, while having a tighter tolerance for data against the trend.

A temporal aspect may also be added along with the location information. For example, if the user conducts and authenticates a transaction near his home, and then one hour later another transaction is attempted in a foreign country, the transaction may be denied. Or it may be denied if the distance between the prior authentication location and the next authentication location cannot be traveled or is unlikely to have been traveled in the amount of time between login or authentication attempts. For example, if the user authenticates in Denver, but an hour later an attempt is made in New York, Russia or Africa, then either first or second attempt is fraudulent because the user likely cannot travel between these locations in 1 hour.

Further, if the next transaction is attempted at a more reasonable time and distance away from the first transaction, the level of correspondence threshold may be raised to provide added security, without automatically denying the transaction. Likewise, an altimeter may be used such that if the altitude determined by the mobile device is different than the altitude of the city in which the user is reported to be located, then this may indicate a fraud attempt. Thus, altitude or barometric readings from the mobile device may be used to verify location and can be cross referenced against GPS data, IP address or router location data, or user identified location.

Upgrading Face Matching Algorithms

Often, new facial recognition (face matching) algorithms or other features of an application may need to be updated to ensure the security of the authentication system. When new algorithms are implemented, it is necessary to obtain new enrollment information corresponding to the new algorithm. However, it is undesirable to require users who have already authenticated with the system enroll again every time the application is updated. This would inconvenience and frustrate the user if, for example, the user is logging into a payment system to make a purchase at a store, and the application prompts the user to enter a password and/or re-enroll rather than allowing the user to quickly complete the transaction as planned.

Accordingly, in one embodiment the system performs a biometrics "handoff" to update the enrollment information with a new facial recognition algorithm based on an application or software update. For example, when the software or application is updated with a new facial recognition algorithm, the application retains the prior facial recognition algorithm. During the next login attempt the images captured are used to authenticate the user along with any and all liveness checks using the older facial recognition algorithm. If the person is authenticated, the images are then authorized to be used by the new facial recognition algorithm to generate new enrollment information with the new biometrics algorithm. The new enrollment biometric information is considered trustworthy because it is based on a successful login attempt using the prior biometrics algorithm. This process may be done a certain number of times (login with old algorithm creating enrollment information with new algorithm) until a sufficient biometric profile on the new facial recognition algorithm is created. Once the new profile is created, the prior biometric profile based on the old facial recognition algorithm is deleted. In this manner, it is not necessary for a user to re-enroll when the application is updated with new facial recognition algorithms or other features.

Random Image Distortion

To provide an additional layer of security to the facial recognition authentication system, the system may utilize random image distortion. For example, a user may be assigned a random distortion algorithm upon enrollment into the system. The distortion algorithm may include such distortions to the image as widening or narrowing the person's face by a predetermined amount, adding or superimposing a predetermined shape at a predetermined position on the user's face. As one example of this, the distortion may be a circle superimposed at 100 pixels above the user's left eye.

With the uniquely assigned distortion on the images from the user, the biometric data for that user will be unique to the account or device used by the user. That is, the enrollment biometrics stored on the authentication server or on the mobile device will reflect not only the facial features of the user, but also will reflect the uniquely assigned image distortion. Thus, even if an accurate, fraudulent representation of a person were used on a different device or via a different account, the proffered authentication biometrics would not sufficiently correspond due to a different or an absence of the unique distortion. Thus, the overall security may be enhanced.

Security Layers

It is noted that each of the above embodiments, modifications, and enhancements may be combined in any combination as necessary to create multiple layers of security for authentication. For example, the face matching or facial recognition may be combined with motion detection or path detection, or may operate independently of these features for authentication. Further, when more than one of the above described enhancements or modifications are combined, the authentication system may be configured so as not to provide any feedback or indication on which layer failed authentication.

For example, when a predetermined touch pattern to initiate authentication is combined with the authentication movement and facial authentication, the system does not indicate whether a touch pattern was incorrect, or the authentication movement or authentication images failed to correspond to the enrollment information. Instead, the system provides an identical denial of authentication no matter what failure occurs. This is the case when any number of the security features described above are combined. In this manner, it is difficult for a fraudster to detect what aspect of the fraudulent credentials must be corrected, further enhancing the security of the system.

All of the above features may be incorporated together, or only some features may be used and others omitted. For example, when the device prompts the user to move the device so that the user places his or her head within a first small frame (such as an oval) then to a second large frame (such as in FIGS. 7A, 7B, 13A, and 13B), the system may be configured such that facial recognition need not be performed on the image(s) in the first frame (distantly captured frames). The security of the system is maintained by performing facial recognition throughout the imaging at some point between the first and second frames, and at the second frame. This may especially be true when also integrated with another layer of security, such as checking eye tracking following a moving object on the screen or reading a reflection of a QR code or random shape off the user's eye. In another embodiment, when two or more cameras are used creating three dimensional, stereoscopic images, the facial recognition may not be performed at the first, far away frame, but instead the liveness of the person may be validated at the closer in frame only after the movement of the device. In still other embodiments, other security layers may be used, and the motion parameters may be omitted. Such combinations may be beneficial for larger or stationary devices, such as gaming laptop computers, personal desktop computers, a stationary kiosk, or the like.

Example Applications

Likewise, although described herein as financial account authentication, the authentication using path parameters and image data may be implemented in any environment requiring verification of the user's identity before allowing access, such as auto access, room access, computer access, web site or data access, phone use, computer use, package receipt, event access, ticketing, courtroom access, airport security, retail sales transaction, IoT access, or any other type of situation.

For example, an embodiment will be described where the above authentication system is used to securely conduct a retail sales transaction. In this embodiment, a user is enrolled with the authentication server or an authentication application on the mobile device as described above and has generated enrollment information including enrollment images and/or biometrics, and enrollment movement. In this example, the user initiates or attempts to complete a transaction at a retail establishment with a credit card, smart card, or using a smartphone with NFC capabilities.

The user begins the transaction by swiping a credit card, smart card, or using an application on a smartphone with NFC capabilities to pay for goods or services. The retail establishment would then authorize the card or account with the relevant network of the financial institution ("Gateway"). For example, the retail establishment, through a Gateway such as one operated by VISA or AMERICAN EXPRESS would determine whether the account is available and has sufficient available funds.

The Gateway would then communicate with the authorization server to authorize the transaction by verifying the identity of the user. For example, the Gateway may send an authorization request to the authentication server, and the authentication server then sends a notification, such as a push notification, to the user's mobile device to request that the user authenticate the transaction.

Upon receipt of the notification from the authentication server, such as through a vibration, beep, or other sound on the mobile device, the user may then authenticate his or her identity with the mobile device. The authentication server may also send information concerning the transaction to the user for verification by the user. For example, the authentication server may send information that causes the mobile device to display the merchant, merchant location, and the purchase total for the transaction.

Next, as before, the user may hold the mobile device and obtain a plurality of authentication images as the user moves the mobile device to different positions relative to the user's head. While moving the mobile device to obtain the authentication images, the mobile phone further tracks the path parameters (authentication movement) of the mobile device via the gyroscope, magnetometer, and the accelerometer to obtain the authentication movement of the device. The mobile device may then send the device information, the authentication images, and the authentication movement to the authentication server. In other embodiments, the mobile device may process the images to obtain biometric data and send the biometric data to the server. In still other embodiments, the mobile device may process the images, obtain the authentication information, compare the authentication information to enrollment information stored on the mobile device, and send pass/fail results of the comparison to the authentication server.

The authentication server may then authenticate the identity of the user and confirm that the user wishes to authorize the transaction on his or her account if the device information, authentication images and/or biometrics, and authentication movement correspond with the enrollment device information, the enrollment images and/or biometrics, and the enrollment movement. The authentication server then transmits an authorization message to the Gateway. Once the gateway has received confirmation of the authorization, the Gateway then communicates with the retail establishment to allow the retail transaction.

Several advantages may be obtained when a retail transaction is authorized utilizing the above system and method. Because the identity verification of the user and the confirmation of the transaction is completed via the authentication system and mobile device, there is no longer a requirement for a user to provide his or her credit card or signature, or to enter a pin number into the retailer's point of sale system. Further, the retail establishment does not need to check a photo identification of the user. The above method and system also have the advantage that it provides secure transactions that can work with mobile and online transactions that do not have cameras, such as security cameras, on the premises.

In the secure retail transaction described above, the user obtains the total amount due on his or her mobile device from the retail establishment via the Gateway and authentication server. However, in one embodiment, the mobile phone may use the camera as a bar code, QR code, or similar scanner to identify the items and the prices of the items being purchased. The mobile device may then total the amount due and act as the checkout to complete the transaction with the retail establishment.

In another embodiment, a user of the application may want to anonymously pay an individual or a merchant. In this instance, the user would designate an amount to be paid into an application, and the application would create a unique identifying transaction number. This number may then be shown to the second user, so the second user can type the identifying transaction number on an application on a separate device. The unique identifying transaction number may also be sent from the user to the second user via NFC, Bluetooth, a QR code, or other suitable methods. The second user may also type the amount and request payment.

Upon receiving the payment request and unique identifying transaction number, the authentication server may send a notification to the first user's mobile device to authenticate the transaction. The user would then verify his or her identity using the facial recognition authentication system described above. The user may alternatively or additionally verify his or her identity using other biometric data such as a fingerprint or retina scan, path-based motion and imaging, or the user may enter a password. Upon authentication, the user's device would send a request to the user's payment provider to request and authorize payment to the second user. In this manner, the payment may be done securely while the users in the transaction are anonymous.

According to one embodiment, as an additional measure of security, the GPS information from the mobile device may also be sent to the authentication server to authenticate and allow the retail transaction. For example, the GPS coordinates from the mobile device may be compared with the coordinates of the retail establishment to confirm that the user is actually present in the retail establishment. In this manner, a criminal that has stolen a credit card and attempts to use the card from a distant location (as compared to the retail location) is unable to complete a transaction because the user's phone is not at the location of the retail establishment. IP addresses may also be used to determine location.

As explained above, the level or percentage of correspondence between the enrollment information and the authentication information to authenticate the user may also be adjusted based on the coordinates of the GPS of the mobile device. For example, if the retail establishment and GPS coordinates of the mobile device are near a user's home, then the level of correspondence may be set at a lower threshold, such as at a 99% match rate. Alternatively, if the location is very far from the user's home, and is in a foreign country, for example, then the level of correspondence may be set at a higher threshold, such as at a 99.999% match rate.

Also disclosed is a method and system for detecting and/or controlling camera status to detect improper or unexpected camera behavior and/or camera feed characteristics in a bypass attempt or to take control of the camera to inject a secondary video feed to processor or any type video feed that is not from the physical camera associated with or connected to the computing device. Stated another way, the disclosed method and apparatus verifies that the camera's video feed is coming from real-time collected data from a physical camera, not a prerecorded video being spoofed in real-time via synthetically created video frames. Video injection is the act of tricking the system into thinking it is using or receiving a video feed from the camera, but it is really being fed prerecorded video frames. This can also be called a camera bypass. If the application is checking for the camera properties, then the hacker must make their software mimic the exact characteristics of the real physical camera in that device. As disclosed herein, that could be capture resolutions, model #, microphone name, and of course it should take the appropriate time to start up.

In reference to FIG. 2, the computer device includes a camera. The camera 276 equipped computing device may be a mobile device, such as a tablet or smartphone, a desktop or laptop computer with webcam, or any other type computing device with camera and optional network communication capability. As part of the user authentication or verification process, such as described herein or any other type or manner of process (hereafter authentication), a processor executes software code (machine executable instructions) to conduct an authentication session. As part of the authentication session, the software code activates the camera and times how long it takes for the system to return a video frame or frames of the video feed (hereafter video feed) after activation.

Physical cameras take longer for the video feed to begin streaming images than video injection fraud attempts such as virtual camera software. Commercially available virtual camera software will typically instantly start delivering video frames, and that exposes that the camera is not physically being started. It happens too fast for it to be a physical camera.

Some attempts to improperly spoof or fool the authentication session involves intercepting the video feed from the camera to the processor or other processing element, thereby injecting data that is different from that which is actually captured by the camera of the computing device being used for authentication. The processor may comprise a CPU (central processing unit) or GPU (graphic processing unit) or any other element that interfaces with the camera. The fake camera feed is selected by the application and the video injection software provides the processing software an injected virtual image/video feed to make it appear as if a real person or a different purported person is being imaged by the camera than what is actually in front of the camera or present with the device. Thus, instead of the actual physical camera in the computing device capturing the video/image feed of the actual person in front of the camera, an injected (pre-recorded video stream is provided to the processor for the authentication session. This may be referred to as injecting a virtual camera feed in place of the actual physical camera output. This provides a possible security risk.

To overcome this drawback in prior art systems and to counter this potential weakness in an authentication session and system, a method and apparatus is disclosed which provides counter security to this fraudulent authentication attempt. In general, camera operation of the computing device is monitored and analyzed to detect and prevent authentication when the system detects other than the actual video feed from the camera associated with the computing device.

The following methods may be executed on the computing device which captures the images or at a remote location, such as a server. The processes may occur by execution of machine readable code by a processor to perform the steps disclosed below. The machine readable code may be stored in a memory in a non-transitory state and read from the memory by the processor. The processor or other element of the computing device may send activation control signals to the camera, monitor and detect the video output from the camera. The camera output may be one or more images or a video feed (data stream) from the camera. The term image and video stream are often the same thing, such that a number of sequential images form the video stream.

Figure 17:
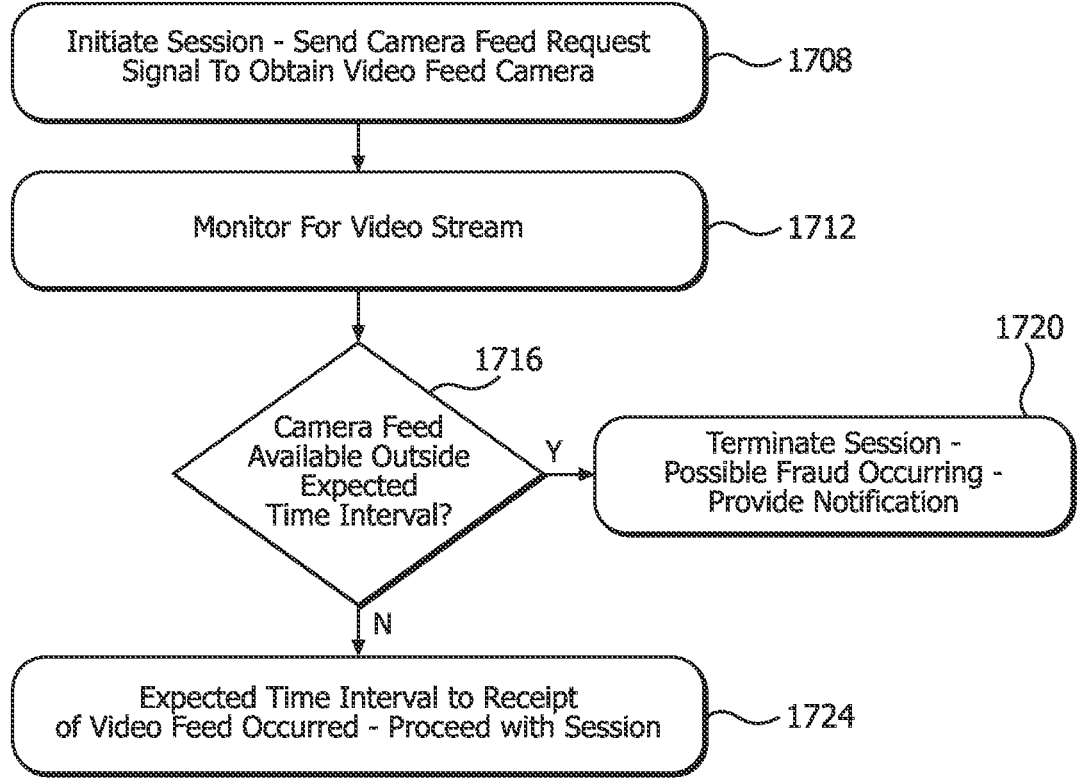
FIG. 17 illustrates an example method of detecting an injected camera feed from a virtual camera or other source.

FIG. 17 illustrates an example method of detecting an injected camera feed from a virtual camera or other source. This is but one possible method of operation and other methods of operation may be derived after reading this disclosure.

At a step 1708 a session is initiated, and as part of the session 1708 initiating, a camera video feed request signal is sent to the operating system or browser to obtain the camera's video feed (understood to mean video or image). In this embodiment a camera feed request signal is sent from the authentication application to the browser or operating system, but in other embodiments, it could be a camera activation signal or camera on/off signal.

Under normal circumstances the camera is not sending a video feed to the device's processor, so if the video feed is available to the authentication application immediately, that would be an indicator that a virtual video feed is being injected in place of the actual camera stream, or that the camera is already on. Obtaining the camera video feed from a computing device is a known action and as such is not described in detail. In addition, in a camera system, there is a short time delay between the request for the camera feed and the actual receipt of the video feed by the processor or requesting application. In one embodiment, the type of camera may be analyzed to determine the expected delay for the particular camera model. Regardless, all cameras have some delay between request of the video feed and the camera physically outputting a video feed. This delay may be due to the time it takes for charge to accumulate on the CCD, reading the data from the CCD, and assembling the captured data into a video stream output. At a step 1712, the system monitors for receipt of the video stream after the request in step 1708. Monitoring for receipt of a video feed at the requesting software application occurs to determine if the video stream is provided instantly or concurrently upon request of the video fee, or if there is the expected delay before the video stream is accessible to the authentication (software) application.

By detecting for a video feed upon camera feed request, use of a virtual camera (injected video feed) can be detected. An injected video feed will typically be available at a time that is different than what would be expected from the delay of a physical camera output. Use of virtual camera software is a sign or indicator of an attempt to spoof or commit fraud during the authentication session. Upon receiving the video feed request signal, a camera of a computing device will have a short delay before it outputs any video or images frames (hereafter feed). The delay between the camera video feed request and actually receiving a camera feed from the camera may be in the time frame of 200 to 500 milliseconds, but will vary by camera and can be outside this range. The amount of delay may vary from camera to camera and may also be based on the type of camera technology used, but when a physical camera is not already powered on there is always some delay between the request to access the camera feed and the output of a video stream or image. By monitoring for, detecting, or controlling the camera feed request, activation, or on/off process, attempts to inject a virtual camera feed to spoof an authentication session can be detected.

At a decision step 1716, if the camera video feed is instantly or concurrently available upon camera video feed request or camera activation, or if the camera feed is received outside of an expected time interval that should be expected for a camera or a particular camera, then the operation advances to 1720. As discussed above, a computing device camera has a short pause or time period, once the video feed is requested, before it outputs a video feed or image. As such, if at step 1716 it is determined that the camera feed is instantly available, or available in a time period that is outside or an expected time interval of what is expected, this is a sign of an attempt to inject a virtual video feed to the processor or requesting software application. At step 1720, the session is terminated in response to the detection of a spoof attempt.

Alternatively, if at step 1716 the camera video feed is not instantly available or if the camera video feed is delayed for an expected time interval (due to the nature of digital camera operation) and thus received within the allowed time frame (window), then the determination or assumption is made that an expected amount of delay occurred between the video feed request and the physical camera providing the video feed, and the authentication session can proceed because the camera feed does not show signs of being from a virtual camera feed. At a step 1724, because the expected time interval to receipt of the video feed occurred, the application software proceeds with the authentication session.

It is contemplated that in all embodiments, the time delay of the camera may be monitored over time to create a typical or average baseline delay value and this amount of baseline may be compared to the time between the video feed request and the receipt of the video feed. In other embodiment, the time delay is known for different types of cameras. Establishing the baseline provides a delay amount for the actual camera and the system in which it is installed.

Figure 18A:
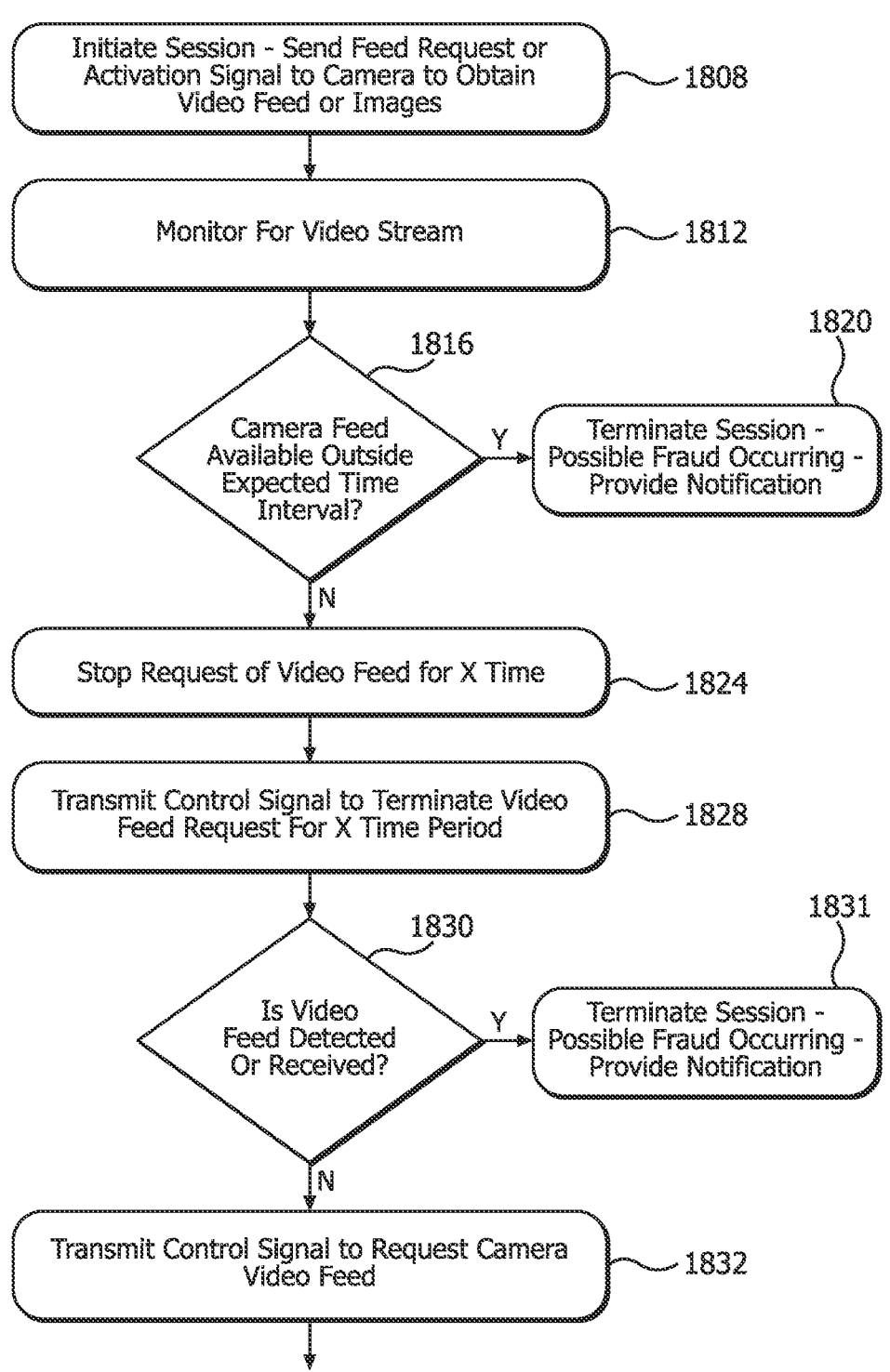
FIGS. 18A and 18B illustrates alternative method of operation.

An alternative method of operation is disclosed in FIG. 18A. In this embodiment, an example method of monitoring camera operation after one or more camera feed request/termination cycles of the camera feed is disclosed. It is contemplated that other variations of the method are possible based on the following disclosure. In this embodiment, steps 1808, 1812, 1816, 1820, are generally similar to that shown and described above for FIG. 17, and as such are not described again.

Advancing to step 1824, after an expected delay (time interval) occurred between camera video feed request by the authentication application and receipt of the video feed, then the application generates a request to stop receiving the video feed for X period of time.

Then at a step 1828, the requesting application or other software module will transmit the control signal (request) to the browser or operating system to terminate receipt of the video feed for X period of time. As a result, the application no longer receives a video feed, or terminates access, which will result in the authentication software application losing access to, or receipt of the camera video feed. This time period may be maintained for any period to time, referred to in FIG. 18A as X period of time. This time period X may be a randomly generated period of time or predetermined by the authentication software application. This off period duration is known by the authentication application and is used in a future comparison as discussed below.

At optional step 1830 a decision step occurs to determine if a video feed, such as a video injection, is detected, and if it is, then the session may be terminated at step 1831.

At step 1832, the camera video feed is requested by the authentication application and this request is sent to the browser, device operating system, or camera, with the time tracked between the request being sent and actual receipt of the video feed by the authentication application. Concurrent with this, the authentication application is monitoring for receipt of the video feed. This camera feed access delay should result in the approximately same time delay as any previous camera feed request by the authentication application. If this is faster by more than a pre-determined amount of time or different than an expected time interval, which may vary from camera to camera, than prior access requests or than is expected, then that is an indicator that virtual camera software may be the source of the video feed.

For example, the time period that the camera is off, plus any turn on delay, is calculated and is compared to the actual time that the video feed is not provided to (or requested by) the authentication application. These two time periods should match. If at step 1836 this is not the case, then a video injection may be occurring, which is a sign of fraud, which would advance the operation to step 1840 where the session may be terminated and a notification of possible fraud sent to the user, other software application, the entity requesting the authentication, or the authentication application.

If at step 1836 the camera feed is available within the expected window, responsive to a camera feed access request signal, then operation advances to step 1844. At a step 1844, the expected time period delay occurred prior to the camera feed being available due to the inherent camera delay between when a video signal is requested, and the actual video feed is received at the authentication application based on the determination at decision step 1836

In this method of operation, at a step 1846, this process repeats one or more times, such as N times, where N is any whole number, and the actual time interval or delay, between the request for the video feed and the actual receipt of the video feed. This actual time interval or delay is compared to an expected time interval or delay. The value of N may change each authentication session such that the process may occur or repeat one or more time to further reduce the chance of a success fraud. By cycling the camera feed access request N number of times makes it more difficult for a person attempting to spoof the authentication session with an injected video stream to mimic the on/off cycling of the camera feed requests. If N is a random number (or other value) that changes each session, then accurately predicting the number of times. In addition, altering the period of time the camera is off during each cycle (an/or on during each cycle), such as with a random time duration, further complicates any video injection attempt. It is further contemplated that the duration of time the camera is on may also be changed each cycle, such as with a random time duration or a predetermined duration, to further thwart any attempt to perform a video injection.

At a step 1848 a determination is made whether the cycling has occurred the expected number of times, such as N times. If the camera feed delay during camera feed access request/termination (or on/off) cycling has not occurred with expected delays and the required number of times, then the operation advances to step 1852 and the session is terminated due to possible fraud or a spoof attempt occurring, and notification may be provided. Cycling the camera video feed request, a specific number of times makes it more difficult for a person attempting to spoof the authentication session with an injected video stream, which would have to also mimic the exact same number of camera video feed request cycles of the camera video feed. Alternatively, if at step 1848 the camera video feed request cycling process has resulted in an expected number of video feed request cycles, the operation advances to step 1856 and the session continues. The session may be any type of authentication or user validation process such as but not limited to three-dimensionality detection of the user's face, facial recognition, age estimation, liveness determination, location estimate, or any other type of operation that utilizes a camera video feed that may attempt to be spoofed by a video feed.

It is contemplated that the value N, which defines the number of times the camera video feed request cycles, may be determined or selected in a number of different ways. For example, the value N may be the same for every authentication session. In addition, the value N may be determined by cycling through a list of different N values. It is also contemplated that the value N may be generated by a random number generator or other method of generating a random number. The value of N may be capped so as to not excessively delay the authentication process with a large number of camera video feed request cycles. By changing the value of N for each different authentication sessions, it is significantly more difficult for a fraudster to anticipate the delays their virtual camera software must mimic for a session to be successfully spoofed using a virtual camera or any other type of camera feed injection. To do so would require that not must a fraudster have to build into the virtual video feed, the proper camera delay between camera activation and receipt of the video feed, but also unrequested the camera feed request at the proper time, and not request the video feed again until the expected time interval has elapsed. Similarly, if the camera on time is also changed during each cycle, this would also have to be known and accurately mimicked to maintained expected timing of when the requested video feed should be received. In addition, a person attempting to spoof an authentication session would also have to know or guess the number of times that the camera feed requests are cycled (N times), and this number may randomly change from session to session.

Figure 18B:
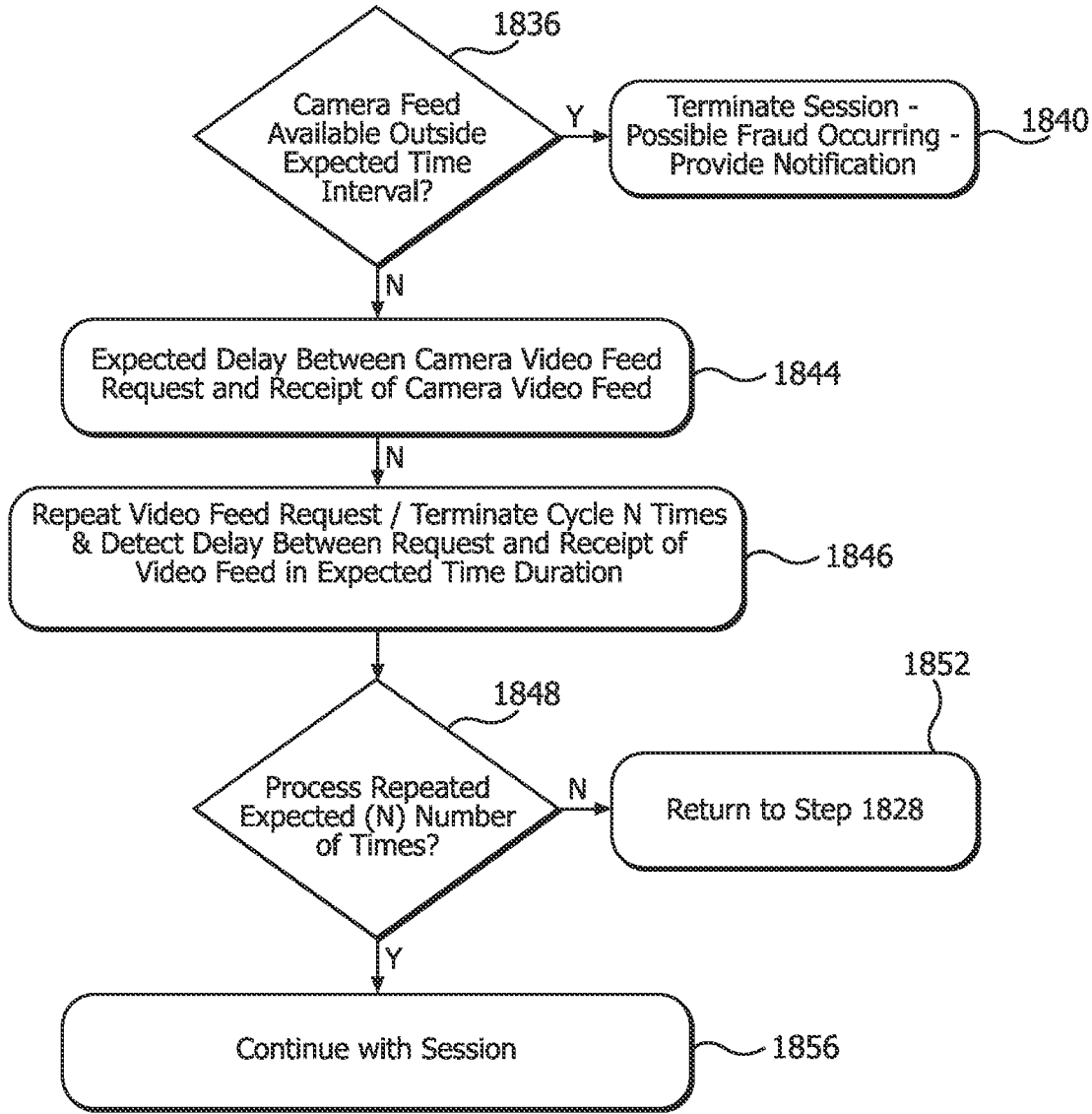

FIG. 19 illustrates an example method of operation that includes controlling camera feed off request duration as part of a camera feed request on/off cycling. Aspects of FIG. 19 which share common elements with FIGS. 18A and 18B, and as such aspects which overlap are not described again. In reference to FIG. 19, steps 1904, 1908, 1912, 1916, and 1920 are the same or similar to the initial steps in FIG. 18A and are not described again. At a step 1924 a value X is established, and the application software terminates receipt of the camera feed, such as by sending a signal to the operating system to maintain receipt of the camera video (or image) feed. The value X may be any number and is used to control how long the video feed is left requested or on by the authentication application. The value X may change from authentication session to authentication session and/or may change between each video feed access request cycle within an authentication session. In one embodiment the value of X is fixed based on values stored in memory or a look up table. In one embodiment the value of X varies based on a group of stored values. In one embodiment, the value of X is determined by a random number generated by a random number generator or other means for random (or semi-random) number generation. Other possible means for generating the value X include based on an algorithm that draws on various variable data, such as but not limited to one or more of, or a combination of, time of day, authentication session for the user, date, user's personal information, random data, or any other value. Due to the random and often changing nature of the value X, it would be difficult for a person to anticipate the value of X. At a step 1928, the application waits for the X time period while the video feed is being received. Video frames should be provided to the authentication application during this time period.

Then at a decision step 1936, the camera feed request is monitored to verify it has been received for X time, which is the expected duration that the camera should be on and providing a video feed to the application software.

If a video feed is not detected, then the operation advances to step 1940 and the session may stop and notification can be sent. Alternatively, the authentication session can advance to step 1950 and continue.

Figure 20:
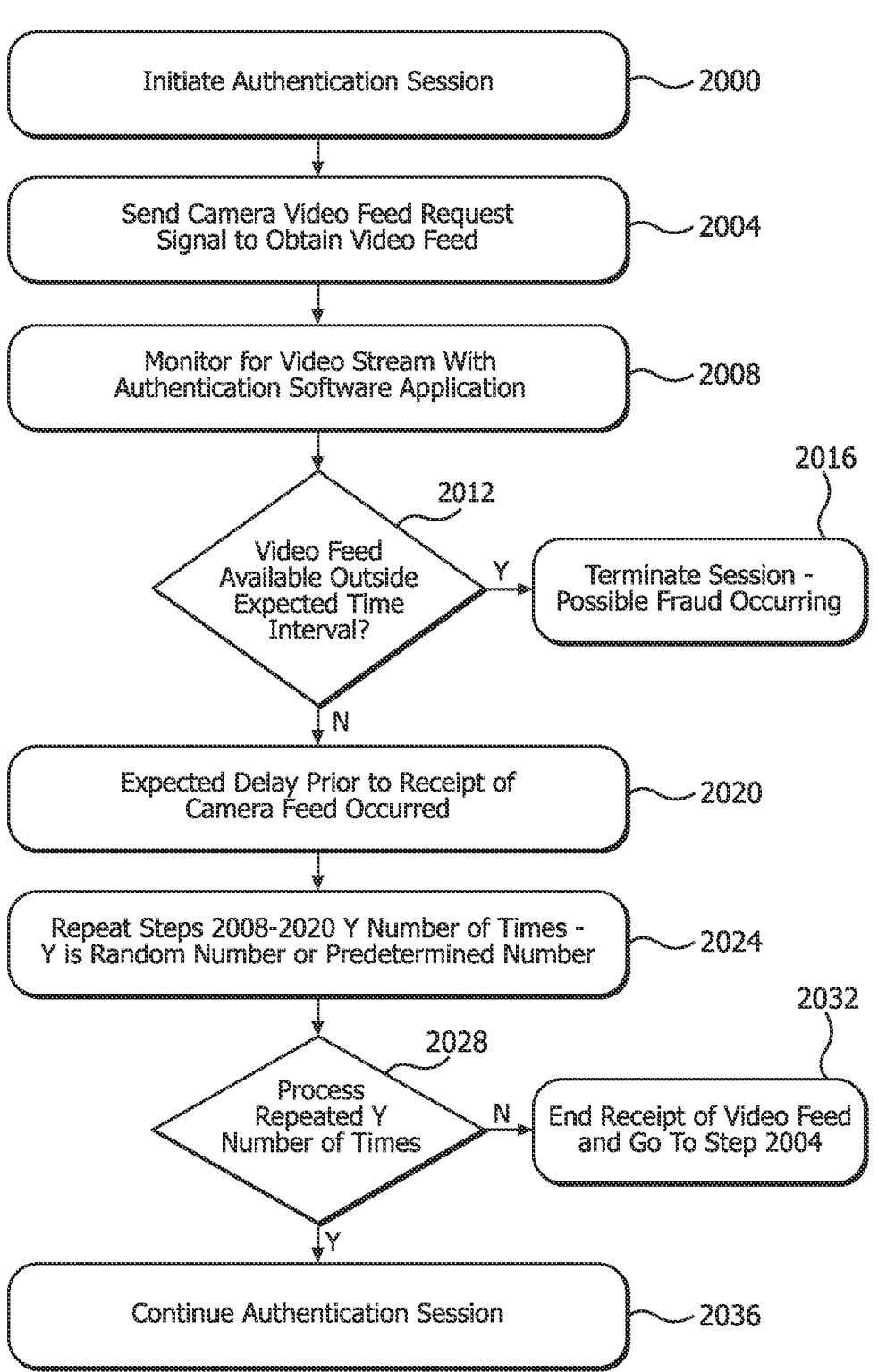
FIG. 20 illustrates an alternative embodiment of video injection detection.

FIG. 20 illustrates an alternative embodiment of video injection detection that cycles the detection operations a fixed or random number of times. This but one possible embodiment of video injection detection. It is contemplated that the feature(s) from any embodiment disclosed herein may be combined with any of the other one or more features as part of new embodiments or variations on existing embodiment. In this embodiment, the camera delay detection of FIG. 17 is repeated a predetermined or random number of times to reduce the likelihood of a successful video injection. At a step 2000 the system initiates an authentication session. At a step 2004, the authentication application sends a camera video feed request (or camera activation signal in alternative embodiments) to the operating system or browser to obtain a video feed. The time at which this request is sent is recorded or a timer is started. At a step 2008, the authentication application monitors for the video stream until the video stream is received. The time between the request for the video stream or camera activation and the actual receipt of the video stream is recorded.

At a decision step 2012, a determination is made whether the video feed was available outside of the expected time interval. The expected time interval is an expected time interval at which the video feed is expected give the type of camera and other device/software parameters. As discussed herein, there is an inherent delay between requesting the video feed (and thus activating the camera) and the actual receipt of the video feed. The actual time it took to receive the video feed can be compared to the expected time it should take for a camera to output a video feed and based on this timing comparison a determination can be made whether the video feed received at the authentication application is actually from the camera, or a video injection. If the video injection is received before or after the expected time or window of what a physical camera would output a video feed, then that is an indication that the received video feed is from a video injection.

If at decision step 2012 the video feeds are received outside of the expected window, such as too soon or too late, then the operation advances to step 2016 and the session will terminate. Alternatively, if at decision step 2012 the determination is made that the video feed was received within the expected time interval, then the operation advances to step 2020. At step 2020, because the expected delay occurred, and a record is made that the expected delay occurred, and that the operation has cycled. Next, at a step 2024, the operation repeats steps 2008-2020 up to Y times, where Y is any whole number and Y may be a random number or a predetermined number. Where Y is a random number that changes with each authentication session, any attempted fraud attempt using video injection will not know how many times the process will repeat, thereby making it difficult to know how many times to perform the video request and monitoring cycles during a fraud attempt At decision step 2028, a determination is made whether the process has repeated Y number of times. If not, then the operation advances to step 2032. At step 2032, the application software ends receipt of the video stream, and the operation returns to step 2004 and the operation repeats until it has occurred Y times. If, at step 2028, the process has repeated Y number of times, then the operation advances to step 2036 and the authentication session proceeds.

It is contemplated that the various elements and features of each method may be combined in any manner to arrive at other combinations to form a more secure authentication system which is more difficult to spoof, even with a complex virtual camera feed injection.

It is also disclosed that the requested camera resolution may be changed during one or more of the camera feed request cycles of any of the methods or steps described above or independent of any of the methods described above. To further prevent fraud, the delay between camera feed access request signal and actual output of a camera feed may be monitored and recorded for different camera resolutions.

As discussed above, during each cycle, the system can adjust or change (such as randomly) the duration of time that the feed is unrequested or that the feed is received, as the system cycles between the video feed request and video feed termination. This changes the time, each cycle, that a video injection attempt would have to match, to spoof the system. For example, there is a time period in the cycle when the video feed is not requested (randomly changes) which is added to the start up time for the camera. These two times are added together to develop the expected time interval.

In addition, the number of time that the cycle repeats can be adjusted from authentication session to authentication session. For example, each authentication session may run the 5 cycles, or the number of cycles may be adjusted randomly from session to session. It is also contemplated that if the actual time of receipt of the video feed, after the request, is outside the expected time interval, then the additional cycle may be added. For example, in one possible embodiment, the software is set to run a random number of cycles (see FIGS. 17-20) between 2 and 5, and if any of those cycles yield an actual time interval for receipt of the video feed that is outside the expected time interval (too soon or too late), then the number of cycle may be increase by a fixed or random number of additional cycle to further detect video injection, such as by adding another random number of cycles between 2-5 cycles. All these values are exemplary and can vary in actual implementation.

It is further disclosed that the authentication application software may be configured to require exclusive use or receipt of the video feed. Thus, if the application detects that another application is receiving the camera feed, then the application software may require that the other apps cease use of the video feed and the camera be turned off. A notice may be provided to the user to close the other application. By stopping other use of the camera, the camera will likely be turned off and thus, when the authentication application requested the camera video feed, the camera must first be turned on and activated, which establishes the delay described herein. If the camera were already on, such as from use by another application, then the video feed may be provided, to the authentication application, too quickly, thus falsely appearing as a video injection. Stated another way, there would not be expected delay between request of the video feed and actual receipt of the video feed.

It is also contemplated that the authentication application may monitor camera activation delay over time to create a baseline delay time from actual monitoring. Then, this baseline activation delay may be used in the comparison during an authentication session to catch the rarely occurring video injection attempt. The baseline may be set during a training session, at application installation, or based on an average over time. Alternatively, the activation delay for different camera types may be stored in memory for future use.

This proposed approach has several benefits. This may be another way to detect a spoof attempt by a virtual camera, which would not change its resolution in response to control signal requests dynamically provided to the camera which changes the resolution of the camera feed. For example, in one method of operation, the software can generate a control signal to request an available camera resolution to be output, and thereafter, the camera output can be monitored to verify that the requested camera feed resolution is forthcoming. If a spoof attempt is occurring, the camera feed output resolution would not match the expected resolution unless the injected virtual camera feed was also able to change its output resolution to the exact same resolution at the exact same time.

In addition, the process by which the resolution is adjusted could be made even more difficult to copy by changing one or more aspects of the resolution changes. For example, the timing of the resolution change, or which resolution to change to, could be randomized or based on some unpredictable factor, selected from a list of pre-defined order changes, or some combination of these factors. For example, the system could randomly select a particular resolution to use and then cycle through different resolution changes one or more times, making spoof attempts impossible. Likewise, the timing between each resolution change may be controlled and monitored, randomized, or based on some other factor. It is contemplated that any method disclosed herein be combined with these proposed methods to further secure the authentication session.

It is also disclosed that monitoring may occur for the correct and expected amount of delay between a camera feed request from the authentication application to when the computing device delivers the first video frames via the camera feed for the particular video resolution of the video output feed being present. After testing, it has been determined that the delay between when a camera feed request signal is received by the device (or software) and when the camera outputs a video feed will change based on the camera's output resolution. At higher resolutions, the delay between the feed request signal (or on/off or activation signal) to when the actual camera output feed is received greater than the delay at lower resolutions. Using this information, it is proposed to monitor and determine the delay between the camera feed access request by the authentication application and the actual camera feed output timing and compare the experienced delay to the expected delay for a particular resolution on that device type. If the delay period did not match that which is expected for the particular camera feed resolution, then this is a sign of a fraud or spoof attempt. This process may be repeated several times by changing the resolution with each cycling of the camera on/off to further inhibit any spoof attempts.

As discussed above, numerous additional features may be added to this method of operation such as randomly changing the resolution and then monitoring for the expected delay for the randomly selected resolution. This makes spoofing the system more difficult. In addition, in some embodiments a basic check could be made to verify that the delay associated with a high-resolution camera output is greater than the delay associated with a low-resolution camera output. It is also contemplated that the actual amount of delay in the camera output after activation signal may be tested and recorded for each camera resolution. This recorded delay data may then be compared to actual delay data during each session to verify that the amount of actual delay matches or is within an expected delay range per the prior testing.

In the various embodiments discussed herein, a further feature was enabled which allowed for repeatedly accessing the camera feed without continuous user interactions agreeing to the camera feed access request by the authentication application, which would limit the use of randomized timing and randomized numbers of camera feed access request cycles, as fraudsters would be alerted each time the camera feed request was being accepted and could prepare the virtual camera prior to accepting each camera feed access request. As part of the methods described above, requesting the camera feed multiple times or cycles with different variations, it is proposed to permanently set the camera feed access request for the authentication application to allow ongoing access without additional user interaction, such as clicking a screen button to manually allow access by the user. This setting may be in the operating system settings, web browser software, or any other required software to maintain the camera access grant to the authentication application process. In one embodiment, machine executable code is established and executed by the processor to ensure that continued camera feed access is granted to the authentication application thereby granting the authentication software control over the camera for repeated camera feed access cycles.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for detecting video feed injection during an authentication session comprising:

with a software application configured to verify camera feed security as part of a three-dimensionality evaluation, initiating an authentication session which utilizes a video feed from a camera of a computing device used to capture video of a user during the authentication session;

requesting a camera video feed from the camera;

prior to, after, or concurrent with requesting the video feed from the camera, capturing image data with the camera in the form of one or more images of a user's face;

at the software application, monitoring for receipt of the video feed at the software application;

receiving a received video feed at the software application, which may be a video feed injection or the video feed from the camera;

detecting a time interval between requesting the video feed and receiving the received video feed;

comparing the time interval to an expected time interval; and if the time interval does not match an expected time interval, terminating the authentication session.

2. The method of claim 1 wherein if the time interval does not match an expected time interval, designating the video feed to be a video injection.

3. The method of claim 1 wherein the video feed is of the user's face.

4. The method of claim 1 further comprising:

terminating the request for the video feed for a period of time;

after the period of time, re-requesting the video feed;

detecting a second time interval between terminating the request for the video feed and re-requesting the video feed;

comparing the second time interval to a second expected time interval; and if the second time interval does not match the second expected time interval, terminating the authentication session.

5. The method of claim 4, wherein the period of time that the request for the video feed is terminated is a random amount of time to reduce a likelihood that a video injection attempt could accurately predict a duration of the period of time.

6. The method of claim 1 wherein the computing device is a smartphone and the request for video feed is sent to the operating system of the smartphone.

7. The method of claim 1 wherein the expected delay is an amount of time that a camera takes, upon activation, to output a video feed.

8. The method of claim 1 wherein the following steps are performed two or more times:

requesting a video feed;

monitoring for receipt of the video feed;

receiving a received video feed;

detecting a time interval between requesting the video feed and receiving the received video feed;

comparing the time interval to an expected time interval;

if the time interval does not match an expected time interval, terminating the authentication session.

9. A method for detecting a video injection instead of an actual video output from a physical camera comprising:

requesting, with a first request, a video feed from a physical camera during a three-dimensional evaluation that determines if a presented face has three-dimensional characteristics that indicate that the presented face is a human face;

capturing one or more images of a face of a user with the physical camera such that the physical camera is directed toward the face of the user;

receiving a first received video feed in response to the first request;

terminating the request for video feed for a period of time;

requesting, with a second request, a video feed from the physical camera after the period of time;

capturing one or more images of the face of the user with the physical camera such that the physical camera is directed toward the face of the user;

receiving a second received video feed;

determining a time interval between the terminating the request for the video feed and receipt of the second receive video feed; and comparing the time interval to an expected time interval, the expected time interval comprising expected camera delay and the period of time that the request for video feed was terminated;

responsive to the comparing determining that the time interval is different than the expected time interval, terminating the three-dimensionality evaluation.

10. The method of claim 9, wherein the period of time that the video feed is terminated is of random duration.

11. The method of claim 9, wherein the first request is sent to an operating system or a browser.

12. The method of claim 11 wherein the expected camera delay is an amount of time that the physical camera takes, upon receiving the request for a video feed, to output a video feed.

13. The method of claim 9, further comprising:

receiving, for a period of time, the video feed in response to the first request;

determining a period of time that the video feed is received prior to the terminating the video feed;

comparing the period time that the video feed is received to period time that the physical camera was on;

responsive to the time period that the video feed was received being different then the time period that the camera was on, sending a notification of a video injection detection.

14. The method of claim 9 further comprising repeating the steps of claim 1 two or more times.

15. A system for detecting video injection during an authentication session comprising:

a computing device having a camera, screen, processor, and memory configured with non-transitory machine readable code that is executable by the processor, the machine readable code configured to:

request, with a first request, a video feed from a physical camera during the authentication session that utilizes the camera;

instruct the user to point the camera at a face of a person as part of a process to detect three-dimensionality of the face of the person;

with the camera pointed at the face of the person, receive the video feed created by the camera in response to the first request or a fraudulent video injection;

detect the time interval between requesting the video feed and receiving the video feed;

compare the time interval to an expected time interval representative of camera activation time;

if the time interval is outside the expected time interval, stopping the authentication session; and repeating the steps of requesting, receiving, detecting, and comparing two or more of times.

16. The system of claim 15, wherein the machine readable code is further configured to terminate receipt of the video feed for an amount of time and add this amount of time to the expected time interval to create a second expected time interval;

compare the time interval to the second expected time interval; and if the time interval is outside the second expected time interval, stopping the authentication session.

17. The system of claim 16, wherein the amount of time is a random amount of time which changes each authentication session.

18. The system of claim 15, wherein the camera activation time is an amount of time that the physical camera takes, upon receiving the request for a video feed, to output a video feed.

19. The system of claim 15, wherein the machine readable code is further configured to:

receive, for a period of time, the video feed in response to the first request;

determine a period of time that the video feed is received prior to the turning the camera off;

compare the period time that the video feed is received to period time that the video feed was requested;

responsive to the time period that the video feed was received being different then the time period that the video feed was requested, send a notification of a video injection detection.

20. The system of claim 15 wherein the machine readable code is further configured to increase a number of times that the steps of requesting, receiving, detecting, and comparing occur in response to the time interval being different the expected time interval, instead of terminating the authentication session.

* * * * *